(12) United States Patent
Takae et al.

(10) Patent No.: US 10,225,794 B2
(45) Date of Patent: *Mar. 5, 2019

(54) TERMINAL DEVICE, INFORMATION PROCESSING DEVICE, AND INFORMATION PROVIDING DEVICE

(71) Applicant: SONY CORPORATION, Tokyo (JP)

(72) Inventors: Shinji Takae, Tokyo (JP); Katsutoshi Itoh, Tokyo (JP); Hideyuki Suzuki, Tokyo (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 274 days.

This patent is subject to a terminal disclaimer.

(21) Appl. No.: 15/031,086

(22) PCT Filed: Sep. 17, 2014

(86) PCT No.: PCT/JP2014/074579
§ 371 (c)(1),
(2) Date: Apr. 21, 2016

(87) PCT Pub. No.: WO2015/068472
PCT Pub. Date: May 14, 2015

(65) Prior Publication Data
US 2016/0255574 A1 Sep. 1, 2016

(30) Foreign Application Priority Data

Nov. 6, 2013 (JP) .................................. 2013-230388
Mar. 14, 2014 (JP) .................................. 2014-052362

(51) Int. Cl.
*H04L 29/06* (2006.01)
*H04W 48/18* (2009.01)
(Continued)

(52) U.S. Cl.
CPC ......... *H04W 48/18* (2013.01); *H04L 63/0823* (2013.01); *H04W 12/06* (2013.01);
(Continued)

(58) Field of Classification Search
None
See application file for complete search history.

(56) References Cited

U.S. PATENT DOCUMENTS 8,270,972 B2 * 9/2012 Otting ................... H04W 48/10
455/432.1
8,457,013 B2 * 6/2013 Essinger ................. H04W 4/50
370/254
(Continued)

FOREIGN PATENT DOCUMENTS

JP  2009-182564 A  8/2009
JP  2012-060351 A  3/2012
(Continued)

*Primary Examiner* — Farid Homayounmehr
*Assistant Examiner* — Olanrewaju J. Bucknor
(74) *Attorney, Agent, or Firm* — Xsensus LLP

(57) ABSTRACT

[Object] To enable prompt switching of communication.
[Solution] A terminal device includes a mobile communication unit configured to perform mobile communication of a mobile communication network, an acquisition unit configured to acquire information regarding one or more wireless networks for wireless communication that is different from the mobile communication, and a providing unit configured to provide the information regarding the one or more wireless networks to another terminal device that performs the wireless communication. The information regarding the one or more wireless networks is at least partial information of information provided to the terminal device by an information providing device that provides information regarding a wireless network that is different from the mobile communication network to a device that performs the mobile communication. Each of the one or more wireless networks (Continued)

is a wireless network for the wireless communication to which the other terminal device is connectable through an authentication procedure.

14 Claims, 29 Drawing Sheets

(51) Int. Cl.
  *H04W 12/06* (2009.01)
  *H04W 88/04* (2009.01)
  *H04W 48/16* (2009.01)
  *H04W 84/12* (2009.01)

(52) U.S. Cl.
  CPC ............ *H04W 48/16* (2013.01); *H04W 84/12* (2013.01); *H04W 88/04* (2013.01)

(56) References Cited

U.S. PATENT DOCUMENTS

| | | | |
|---|---|---|---|
| 9,326,214 B1* | 4/2016 | Park | H04W 36/34 |
| 2005/0063334 A1* | 3/2005 | Fnu | H04W 48/16 |
| | | | 370/329 |
| 2009/0111466 A1* | 4/2009 | Montemurro | H04W 52/0209 |
| | | | 455/434 |
| 2013/0035056 A1* | 2/2013 | Prasad | H04W 12/06 |
| | | | 455/404.1 |
| 2013/0070644 A1* | 3/2013 | McCann | H04W 48/16 |
| | | | 370/255 |
| 2013/0070745 A1* | 3/2013 | Nixon | H04L 45/74 |
| | | | 370/338 |
| 2014/0036873 A1* | 2/2014 | Cheng | H04W 36/0022 |
| | | | 370/331 |
| 2014/0177446 A1* | 6/2014 | Sun | H04L 45/38 |
| | | | 370/236 |
| 2014/0179305 A1* | 6/2014 | Singh | H04W 4/70 |
| | | | 455/426.1 |
| 2014/0192651 A1* | 7/2014 | Sun | H04L 45/38 |
| | | | 370/235 |
| 2014/0235249 A1 | 8/2014 | Jeong et al. | |
| 2016/0183180 A1* | 6/2016 | Garcia Martin | H04W 48/18 |
| | | | 370/328 |

FOREIGN PATENT DOCUMENTS

| | | |
|---|---|---|
| JP | 2013-197756 A | 9/2013 |
| JP | 2013-219740 A | 10/2013 |
| WO | 2013/048199 A | 4/2013 |
| WO | 2013/134669 A | 9/2013 |

* cited by examiner

FIG. 5

| NETWORK TYPE | LOCATION | TIME |
|---|---|---|
| WLAN | LATITUDE: LAT_A LONGITUDE: LON_A | MONDAY: 1:30 PM |

FIG. 6

| ID | NETWORK TYPE | NETWORK PROPERTY | COMMUNICATION AREA | AVAILABLE TIME | PRIORITY |
|---|---|---|---|---|---|
| 1 | WLAN | HESSID: HESSID_1<br>ESSID: ESSID_1<br>BSSID: BSSID_1<br>CHANNEL: 1 | ANCHORLATITUDE: LAT_1<br>ANCHORLONGITUDE: LON_1<br>RADIUS: 30 | WEEKDAY: 9 AM - 10 PM<br>WEEKEND: 12 AM - 0 AM | 7 |

FIG. 9

| ID | NETWORK TYPE | NETWORK PROPERTY | COMMUNICATION AREA | AVAILABLE TIME | PRIORITY |
|---|---|---|---|---|---|
| 1 | WLAN | HESSID: HESSID_1<br>ESSID: ESSID_1<br>BSSID: BSSID_1<br>CHANNEL: 1 | ANCHORLATITUDE: LAT_1<br>ANCHORLONGITUDE: LON_1<br>RADIUS: 30 | WEEKDAY: 9 AM - 10 PM<br>WEEKEND: 12 AM - 0 AM | 7 |
| 2 | WLAN | HESSID: HESSID_2<br>ESSID: ESSID_2<br>BSSID: BSSID_2<br>CHANNEL: 6,36 | ANCHORLATITUDE: LAT_2<br>ANCHORLONGITUDE: LON_2<br>RADIUS: 50 | WEEKDAY: 8 AM - 11 PM<br>WEEKEND: 8 AM - 11 AM | 3 |
| ... | ... | ... | ... | ... | ... |

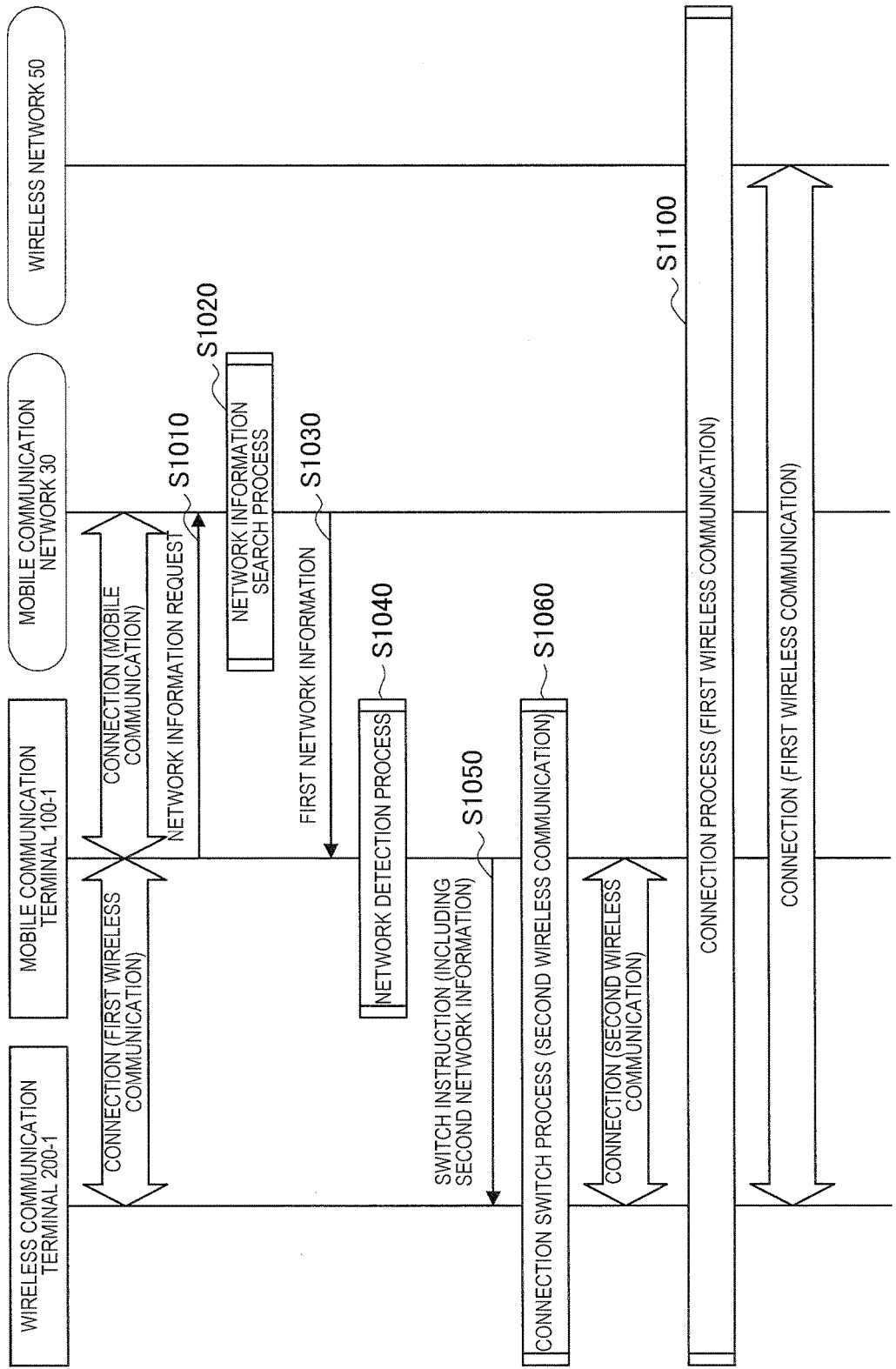

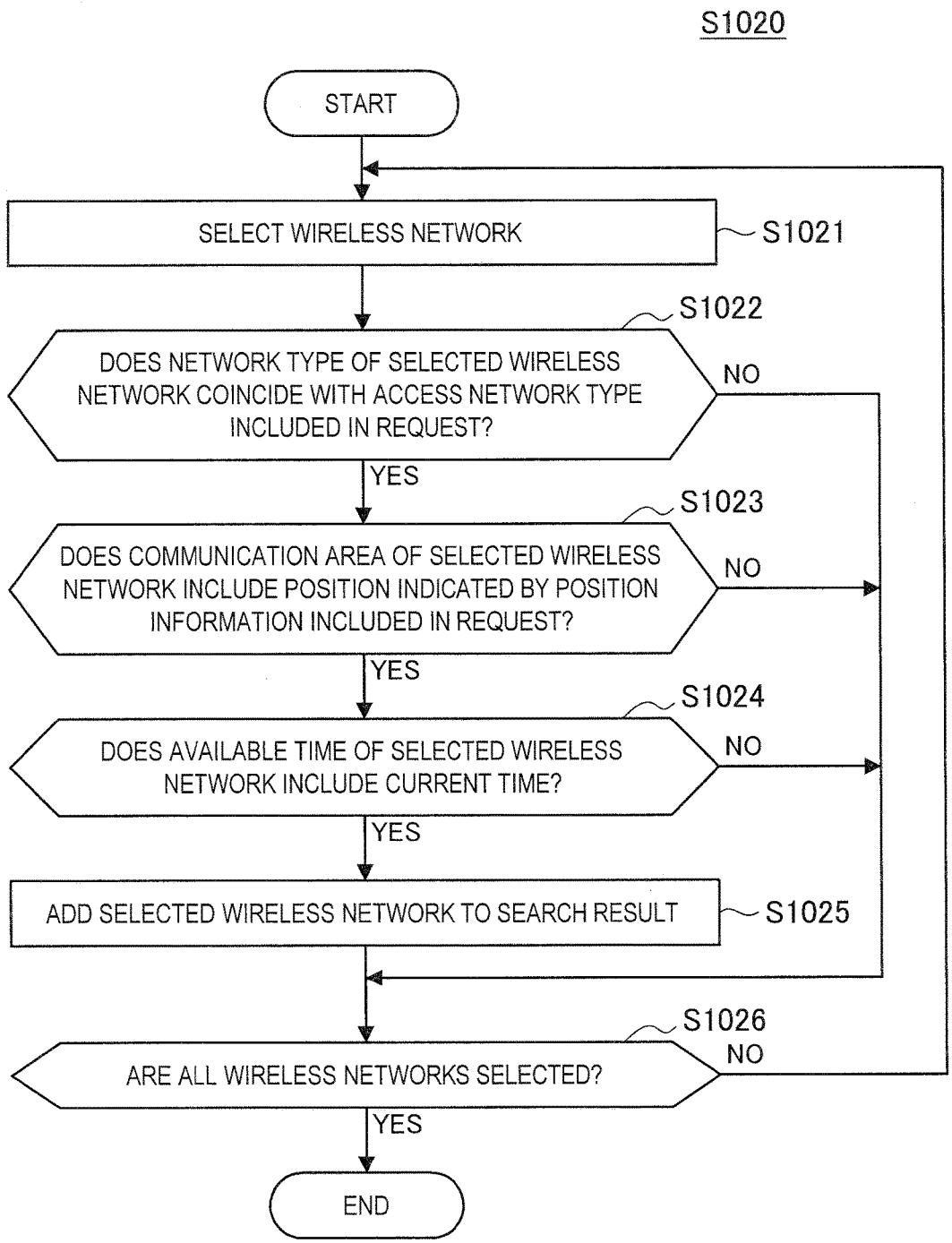

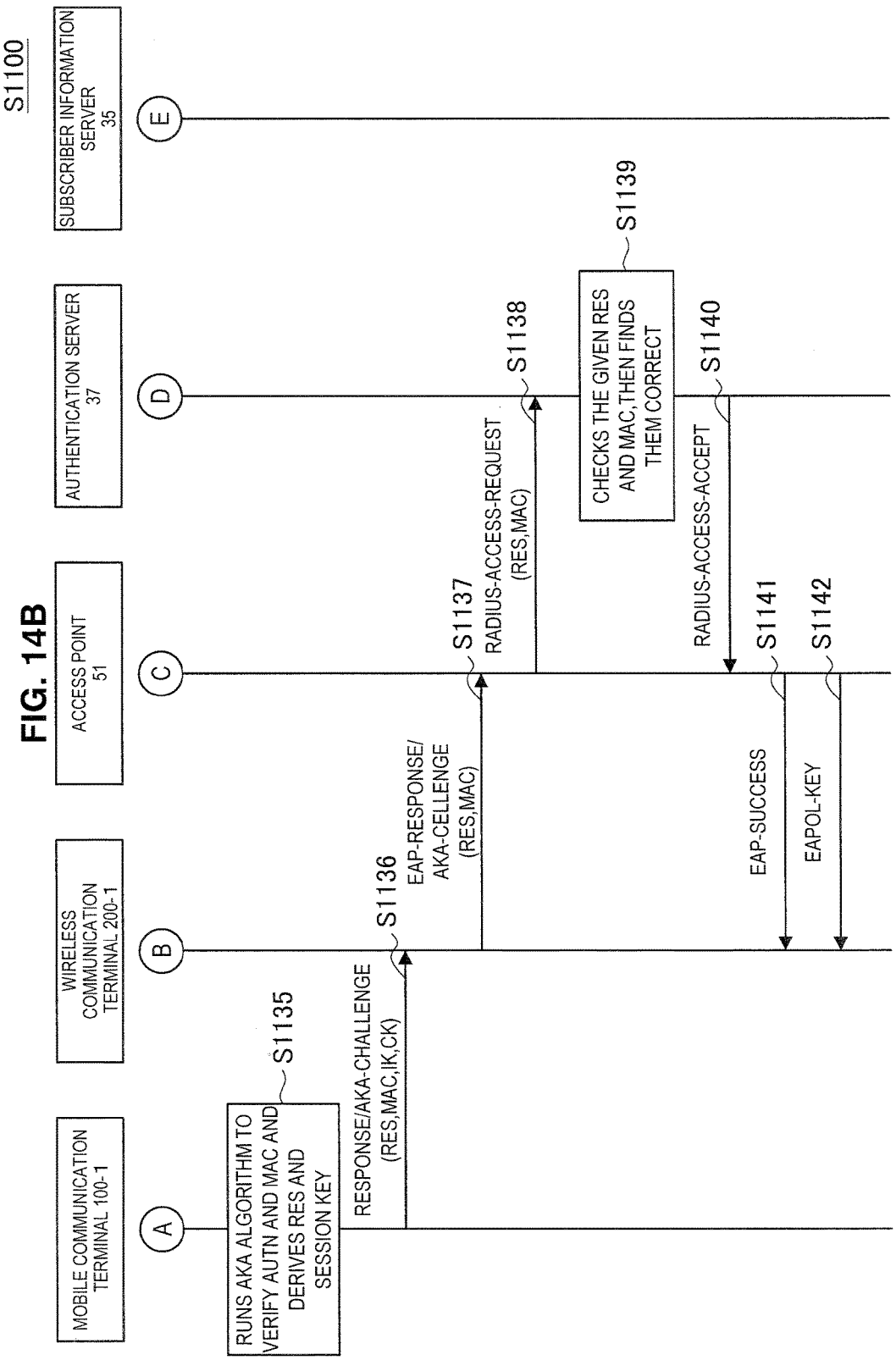

FIG. 18

| NETWORK TYPE | NETWORK PROPERTY | LOCETION | AVAILABLE TIME |
|---|---|---|---|
| WLAN | HESSID: HESSID_1<br>ESSID: ESSID_1<br>BSSID: BSSID_1<br>CHANNEL: 1 | LATITUDE: LAT_A<br>LONGITUDE: LON_A | MONDAY: 1:30 PM |

TERMINAL DEVICE, INFORMATION PROCESSING DEVICE, AND INFORMATION PROVIDING DEVICE

CROSS REFERENCE TO RELATED APPLICATIONS

This application is a U.S. National Phase of International Patent Application No. PCT/JP2014/074579 filed on Sep. 17, 2014, which claims priority benefit of Japanese Patent Application No. JP 2014-052362 filed in the Japan Patent Office on Mar. 14, 2014 and Japanese Patent Application No. JP 2013-230388 filed in the Japan Patent Office on Nov. 6, 2013. Each of the above-referenced applications is hereby incorporated herein by reference in its entirety.

TECHNICAL FIELD

The present disclosure relates to a terminal device, an information processing device, and an information providing device.

BACKGROUND ART

In recent years, apparatuses with a communication function using a wireless local area network (WLAN) have become widespread. As examples of the apparatuses, beginning with smartphones that also have a mobile communication function in mobile communication services, various kinds of apparatuses such as personal computers (PCs), tablet terminals, portable game devices, digital cameras, and printers are exemplified.

In general, an apparatus with a WLAN communication function is connected to a WLAN to perform transmission and reception of data by way of the WLAN. In other words, the apparatus performs transmission and reception of data by way of an access point of the WLAN. In addition, as an example of communication not by way of a WLAN (or an access point), the apparatus is, for example, connected to a mobile communication terminal and performs transmission and reception of data by way of the mobile communication terminal and a mobile communication network. That is, the apparatus performs transmission and reception of data through tethering. With regard to tethering, various technologies have been proposed.

For example, Patent Literature 1 discloses a technology for enabling a device that is a relay destination to continue communication even when an amount of electric charge of a device that performs relaying using tethering decreases.

CITATION LIST

Patent Literature

Patent Literature 1: JP 2013-197756A

SUMMARY OF INVENTION

Technical Problem

In general, communication by way of a WLAN (or an access point) like that described above can only be performed in a limited area (i.e., a communication area of a WLAN). On the other hand, in communication using tethering like that described above, a communication speed can be low due to a communication situation of a mobile communication terminal or a communication speed of the mobile communication. In addition, radio resources consumed on a mobile communication network and power consumption of a mobile communication terminal can increase. Thus, when communication by way of a WLAN (or an access point) becomes possible while communication is being performed through tethering, it is desirable for an apparatus to promptly switch communication from communication using tethering to communication by way of a WLAN.

Except for a case in which connection information is obtained beforehand, however, the apparatus is not capable of specifying a WLAN to which the apparatus can connect (i.e., a WLAN that authorizes connection of the apparatus) from WLANs (or access points) provided from various service providers. Thus, in order to switch communication from communication using tethering to communication by way of a WLAN, for example, a user of the apparatus selects a WLAN to which the apparatus can connect every time. For this reason, prompt switching of communication can be hard. Alternatively, in order to switch communication from communication using tethering to communication by way of a WLAN (or an access point), for example, the apparatus attempts to connect to various WLANs. Thus, failure repeats in a connection procedure. Therefore, time taken for connection to a WLAN is considered to become long and prompt switching of communication can be hard.

Therefore, it is desirable to provide a mechanism that enables prompt switching of communication.

Solution to Problem

According to the present disclosure, there is provided a terminal device including: a mobile communication unit configured to perform mobile communication of a mobile communication network; an acquisition unit configured to acquire information regarding one or more wireless networks for wireless communication that is different from the mobile communication; and a providing unit configured to provide the information regarding the one or more wireless networks to another terminal device that performs the wireless communication. The information regarding the one or more wireless networks is at least partial information of information provided to the terminal device by an information providing device that provides information regarding a wireless network that is different from the mobile communication network to a device that performs the mobile communication. Each of the one or more wireless networks is a wireless network for the wireless communication to which the other terminal device is connectable through an authentication procedure.

According to the present disclosure, there is provided an information processing device for a terminal device that performs mobile communication of a mobile communication network, the information processing device including: a memory configured to store a program; and one or more processors that is capable of executing the program. The program is for execution of acquiring information regarding one or more wireless networks for wireless communication that is different from the mobile communication, and providing the information regarding the one or more wireless networks to another terminal device that performs the wireless communication. The information regarding the one or more wireless networks is at least partial information of information provided to the terminal device by an information providing device that provides information regarding a wireless network that is different from the mobile communication network to a device that performs the mobile communication. Each of the one or more wireless networks is a wireless network for the wireless communication to which the other terminal device is connectable through an authentication procedure.

According to the present disclosure, there is provided a terminal device including: a wireless communication unit configured to perform wireless communication that is different from mobile communication of a mobile communication network; and an acquisition unit configured to acquire information regarding one or more wireless networks for the wireless communication. The information regarding the one or more wireless networks is information provided to the terminal device by another terminal device that performs the mobile communication, and is at least partial information of information provided to the other terminal device by an information providing device that provides information regarding a wireless network that is different from the mobile communication network to a device that performs the mobile communication. Each of the one or more wireless networks is a wireless network for the wireless communication to which the terminal device is connectable through an authentication procedure. The terminal device further includes a connection control unit configured to cause the terminal device to be connected to one wireless network among the one or more wireless networks through the authentication procedure.

According to the present disclosure, there is provided an information processing device for a terminal device that performs wireless communication that is different from mobile communication of a mobile communication network, the information processing device including: a memory configured to store a program; and one or more processors that is capable of executing the program. The program is a program for execution of acquiring information regarding one or more wireless networks for the wireless communication. The information regarding the one or more wireless networks is information provided to the terminal device by another terminal device that performs the mobile communication, and is at least partial information of information provided to the other terminal device by an information providing device that provides information regarding a wireless network that is different from the mobile communication network to a device that performs the mobile communication. Each of the one or more wireless networks is a wireless network for the wireless communication to which the terminal device is connectable through an authentication procedure. The program is a program for further executing connection of the terminal device to one wireless network among the one or more wireless networks through the authentication procedure based on the information regarding the one or more wireless networks.

According to the present disclosure, there is provided an information providing device including: an acquisition unit configured to acquire information regarding a wireless network that is different from a mobile communication network; and a providing unit configured to provide the information to a first terminal device that performs the mobile communication. The information includes information regarding one or more wireless networks for wireless communication that is different from the mobile communication. Each of the one or more wireless networks is a wireless network for the wireless communication to which a second terminal device that performs the wireless communication is connectable through an authentication procedure.

Advantageous Effects of Invention

According to the present disclosure described above, it is possible to promptly switch communication. Note that the effect described above is not necessarily limitative, and along with the effect or instead of the effect, any effect disclosed in the present specification or other effects that can be understood from the present specification may be exhibited.

BRIEF DESCRIPTION OF DRAWINGS

FIG. 5 is an explanatory diagram for describing an example of information provided to a network information providing device.

FIG. 6 is an explanatory diagram for describing an example of first network information.

FIG. 9 is an explanatory diagram for describing an example of a search for information regarding a wireless network.

FIG. 10 is a sequence diagram showing an example of a schematic flow of an entire communication control process according to the first embodiment.

FIG. 11 is a flowchart showing an example of a schematic flow of a network information search process according to the first embodiment.

FIG. 14B is (the second half of) the sequence diagram showing the example of the schematic flow of the connection process according to the first embodiment.

FIG. 18 is an explanatory diagram for describing an example of information to be provided to a network information providing device.

DESCRIPTION OF EMBODIMENT(S)

Figure 1:
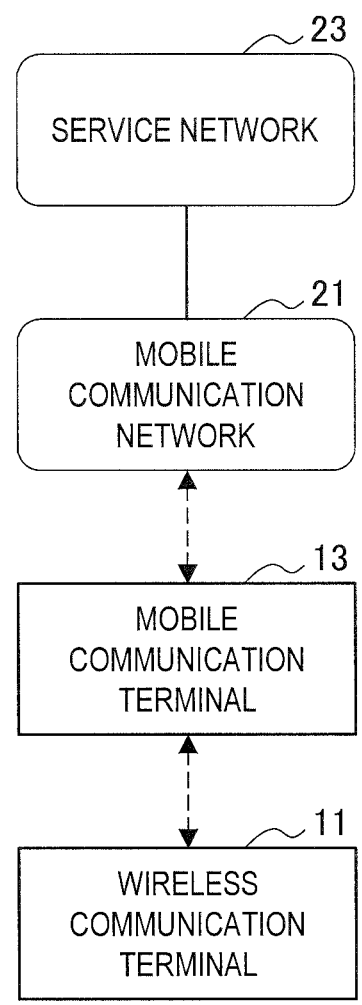
FIG. 1 is an explanatory diagram for describing an example of communication using tethering.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Introduction
2. Schematic configuration of a communication system
3. First Embodiment
3.1. Configuration of each device
    3.1.1. Configuration of a mobile communication terminal
    3.1.2. Configuration of a wireless communication terminal
    3.1.3. Configuration of a network information providing device
3.2. Process flow
3.3. Modified example
    3.3.1. Configuration of a mobile communication terminal
    3.3.2. Configuration of a wireless communication terminal
    3.3.3. Process flow
4. Second Embodiment
4.1. Configuration of each device
    4.1.1. Configuration of a mobile communication terminal
    4.1.2. Configuration of a wireless communication terminal
    4.1.3. Configuration of a network information providing device
4.2. Process flow
4.3. Modified example
    4.3.1. Configuration of a mobile communication terminal
    4.3.2. Configuration of a wireless communication terminal
    4.3.3. Process flow
5. Application examples
5.1. Application examples regarding a mobile communication terminal
5.2. Application example regarding a wireless communication terminal
5.3. Application example regarding an information management device
6. Application example 1. Introduction First, communication using tethering and communication by way of a WLAN will be described with reference to FIGS. 1 and 2.

Communication Using Tethering

A wireless communication terminal that performs WLAN communication performs, for example, communication using tethering. In other words, the wireless communication terminal is connected to a mobile communication terminal to perform communication by way of the mobile communication terminal and a mobile communication network. A specific example of this subject will be described below with reference to FIG. 1.

FIG. 1 is an explanatory diagram for describing an example of communication using tethering. Referring to FIG. 1, a wireless communication terminal 11, a mobile communication terminal 13, a mobile communication network 21, and a service network 23 are shown. The wireless communication terminal 11 is, for example, a device that performs WLAN communication, and is a tablet terminal as an example. The mobile communication terminal 13 is a device that performs mobile communication on the mobile communication network 21, and is a smartphone as an example. The mobile communication network 21 is a network that conforms with a communication standard, for example, Long Term Evolution (LTE), LTE-Advanced, or the like. The service network 23 is a public network, for example, the Internet. The mobile communication terminal 13, for example, is connected to the mobile communication network 21 to perform transmission and reception of data by way of the mobile communication network 21. In addition, the mobile communication network 21 is connected to the service network 23, and thus the mobile communication terminal 13 can perform transmission and reception of data by way of the mobile communication network 21 and the service network 23. Furthermore, the wireless communication terminal 11 is connected to the mobile communication terminal 13, and performs transmission and reception of data by way of the mobile communication terminal 13 and the mobile communication network 21 (and the service network 23). In other words, the mobile communication terminal 13 has a function of performing relaying between the wireless communication terminal 11 and the mobile communication network 21. In this manner, the wireless communication terminal 11 performs communication using tethering, and the mobile communication terminal 13 has the tethering function.

A communication speed in the communication using tethering described above can be low due to a communication situation of the mobile communication terminal or a communication speed of the mobile communication thereof.

In addition, radio resources consumed on the mobile communication network and power consumption of the mobile communication terminal can increase.

Communication by Way of a WLAN

A wireless communication terminal that performs WLAN communication, for example, is connected to a WLAN. In other words, the wireless communication terminal described above is connected to an access point of the WLAN. Thus, the wireless communication terminal performs transmission and reception of data by way of the WLAN (or the access point). A specific example of this subject will be described below with reference to FIG. 2.

Figure 2:
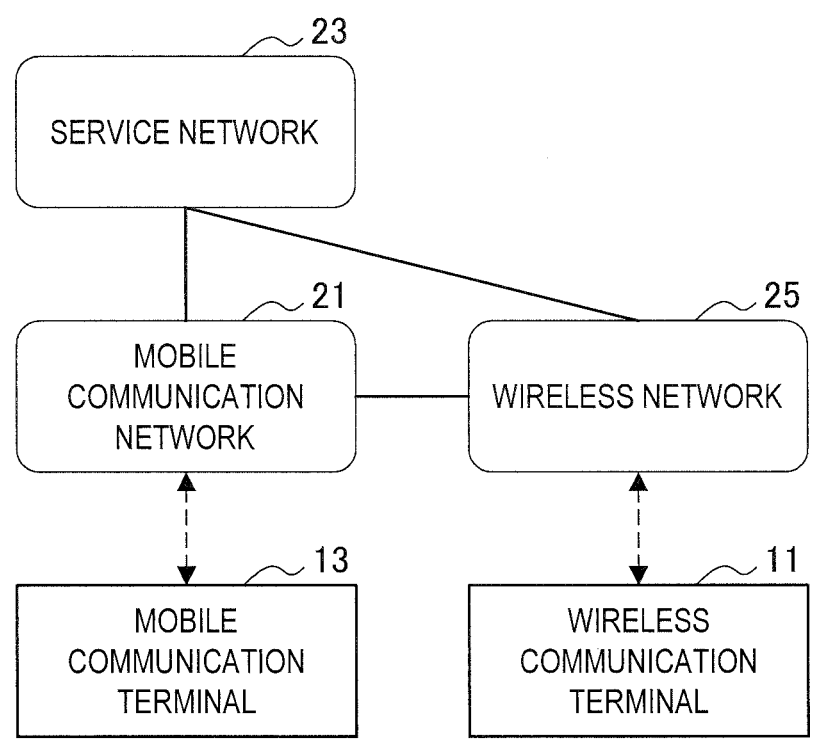
FIG. 2 is an explanatory diagram for describing an example of communication by way of a WLAN.

FIG. 2 is an explanatory diagram for describing an example of communication by way of a WLAN. Referring to FIG. 2, the wireless communication terminal 11, the mobile communication terminal 13, the mobile communication network 21, the service network 23, and a wireless network 25 are shown. The wireless network 25 is, for example, a WLAN. The wireless communication terminal 11 is connected to the wireless network 25 to perform transmission and reception of data by way of the wireless network 25. In addition, for example, the wireless network 25 is connected to the mobile communication network 21, and thus the wireless communication terminal 11 can perform transmission and reception of data by way of the wireless network 25 and the mobile communication network 21 (and the service network 23). Alternatively, the wireless network 25 is connected to the service network 23, and thus the wireless communication terminal 11 may perform transmission and reception of data by way of the wireless network 25 and the service network 23.

It is generally possible to perform communication by way of a WLAN only in a limited area (in other words, a communication area of a WLAN) as described above.

2. Schematic Configuration of a Communication System

Figure 3:
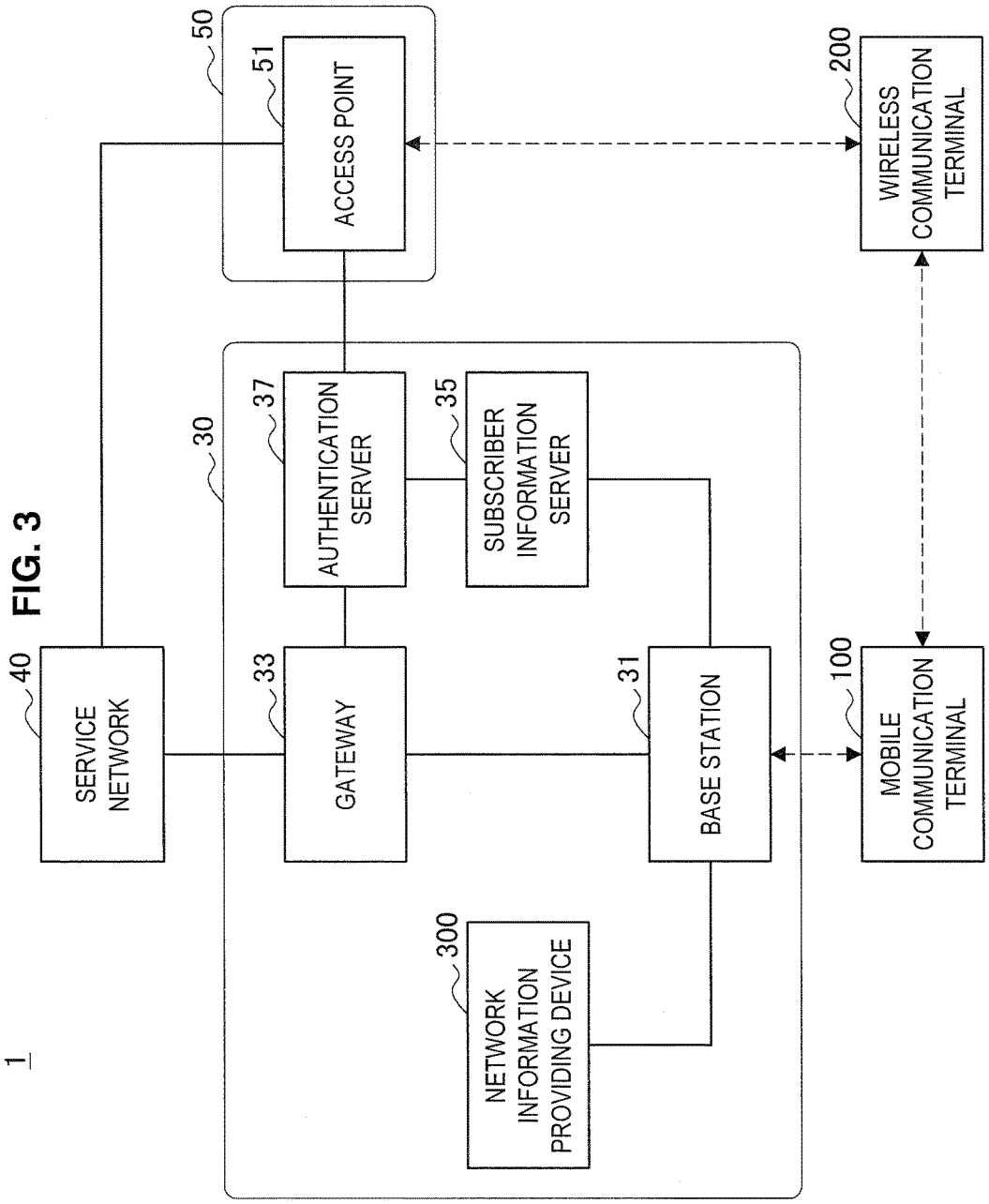
FIG. 3 is an explanatory diagram showing an example of a schematic configuration of a communication system according to an embodiment of the present disclosure.

Next, a schematic configuration of a communication system 1 according to an embodiment of the present disclosure will be described with reference to FIG. 3. FIG. 3 is an explanatory diagram showing an example of a schematic configuration of the communication system 1 according to the embodiment of the present disclosure. Referring to FIG. 3, the communication system 1 includes a mobile communication network 30, a service network 40, a wireless network 50, a mobile communication terminal 100 and a wireless communication terminal 200.

(Mobile Communication Network 30)

The mobile communication network 30 is a network for mobile communication. The mobile communication network 30 is, for example, a network that conforms with any communication standard of Third Generation Partnership Project (3GPP). As an example, the mobile communication network 30 is a network that conforms with Long Term Evolution (LTE) or LTE-Advanced. The mobile communication network 30 is operated by, for example, a mobile communication service provider. Note that the mobile communication network 30 can also be called a cellular network. In addition, mobile communication can also be called cellular-type communication.

The mobile communication network 30 includes a radio access network (RAN) and a core network. In addition, the mobile communication network 30 includes a base station 31 on the radio access network, and includes a gateway 33, a subscriber information server 35, an authentication server 37, and a network information providing device 300 on the core network.

Base Station 31

The base station 31 performs communication with a terminal device that performs mobile communication. For example, the base station 31 forms a cell that is a communication area of the mobile communication network 30 and communicates with a terminal device positioned within the cell. As an example, the base station 31 is an evolved Node B (eNB).

Gateway 33

The gateway 33 performs relaying between the mobile communication network 30 and another network. As an example, the gateway 33 is a packet data network gateway (P-GW). In addition, the other network is, for example, the service network 40.

Subscriber Information Server 35

The subscriber information server 35 retains subscriber information of the mobile communication network 30. For example, the subscriber information server 35 also retains information used in authentication for connection. The subscriber information server 35 is, for example, a home subscriber server (HSS).

Authentication Server 37

The authentication server 37 has an authentication function of authenticating subscribers of the mobile communication network 30 at the time of connection. The authentication server 37 is, for example, an authentication, authorization, and accounting (AAA) server.

Network Information Providing Device 300

The network information providing device 300 provides information regarding a different wireless network from the mobile communication network 30 to a device that performs mobile communication. The wireless network includes, for example, a WLAN. More specifically, the network information providing device 300 is, for example, a device that has an access network discovery and selection function (ANDSF).

(Service Network 40)

The service network 40 is a public network such as the Internet.

(Wireless Network 50)

The wireless network 50 is a network for wireless communication that is different from mobile communication. The wireless network 50 is, for example, a WLAN.

Access Point 51

An access point 51 communicates with a terminal device that performs the wireless communication described above that is different from mobile communication. For example, the access point 51 communicates with a terminal device positioned within the communication area of the access point 51.

(Mobile Communication Terminal 100)

The mobile communication terminal 100 performs mobile communication on the mobile communication network 30. In other words, the mobile communication terminal 100 performs mobile communication in a service area of the mobile communication network 30. Specifically, the mobile communication terminal 100 communicates with, for example, the base station 31 when it is positioned within the cell of the base station 31.

In addition, the mobile communication terminal 100 also performs wireless communication that is different from mobile communication. For example, the mobile communication terminal 100 performs WLAN communication as first wireless communication that is different from the mobile communication. In addition, the mobile communication terminal 100 performs, for example, short-range wireless communication as second wireless communication that is different from mobile communication. The short-range wireless communication includes Bluetooth (registered trademark) communication as an example.

Furthermore, the mobile communication terminal 100 has a tethering function. That is, the mobile communication terminal 100 has the function of performing relaying between the mobile communication network 30 and another terminal device.

(Wireless Communication Terminal 200)

The wireless communication terminal 200 performs wireless communication that is different from the mobile communication. For example, the wireless communication terminal 200 performs WLAN communication as first wireless communication. In addition, the wireless communication terminal 200 performs, for example, short-range wireless communication as second wireless communication that is different from the mobile communication. The short-range wireless communication includes Bluetooth communication as an example.

Furthermore, the wireless communication terminal 200 performs communication using tethering. In other words, the wireless communication terminal 200 performs communication by way of relaying performed by a terminal device (for example, the mobile communication terminal 100) that performs mobile communication. More specifically, for example, the wireless communication terminal 200 is connected to the mobile communication terminal 100 to perform transmission and reception of data by way of the mobile communication terminal 100 and the mobile communication network 30 (and the service network 40).

Note that the wireless communication terminal 200 does not have a communication function for mobile communication on the mobile communication network 30.

3. First Embodiment

Next, a first embodiment of the present disclosure will be described with reference to FIGS. 4 to 16.

3.1. Configuration of Each Device

First, configurations of devices according to the first embodiment of the present disclosure will be described with reference to FIGS. 4 to 9.

<3.1.1. Configuration of a Mobile Communication Terminal>

Figure 4:
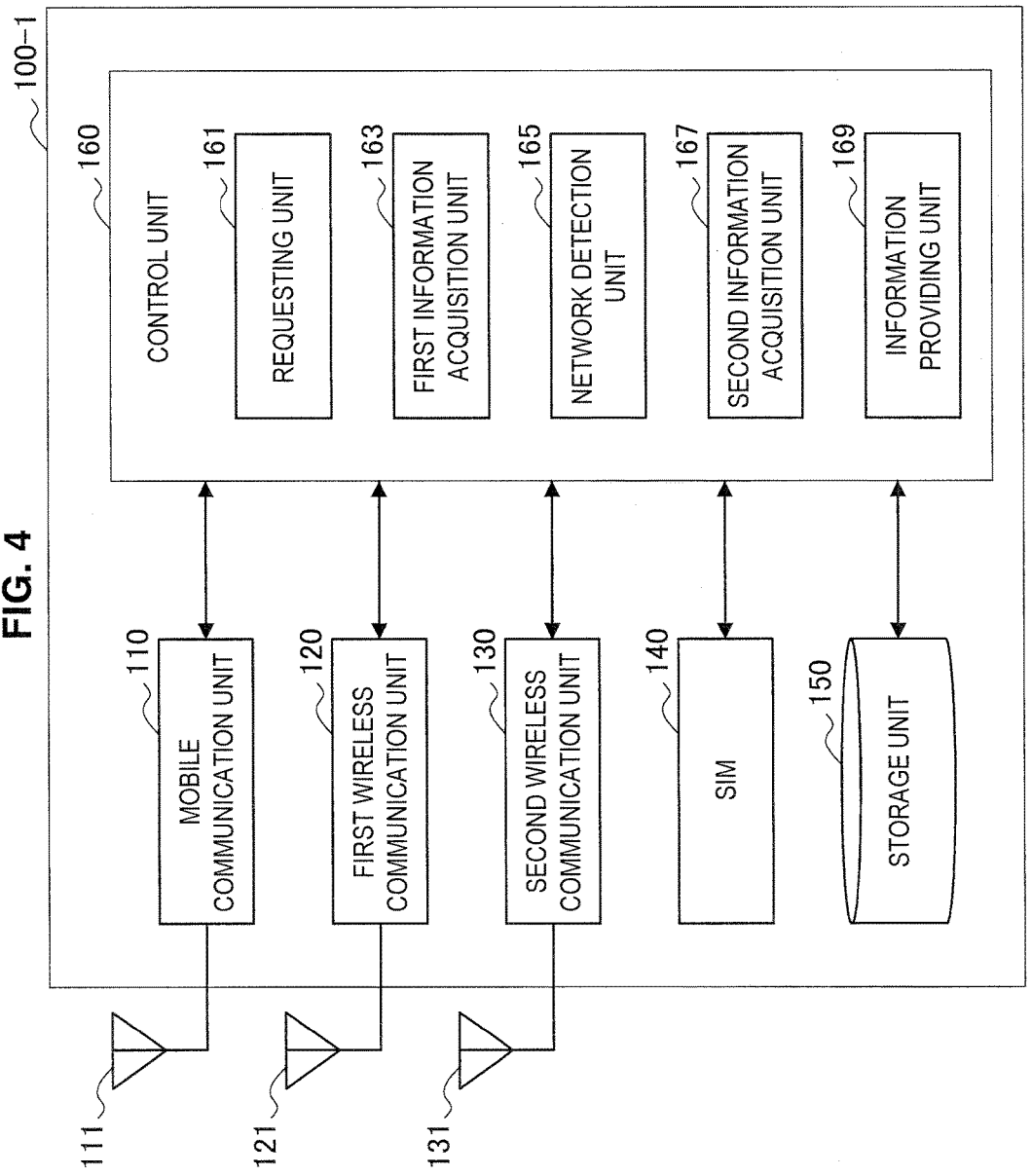
FIG. 4 is a block diagram showing an example of a configuration of a mobile communication terminal according to a first embodiment.

An example of a configuration of a mobile communication terminal 100-1 according to the first embodiment of the present disclosure will be described with reference to FIGS. 4 to 6. FIG. 4 is a block diagram showing the example of the configuration of the mobile communication terminal 100-1 according to the first embodiment. Referring to FIG. 4, the mobile communication terminal 100-1 is provided with a mobile communication unit 110, an antenna unit 111, a first wireless communication unit 120, an antenna unit 121, a second wireless communication unit 130, an antenna unit 131, a subscriber identification module (SIM) 140, a storage unit 150, and a control unit 160.

(Mobile Communication Unit 110)

The mobile communication unit 110 performs mobile communication on the mobile communication network 30. For example, the mobile communication is communication that conforms with any communication standard of the 3GPP (for example, LTE, LTE-Advanced, or the like). The mobile communication unit 110, for example, receives a downlink signal from the base station 31 and transmits an uplink signal to the base station 31.

(Antenna Unit 111)

The antenna unit 111 radiates, as radio waves, signals output from the mobile communication unit 110 to a space. In addition, the antenna unit 111 converts radio waves of the space into signals, and outputs the signals to the mobile communication unit 110.

(First Wireless Communication Unit 120)

The first wireless communication unit 120 performs wireless communication that is different from mobile communication. The wireless communication is, for example, WLAN communication. Specifically, for example, the WLAN communication is communication that conforms with any of WLAN standards such as IEEE 802.11a, 11b, 11g, 11n, 11ac and 11ad.

For example, the first wireless communication unit 120 receives signals from the access point 51 and transmits signals to the access point 51. In addition, for example, in cases of direct communication, the first wireless communication unit 120 receives signals from another terminal device and transmits signals to the other terminal device. The other terminal device is, for example, the wireless communication terminal 200.

(Antenna Unit 121)

The antenna unit 121 radiates, as radio waves, signals output from the first wireless communication unit 120 to the space. In addition, the antenna unit 121 converts radio waves of the space into signals and outputs the signals to the first wireless communication unit 120.

(Second Wireless Communication Unit 130)

The second wireless communication unit 130 performs wireless communication that is different from mobile communication. The wireless communication is, for example, short-range wireless communication, and includes Bluetooth communication (i.e., communication that conforms with the Bluetooth standard) as an example. The second wireless communication unit 130, for example, receives signals from another terminal device and transmits signals to the other terminal device. The other terminal device is, for example, the wireless communication terminal 200.

(Antenna Unit 131)

The antenna unit 131 radiates, as radio waves, signals output from the second wireless communication unit 130 to the space. In addition, the antenna unit 131 converts radio waves of the space into signals and outputs the signals to the second wireless communication unit 130.

(SIM 140)

The SIM 140 provides authentication information used in authentication to be connected to a network. In addition, the SIM 140 executes an authentication process for the authentication to be connected to the network. For example, the authentication to be connected to a network includes, for example, authentication of a subscriber and authentication of a network.

As an example, the authentication is authentication based on Extensible Authentication Protocol Method for $3^{rd}$ Generation Authentication and Key Agreement (EAP-AKA).

In this case, for example, the authentication process includes verification of an AUTN as a process for authenticating a network. In addition, the authentication process includes verification of a message authentication code (MAC). In addition, the authentication process includes generation of a response to a challenge as a process for authenticating a subscriber. In addition, the authentication process includes generation of a MAC and a session key.

In addition, for example, the authentication information includes an International Mobile Subscriber Identity (IMSI). In addition, the authentication information includes the generated response. In addition, the authentication information includes the generated MAC and session key.

Note that the authentication may be authentication other than authentication based on EAP-AKA. As an example, the authentication may be authentication based on EAP-AKA'. As another example, the authentication may be authentication based on Extensible Authentication Protocol Method for Global System for Mobile Communications (GSM (registered trademark)) Subscriber Identity Modules (EAP-SIM).

(Storage Unit 150)

The storage unit 150 temporarily or permanently stores programs and data for operations of the mobile communication terminal 100.

(Control Unit 160)

The control unit 160 provides various functions of the mobile communication terminal 100-1. The control unit 160 includes a requesting unit 161, a first information acquisition unit 163, a network detection unit 165, a second information acquisition unit 167, and an information providing unit 169.

(Requesting Unit 161)

The requesting unit 161 requests provision of information from a network information providing device 300-1.

For example, the requesting unit 161 requests provision of information regarding a wireless network for wireless communication that is different from mobile communication from the network information providing device 300-1. More specifically, for example, the requesting unit 161 transmits a network information requesting message to the network information providing device 300-1 via the mobile communication unit 110.

Information Provided when Requested

The requesting unit 161 provides, for example, information for specifying a wireless network to the information providing device 300-1 upon the request for provision. Specifically, the requesting unit 161, for example, transmits a network information requesting message including the above information to the network information providing device 300-1 via the mobile communication unit 110.

Network Type Information

The requesting unit 161 provides, for example, information indicating the type of the wireless network for wireless communication that is different from mobile communication (hereinafter, referred to as "network type information") to the network information providing device 300-1 upon the request for provision.

As an example, the wireless network for the wireless communication is a WLAN, and the network type information indicates the WLAN.

Accordingly, for example, it is possible to provide information regarding a wireless network of a desired type to the network providing device 300-1. Thus, it is possible to acquire information regarding an available wireless network in terms of, for example, a communication scheme.

Position-Related Information

The requesting unit 161 provides, for example, information regarding a position of the mobile communication terminal 100-1 or a wireless communication terminal 200-1 (hereinafter referred to as "position-related information") to the network information providing device 300-1 upon the request for provision.

As an example, the position-related information is position information indicating a position of the mobile communication terminal 100-1 or the wireless communication terminal 200-1. The position information is, for example, information acquired from the Global Positioning System (GPS). Note that the position-related information is not limited to the position information, and may be other information. As an example, the position-related information may be identification information of a cell to which the mobile communication terminal 100-1 belongs on the mobile communication network 30.

Accordingly, for example, it is possible to provide information regarding an available wireless network in terms of position to the network providing device 300-1. Thus, for example, it is possible to acquire the information regarding the available wireless network in terms of position.

Example of Specific Information

FIG. 5 is an explanatory diagram for describing an example of information to be provided to the network information providing device 300-1. Referring to FIG. 5, the information to be provided to the network information providing device 300-1 is shown. For example, network type information (WLAN) indicating a network type and position information indicating a position of the mobile communication terminal 100-1 or the wireless communication terminal 200 (LAT_A and LON_A) are provided. In addition, information indicating a current time (MONDAY: 1:30 PM) is further provided.

Trigger for a Request

The requesting unit 161 requests, for example, provision of information from the network information providing device 300-1 according to occurrence of any of one or more predetermined events.

As a first example, one of the one or more predetermined events described above is stop of movement of the mobile communication terminal 100-1 or the wireless communication terminal 200-1, or elapse of a predetermined period of time after the movement stops.

As a second example, one of the one or more predetermined events described above is start of tethering (in other words, communication of the mobile communication terminal 100-1 through relay of mobile communication).

As a third example, one of the one or more predetermined events described above is positioning of the mobile communication terminal 100-1 or the wireless communication terminal 200-1 at a position at which switch from communication using tethering (for example, switch from communication using tethering to communication via a WLAN) was performed in the past.

As a fourth example, one of the one or more predetermined events described above is arrival of a predetermined cycle.

Due to such triggers, requests are made with respect to the network information providing device 300-1 when switch from tethering is desirable.

(First Information Acquisition Unit 163)

The first information acquisition unit 163 acquires information provided to the mobile communication terminal 100-1 from the network information providing device 300-1 (hereinafter referred to as "first network information"). The first network information is information regarding a wireless network that is different from the mobile communication network 30.

Technique of Acquiring First Network Information

As described above, for example, the requesting unit 161 requests provision of information from the network information providing device 300-1. Then, the network information providing device 300-1 provides the first network information to the mobile communication terminal 100-1. Then, the first information acquisition unit 163 acquires the first network information. The first information acquisition unit 163 thereafter causes the first network information to be stored in the storage unit 150.

At Least One Wireless Network

As described above, the first network information is information regarding a wireless network that is different from the mobile communication network 30. More specifically, the first network information is, for example, information regarding at least one wireless network for wireless communication that is different from the mobile communication.

Network that is Connectable Through an Authentication Procedure

Each of the at least one wireless network is the wireless network for the wireless communication to which the mobile communication terminal 100-1 or the wireless communication terminal 200-1 is connectable through an authentication procedure.

For example, the authentication procedure includes an authentication procedure in which authentication information provided from the SIM 140 is used (hereinafter referred to as a "SIM authentication procedure"). In other words, the first network information includes information regarding the wireless network for the wireless communication that is connectable through the SIM authentication procedure.

As an example, each of the at least one wireless network is a wireless network operated by an operator of the mobile communication network 30. In other words, the first network information is information regarding at least one wireless network for the wireless communication operated by the operator of the mobile communication network 30. The operator includes, for example, a mobile communication service provider (mobile network operator or MNO) that possesses the communication network 30, and/or a virtual mobile communication service provider (mobile virtual network operator or MVNO).

Instead of the SIM authentication procedure, or in addition to the SIM authentication procedure, the authentication procedure may include an authentication procedure in which an electronic certificate is used. In other words, the first network information may include information regarding a wireless network for wireless communication to which the mobile communication terminal 100-1 or the wireless communication terminal 200-1 is connectable through the authentication procedure using an electronic certificate. The electronic certificate may be an electronic certificate, for example, issued by the operator of the mobile communication network 30.

Note that, for example, capabilities of the mobile communication terminal 100-1 and the wireless communication terminal 200-1 with respect to authentication are the same. In this case, each of the at least one wireless network is the wireless network for the wireless communication to which the mobile communication terminal 100-1 and the wireless communication terminal 200-1 are connectable through the authentication procedure.

Network that Corresponds to a Position

Each of the at least one wireless network is, for example, a wireless network that has a communication area that corresponds to a position of the mobile communication terminal 100-1 or the wireless communication terminal 200-1. In other words, the first network information is information regarding at least one wireless network that has a communication area that corresponds to a position of the mobile communication terminal 100-1 or the wireless communication terminal 200-1.

Specifically, for example, each of the at least one wireless network is a wireless network that has a communication area that includes a position of the mobile communication terminal 100-1 or the wireless communication terminal 200-1.

Accordingly, information regarding a wireless network that is connectable in terms of position is obtained. Thus, it is possible to avoid attempts to detect a wireless network that is not allowed to connect in terms of position.

Network that Corresponds to Time

Each of the at least one wireless network is, for example, a wireless network that has an available time in terms of time. In other words, the first network information is information regarding at least one wireless network having an available time in terms of time.

Specifically, for example, each of the at least one wireless network is a wireless network that has an available time including a current time (i.e., a wireless network that is currently available in terms of time).

Accordingly, the information regarding a wireless network that is connectable in terms of time is obtained. Thus, it is possible to avoid attempts to detect a wireless network that is not allowed to connect in terms of time.

WLAN

Each of the at least one wireless network is, for example, a WLAN, and the wireless communication that is different from the mobile communication is, for example, WLAN communication. In other words, the first network information is information regarding at least one WLAN.

Information Items Included in First Network Information

Access Point Identification Information

The first network information includes, for example, identification information for identifying each access point of the at least one wireless network.

As described above, for example, each of the at least one wireless network is a WLAN. In this case, the identification information includes, for example, a service set identifier (SSID). More specifically, the identification information includes, for example, a homogenous extended service set identifier (HESSID), an extended service set identifier (ESSID), and/or a basic service set identifier (BSSID).

With such identification information, for example, a wireless network that is connectable can be specified.

Channel Information

The first network information includes information indicating a channel for each of the at least one wireless network.

For example, a plurality of channels are prepared for the wireless network for the wireless communication (for example, a WLAN). Then, on each of the at least one wireless network (for example, one or more WLANs), one or more channels of the plurality of channels are used. In addition, the second network information includes information indicating the one or more channels used on the at least one wireless network as information indicating the channels for each of the at least one wireless network.

With the information, for example, it is possible to detect a wireless network more quickly. More specifically, for example, when a channel of a wireless network is unclear, individual channels among all channels are sequentially scanned to detect a wireless network. Thus, an enormous amount of time can be necessary for detecting a wireless network. On the other hand, when there is channel information, for example, a wireless network is detected by scanning a channel indicated by channel information. Therefore, a wireless network can be quickly detected.

As a specific example, for example, 13 channels are prepared in the 2.4 GHz band for a WLAN. Then, for example, if it takes 10 ms for a channel transition and 100 ms to scan each channel, it takes 1420 ms (10 ms*12+100 ms*13) to scan all the channels. In other words, when a channel for a wireless network is unclear, a maximum of 1420 ms is necessary for detecting a wireless network. On the other hand, when there is channel information, for example, it is sufficient to scan one channel indicated by the channel information. Thus, for example, it takes 110 ms (10 ms*1+100 ms*1) to detect a wireless network. 10 ms out of 110 ms is time necessary for a transition to the one channel indicated by the channel information from a channel being used in communication using tethering. When the channel being used in the communication using tethering coincides with the one channel indicated by the channel information, 100 ms is necessary for detecting a wireless network. In this manner, time taken to detect a wireless network is shortened, and thus a wireless network can be detected more quickly.

Note that, for the wireless network for the wireless communication (for example, the WLAN), the plurality of channels may be channels of one band (for example, one of the 2.4 GHz and 5 GHz band) or may be channels of two or more bands (for example, the 2.4 GHz and 5 GHz band).

Example of Specific Information

FIG. 6 is an explanatory diagram for describing an example of the first network information. Referring to FIG. 6, the first network information is shown. In this example, the first network information is one wireless network for WLAN communication. The first network information includes, for example, identification information of access points of the wireless network (HESSID, ESSID, and BSSID) as network property information. In addition, the first network information includes information indicating channels for the wireless network as the network property information. In addition, in this example, the first network information includes the ID of the wireless network and network type information indicating the network type of the wireless network. Furthermore, the first network information includes communication area information indicating a communication area of the wireless network, available time information indicating an available time of the wireless network, and priority information indicating priority of the wireless network.

(Network Detection Unit 165)

The network detection unit 165 detects the wireless network for the wireless communication.

For example, the network detection unit 165 detects the wireless network (for example, the WLAN) by scanning a channel for the wireless network for the wireless communication (for example, the WLAN).

Detection Based on the First Network Information

The network detection unit 165, for example, detects the wireless network for the wireless communication based on the first network information.

Specifically, for example, the network detection unit 165 scans the at least one wireless network indicated by the first network information, and detects one or more wireless networks from the at least one wireless network.

In addition, as described above, for example, the first network information includes information indicating the channel for each of the at least one wireless network. In this case, the network detection unit 165 performs the scanning based on the information indicating the channel. Accordingly, the wireless network can be detected more quickly.

(Second Information Acquisition Unit 167)

The second information acquisition unit 167 acquires information regarding one or more wireless networks for the wireless communication that is different from the mobile communication (hereinafter referred to as "second network information").

The second network information is at least partial information of information to be provided from the network information providing device 300-1 to the mobile communication terminal 100-1 (i.e., the first network information). Note that, as described above, for example, the first network information is information regarding the at least one wireless network for the wireless communication. In this case, the at least one wireless network includes the one or more wireless networks with regard to the second network information.

One or More Wireless Networks

Network that is Connectable Through an Authentication Procedure

Each of the one or more wireless networks is the wireless network for the wireless communication to which the wireless communication terminal 200-1 is connectable through an authentication procedure.

For example, the authentication procedure includes an authentication procedure in which authentication information provided from the SIM 140 is used (i.e., SIM authentication procedure). In other words, the second network information includes information regarding the wireless network for the wireless communication to which the wireless communication terminal 200-1 is connectable through the SIM authentication procedure. Note that, as will be described below, the authentication information is, for example, provided from the mobile communication terminal 100-1 to the wireless communication terminal 200-1.

As an example, each of the one or more wireless networks is a wireless network operated by an operator of the mobile communication network 30. In other words, the second network information includes information regarding one or more wireless networks for the wireless communication operated by the operator of the mobile communication network 30. The operator includes, for example, MNO or MVNO.

Instead of the SIM authentication procedure, or in addition to the SIM authentication procedure, the authentication procedure may include an authentication procedure in which an electronic certificate is used. In other words, the second network information may include information regarding a wireless network for wireless communication to which the wireless communication terminal 200-1 is connectable through the authentication procedure using an electronic certificate. The electronic certificate may be an electronic certificate, for example, issued by the operator of the mobile communication network 30.

Network that Corresponds to a Position

Each of the one or more wireless networks is, for example, a wireless network that has a communication area that corresponds to a position of the mobile communication terminal 100-1 or the wireless communication terminal 200-1. In other words, the second network information is information regarding at least one or more wireless networks each of which has a communication area that corresponds to a position of the mobile communication terminal 100-1 or the wireless communication terminal 200-1.

Specifically, for example, each of the one or more wireless networks is a wireless network that has a communication area that includes a position of the mobile communication terminal 100-1 or the wireless communication terminal 200-1.

Accordingly, information regarding a wireless network that is connectable in terms of position is obtained. Thus, it is possible to avoid attempts to detect a wireless network that is not allowed to connect in terms of position.

Network that Corresponds to Time

Each of the one or more wireless networks is, for example, a wireless network that has an available time in terms of time. In other words, the second network information is information regarding one or more wireless networks each having an available time in terms of time.

Specifically, for example, each of the one or more wireless networks is one or more wireless networks each of which has an available time including a current time (i.e., a wireless network that is currently available in terms of time).

Accordingly, the information regarding a wireless network that is connectable in terms of time is obtained. Thus, it is possible to avoid attempts to detect a wireless network that is not allowed to connect in terms of time.

WLAN

Each of the one or more wireless networks is, for example, a WLAN, and the wireless communication that is different from the mobile communication is, for example, WLAN communication. In other words, the second network information is information regarding one or more WLANs.

Information Items Included in Second Network Information

Access Point Identification Information

The second network information includes, for example, identification information for identifying an access point of each of the one or more wireless networks.

As described above, each of the one or more wireless networks is, for example, a WLAN. In this case, the identification information includes, for example, an SSID. More specifically, the identification information includes, for example, a HESSID, an ESSID, and/or a BSSID.

With such identification information, for example, a wireless network that is connectable can be specified.

Channel Information

The second network information includes information indicating a channel for each of the one or more wireless networks.

For example, a plurality of channels are prepared for the wireless network for the wireless communication (for example, a WLAN). Then, on each of the one or more wireless networks (for example, one or more WLANs), one or more channels of the plurality of channels are used. In addition, the second network information includes information indicating the one or more channels used on the one or more wireless networks as information indicating the channels for each of the one or more wireless networks.

With the information, for example, the wireless communication terminal 200-1 can detect a wireless network more quickly.

Technique of Acquiring Second Network Information

Each of the one or more wireless networks is, for example, a wireless network to which the wireless communication terminal 200-1 is connectable through the authentication procedure, and which is detected by the network detection unit 165.

Accordingly, for example, since information regarding the detected wireless network is provided to another terminal device (for example, the wireless communication terminal 200-1), it is possible to suppress a load of detection on the other terminal device. As a result, for example, power consumption of the other terminal device (for example, the wireless communication terminal 200-1) is suppressed.

As described above, for example, the network detection unit 165 scans the at least one wireless network indicated by the first network information, and detects one or more wireless networks from the at least one wireless network. Then, the second information acquisition unit 167 acquires information regarding the detected one or more wireless networks as the second network information from the storage unit 150.

As a specific example of the information, when the one wireless network shown in FIG. 6 is detected by the network detection unit 165, the second network information is the same information as the first network information shown in FIG. 6.

Note that the second network information may include only some information items among the information items included in the first network information. As an example, the second network information may include the network property information among the information items shown in FIG. 6, and may not include other information items of the information shown in FIG. 6.

In addition, the first network information may be information regarding a plurality of the wireless networks for the wireless communication (for example, a plurality of WLANs) and the network detection unit 165 may detect two or more wireless networks among the plurality of wireless networks. In this case, the second network information may be information regarding the two or more wireless networks. Alternatively, the second network information may be information regarding one wireless network of the two or more wireless networks (for example, the wireless network with the highest priority).

In addition, the mobile communication terminal 100-1 and the wireless communication terminal 200-1 may have different authentication capabilities. In this case, wireless networks to which the wireless communication terminal 200-1 is connectable through the authentication procedure may be some wireless networks among the at least one wireless network indicated by the first network information. In this case, the second network information may be information regarding one or more wireless networks detected by the network detection unit 165 among the some wireless networks. Note that the first network information may include information regarding a wireless network to which the mobile communication terminal 100-1 is not allowed to be connected through an authentication procedure.

(Information Providing Unit 169)

Provision of the Second Network Information

The information providing unit 169 provides the second network information to another terminal device that performs the wireless communication. For example, the information providing unit 169 provides the second network information to the wireless communication terminal 200-1.

The information providing unit 169, for example, instructs the wireless communication terminal 200-1 to switch communication when providing the second network information to the wireless communication terminal 200-1. For example, the information providing unit 169 transmits a switch instructing message to the wireless communication terminal 200-1 via the first wireless communication unit 120. Specifically, for example, the information providing unit 169 transmits the switch instructing message that includes the second network information to the wireless communication terminal 200-1 via the first wireless communication unit 120.

The switch is a switch from communication using tethering to communication by way of a wireless network. More specifically, for example, the switch is a switch from communication via the mobile communication terminal 100-1 to communication via a WLAN.

Note that the second network information may be transmitted via the second wireless communication unit 130 instead of being transmitted via the first wireless communication unit 120. More specifically, for example, the second network information may be transmitted in short-range wireless communication (for example, Bluetooth communication) instead of WLAN communication (direct communication).

As described above, the second network information is provided to the wireless communication terminal 200-1. Accordingly, the wireless communication terminal 200-1 can specify a wireless network to which it is connectable through an authentication procedure. As a result, for example, the wireless communication terminal 200-1 can promptly switch communication from communication using tethering to communication via the specified wireless network.

More specifically, for example, a device with the ANDSF generally provides information regarding a wireless network to a device that performs mobile communication, but does not provide the information to a device that does not perform mobile communication. In the embodiment of the present disclosure, the mobile communication terminal 100-1 provides at least part of the information to be provided to the wireless communication terminal 200-1 as described above. For this reason, even the wireless communication terminal 200-1 that is not provided with the information directly from a device with the ANDSF can specify a wireless network to which it is connectable through the authentication procedure.

Note that, when communication using tethering is being performed, the wireless communication terminal 200-1 can acquire information from the mobile communication terminal 100-1. Thus, provision of the second network information to the wireless communication terminal 200-1 is suitable especially for a switch from communication to tethering to communication via a wireless network (for example, a WLAN).

Provision of the Authentication Information

The information providing unit 169 provides, for example, the authentication information provided from the SIM 140 to another terminal device that performs the wireless communication. For example, the information providing unit 169 provides the authentication information to the wireless communication terminal 200-1.

IMSI and Identity

Note that, when EAP-AKA is used as an authentication scheme, for example, IMSI in authentication information is provided as a part of Identity as described below.

$$0<\text{IMSI}>@\text{wlan.mnc}<\text{MNC}>.\text{mcc}<\text{MCC}>.$$
$$\text{3gppnetwork.org} \quad [\text{Math. 1}]$$

Note that the IMSI includes a three-digit mobile country code (MCC), a two-digit or three-digit mobile network code (MNC), and a 10-digit mobile subscriber identification number (MSIN), and is expressed as follows.

$$<\text{MCC: 3 digits}><\text{MNC: 2or3 digits}><\text{MSIN: up to 10 digits}> \quad [\text{Math. 2}]$$

As an example, when the IMSI is 123456012345678, the Identity to be provided is expressed as follows.

$$0123456012345678@\text{wlan.mnc456.}$$
$$\text{mcc123.3gppnetwork.org} \quad [\text{Math. 3}]$$

<3.1.2. Configuration of a Wireless Communication Terminal>

Figure 7:
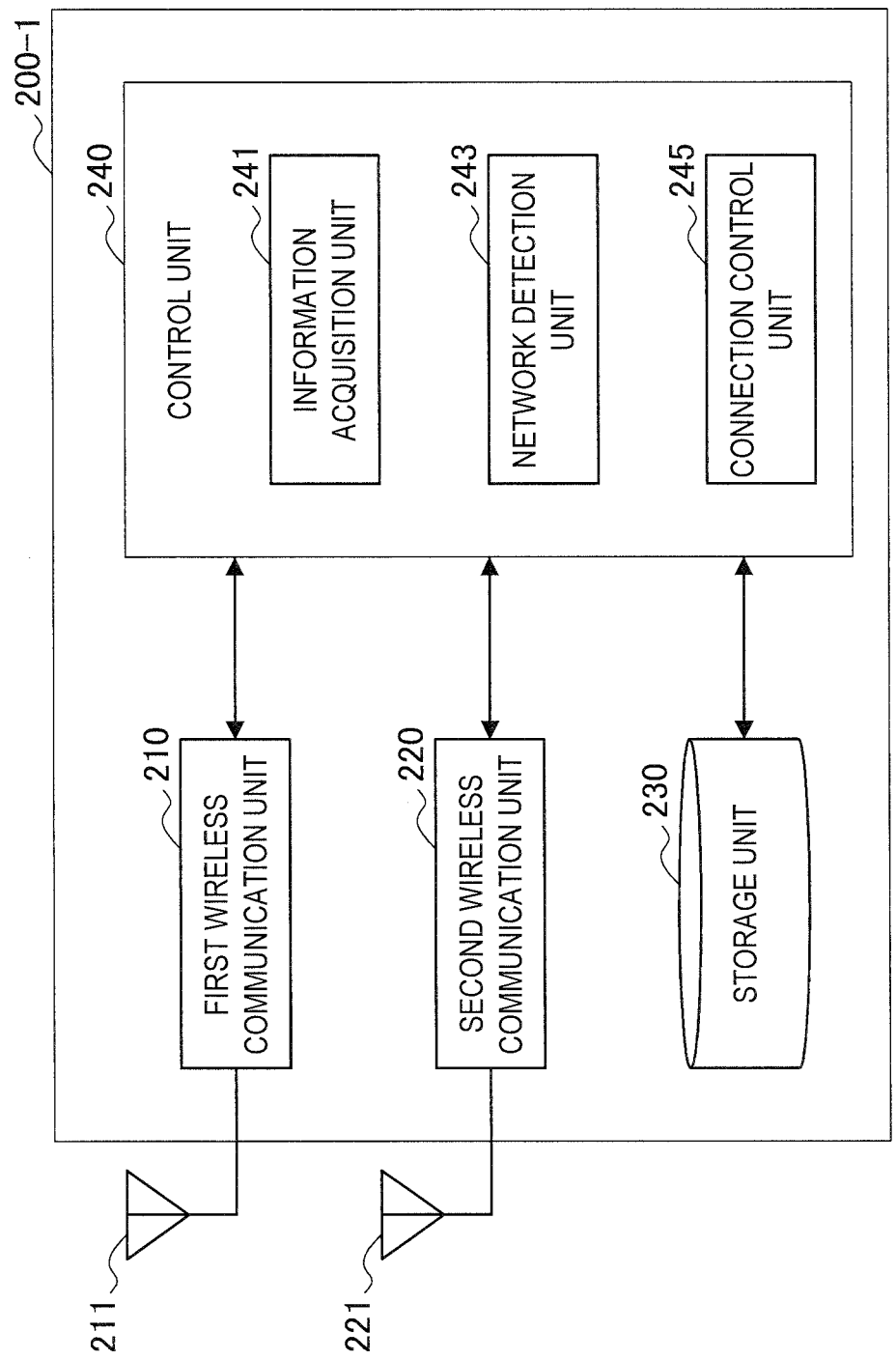
FIG. 7 is a block diagram showing an example of a configuration of a wireless communication terminal according to the first embodiment.

An example of a configuration of the wireless communication terminal 200-1 according to the first embodiment of the present disclosure will be described with reference to FIG. 7. FIG. 7 is a block diagram showing the example of the configuration of the wireless communication terminal 200-1 according to the first embodiment. Referring to FIG. 7, the wireless communication terminal 200-1 is provided with a first wireless communication unit 210, an antenna unit 211, a second wireless communication unit 220, an antenna unit 221, a storage unit 230, and a control unit 240.

(First Wireless Communication Unit 120)

The first wireless communication unit 120 performs wireless communication that is different from mobile communication. The wireless communication is, for example, WLAN communication. Specifically, for example, the WLAN communication is communication that conforms with any of WLAN standards such as IEEE 802.11a, 11b, 11g, 11n, 11ac and 11ad.

For example, the first wireless communication unit 210 receives signals from the access point 51 and transmits signals to the access point 51. In addition, for example, in cases of direct communication, the first wireless communication unit 2100 receives signals from another terminal device and transmits signals to the other terminal device. The other terminal device is, for example, the mobile communication terminal 100.

(Antenna Unit 211)

The antenna unit 211 radiates, as radio waves, signals output from the first wireless communication unit 210 to the space. In addition, the antenna unit 211 converts radio waves of the space into signals and outputs the signals to the first wireless communication unit 210.

(Second Wireless Communication Unit 220)

The second wireless communication unit 220 performs wireless communication that is different from mobile communication. The wireless communication is, for example, short-range wireless communication, and includes Bluetooth communication (i.e., communication that conforms with the Bluetooth standard) as an example. The second wireless communication unit 220, for example, receives signals from another terminal device and transmits signals to the other terminal device. The other terminal device is, for example, the mobile communication terminal 100.

(Storage Unit 230)

The storage unit 230 temporarily or permanently stores programs and data for operations of the wireless communication terminal 200.

(Control Unit 240)

The control unit 240 provides various functions of the wireless communication terminal 200-1. The control unit 240 includes an information acquisition unit 241, a network detection unit 243, and a connection control unit 245.

(Information Acquisition Unit 241)

Acquisition of Second Network Information

The information acquisition unit 241 acquires the second network information.

As described above, the second network information is information regarding one or more wireless networks (for example, one or more WLANs) for the wireless communication. In addition, each of the one or more wireless networks is a wireless network for the wireless communication (for example, a WLAN) to which the wireless communication terminal 200-1 is connectable through the authentication procedure.

In addition, the second network information is information provided from the mobile communication terminal 100-1 to the wireless communication terminal 200-1. Furthermore, the second network information is at least partial information of the information provided from the network information providing device 300-1 to the mobile communication terminal 100-1 (i.e., the first network information).

When provided from the mobile communication terminal 100-1 to the wireless communication terminal 200-1, the second network information is, for example, stored in the storage unit 230. Then, the information acquisition unit 241 acquires the second network information from the storage unit 230.

Acquisition of Authentication Information

As described above, for example, the mobile communication terminal 100-1 provides authentication information provided from the SIM 140 of the mobile communication terminal 100-1 to the wireless communication terminal 200-1. Then, the information acquisition unit 241 acquires the authentication information provided from the mobile communication terminal 100-1.

(Network Detection Unit 243)

The network detection unit 243 detects the wireless network for the wireless communication.

For example, the network detection unit 243 detects the wireless network (for example, the WLAN) by scanning a channel for the wireless network for the wireless communication (for example, the WLAN).

Detection Based on the Second Network Information

The network detection unit 243, for example, detects the one wireless network for the wireless communication based on the second network information.

Specifically, for example, the network detection unit 243 scans one of one or more wireless networks indicated by the second network information. For example, when the second network information is information regarding one wireless network, the network detection unit 243 scans the one wireless network. On the other hand, when the second network information is information regarding two or more wireless networks, the network detection unit 243 scans one (for example, the wireless network with the highest priority) of the two or more wireless networks.

In addition, as described above, for example, the second network information includes information indicating the channel for each of the one or more wireless networks. In this case, the network detection unit 243 performs the scanning based on the information indicating the channel. Accordingly, the wireless network can be detected more quickly.

(Connection Control Unit 245)

The connection control unit 245 causes the wireless communication terminal 200-1 to be connected to one wireless network of the one or more wireless networks through the authentication procedure.

For example, the one wireless network is one wireless network detected by the network detection unit 243.

As a specific process, for example, the connection control unit 245 performs the authentication procedure. As described above, for example, the authentication procedure includes an authentication procedure in which the authentication information provided from the SIM 140 of the mobile communication terminal 100-1 is used (i.e., SIM authentication procedure). In this case, the connection control unit 245 performs the authentication procedure using the authentication information provided from the mobile communication terminal 100-1 (the authentication information provided from the SIM 140). Then, if authentication succeeds in the authentication procedure, the wireless communication terminal 200-1 is connected to the one wireless network.

As an example, the authentication procedure is a procedure for authentication based on EAP-AKA. Note that the authentication procedure may be another authentication procedure. The authentication procedure may be, for example, a procedure for authentication based on EAP-AKA' or may be a procedure for authentication based on EAP-SIM.

In this manner, connection to a connectable wireless network is attempted through the authentication procedure. Accordingly, the wireless communication terminal 200-1 can promptly switch communication from communication using tethering to communication via the wireless network.

In addition, if the SIM authentication procedure is used, it is possible to lessen efforts of a user of the wireless communication terminal 200-1 in, for example, connection of the wireless communication terminal 200-1 which does not perform mobile communication on a mobile communication network to a wireless network (WLAN). For example, it is possible to lessen an effort of inputting a password or the like. Thus, it is possible to promptly switch communication. Note that it is also possible to lessen efforts of the user to use an authentication procedure using an electronic certificate as in the case in which the SIM authentication procedure is used.

<3.1.3. Configuration of a Network Information Providing Device>

Figure 8:
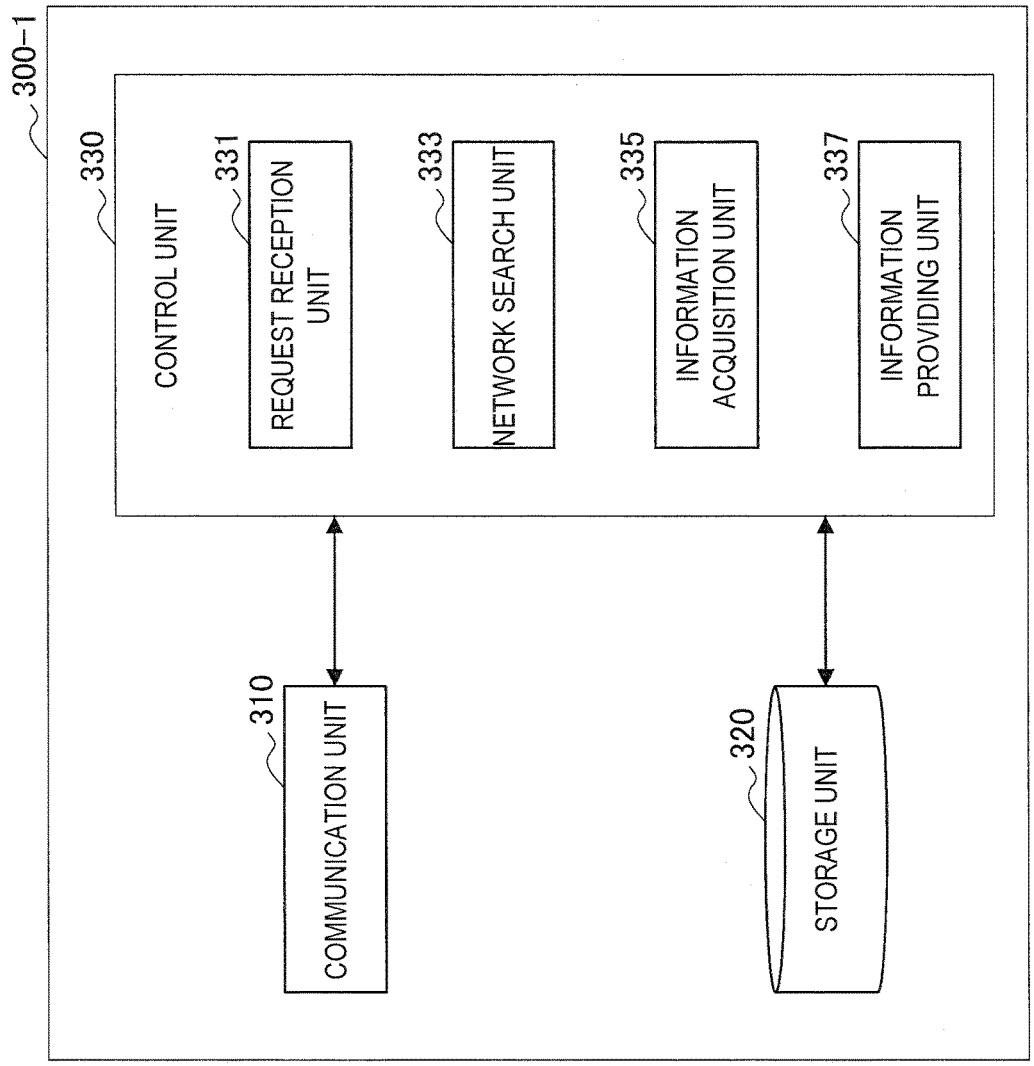
FIG. 8 is a block diagram showing an example of a configuration of a network information providing device according to the first embodiment.

An example of a configuration of the network information providing device 300-1 according to a second embodiment of the present disclosure will be described with reference to FIGS. 8 and 9. FIG. 8 is a block diagram showing the example of the configuration of the network information providing device 300-1 according to the first embodiment. Referring to FIG. 8, the network information providing device 300-1 is provided with a communication unit 310, the storage unit 320, and the control unit 330.

(Communication Unit 310)

The communication unit 310 communicates with another device. For example, the communication unit 310 communicates with another device (for example, the mobile communication terminal 100-1) via the mobile communication network 30.

(Storage Unit 320)

The storage unit 320 temporarily or permanently stores programs and data for operations of the network information providing device 300-1.

(Control Unit 330)

The control unit 330 provides various functions of the network information providing device 300-1. The control unit 330 includes a request reception unit 331, a network search unit 333, an information acquisition unit 335, and an information providing unit 337.

(Request Reception Unit 331)

Reception of a Request

The request reception unit 331 receives a request for information provision made to the network information providing device 300-1.

The request is made by, for example, the mobile communication terminal 100-1. Specifically, the mobile communication terminal 100-1, for example, transmits a network information requesting message to the network information providing device 300-1. Then, the communication unit 310 receives the network information requesting message. Then, the request reception unit 331 acquires the network information requesting message, and asks the network search unit 333 for a search for a wireless network. In this manner, the request reception unit 331 receives the request.

Acquisition of Information for Specifying a Wireless Network

In addition, the request reception unit 331, for example, acquires information for specifying a wireless network along with the request.

For example, the mobile communication terminal 100-1 provides information for specifying a wireless network to the network information providing device 300-1 upon the request. Specifically, for example, the mobile communication terminal 100-1 transmits a network information requesting message including the information to the network information providing device 300-1. Then, the communication unit 310 receives the network information requesting message. Then, the request reception unit 331 acquires the network information requesting message, and asks the network search unit 333 for a search for a wireless network that corresponds to the information included in the network information requesting message.

The information for specifying a wireless network includes, for example, information such as network type information and position-related information, and is, as an example, the information shown in FIG. 5.

(Network Search Unit 333)

The network search unit 333 searches for a wireless network.

For example, the request reception unit 331 asks the network search unit 333 for a search of a wireless network according to a request for information provision made to the network information providing device 300-1 as described above. Then, the network search unit 333 searches all wireless networks that are search objects for a wireless network in accordance with the request in response to the asking. Note that information regarding all the wireless networks that are search objects (hereinafter referred to as "search object information") is stored in, for example, the storage unit 320, and the network search unit 333 searches for a wireless network in accordance with the request using the search object information.

More specifically, for example, the request reception unit 331 acquires the information for specifying a wireless network (for example, network type information, position-related information, time information, and the like) along with the request as described above. Then, the network search unit 333 searches for a wireless network that corresponds to the information for specifying a wireless network as the wireless network in accordance with the request. A specific example of this subject will be described below with reference to FIG. 9.

FIG. 9 is an explanatory diagram for describing an example of a search for information regarding a wireless network. Referring to FIG. 9, search object information is shown. In this example, the search object information includes, as information items, IDs, network type information, network property information, communication area information, available time information, and priority information of wireless networks. In addition, the network property information includes identification information of access points of the wireless networks (HESSID, ESSID, and BSSID), and information indicating channels for the wireless networks. Here, for example, the network type information (WLAN), the position information (LAT_A and LON_A), and time information (MONDAY: 1:30 PM) shown in FIG. 5 are provided along with the request for information provision. Then, the network search unit 333 searches all the wireless networks that are search objects for a wireless network that corresponds to the provided network type information, position information, and time information. For example, both network types of the two wireless networks shown in FIG. 9 are WLAN, and both of the two wireless networks are available on MONDAY at 1:30 PM. On the other hand, the wireless network among the two wireless networks shown in FIG. 9 whose ID is 1 has the communication area that includes the position indicated by LAT_A and LON_A, but the wireless network whose ID is 2 does not have the communication area that includes that position. Thus, the wireless network whose ID is 1 is included in the search result, and the wireless network whose ID is 2 is not included in the search result.

Note that any among all the wireless networks that are search objects is a wireless network, for example, to which the mobile communication terminal 100-1 and the wireless communication terminal 200-1 are connectable through the authentication procedure. As an example, all the wireless networks that are search objects are wireless networks operated by the operator of the mobile communication network 30. Thus, any of the wireless networks included in the search result is a wireless network to which the mobile communication terminal 100-1 and the wireless communication terminal 200-1 are connectable through the authentication procedure.

(Information Acquisition Unit 335)

The information acquisition unit 335 acquires information regarding a wireless network (i.e., first network information) that is different from the mobile communication network 30. More specifically, the first network information is information regarding at least one wireless network for wireless communication that is different from the mobile communication.

First Network Information

The at least one wireless network is a wireless network included in, for example, the result of the search by the network search unit 333. Thus, each of the at least one wireless network is, for example, a wireless network to which the mobile communication terminal 100-1 and the wireless communication terminal 200-1 are connectable through the authentication procedure. In addition, each of the at least one wireless network is, for example, a wireless network having a communication area that corresponds to the position of the mobile communication terminal 100-1 or the wireless communication terminal 200-1. In addition, each of the at least one wireless network is, for example, a wireless network having an available time in terms of time. In addition, each of the at least one wireless network is, for example, a WLAN.

Note that the first network information includes information regarding one or more wireless networks for the wireless communication (for example, one or more WLANs) (i.e., second network information). The one or more wireless networks for the wireless communication (for example, one or more WLANs) are wireless networks for the wireless communication to which the wireless communication terminal 200-1 is connectable through the authentication procedure.

Example of Specific Information

The information acquisition unit 335 acquires, for example, the first network information shown in FIG. 6. Specifically, as described with reference to FIG. 9, the search result includes, for example, the wireless network whose ID is 1. Thus, the information acquisition unit 335 acquires the information (the first network information) regarding the wireless network whose ID is 1 from stored information (for example, in the storage unit 320) regarding the wireless network. As a result, the first network information shown in FIG. 6 is acquired.

(Information Providing Unit 337)

The information providing unit 337 provides the first network information to a terminal device that performs mobile communication. The information providing unit 337 provides the first network information to, for example, the mobile communication terminal 100-1. More specifically, the information providing unit 337, for example, transmits the first network information to the mobile communication terminal 100-1 via the communication unit 310.

3.2. Process Flow

Next, an example of a communication control process according to the first embodiment will be described with reference to FIGS. 10 to 15.
(Overall Process Flow)
FIG. 10 is a sequence diagram showing an example of a schematic flow of an entire communication control process according to the first embodiment.

As a premise, for example, the mobile communication terminal 100-1 and the wireless communication terminal 200-1 are connected to each other in first wireless communication (for example, WLAN communication (direct communication)). In addition, the mobile communication terminal 100-1 is connected to the mobile communication network 30. Furthermore, the wireless communication terminal 200-1 performs communication using tethering by using the tethering function of the mobile communication terminal 100-1.

First, the mobile communication terminal 100-1 transmits a network information requesting message to the network information providing device 300-1 according to occurrence of any of one or more predetermined events (S1010). The network information requesting message includes information for specifying a wireless network (for example, network type information, position-related information, time information, and the like).

Then, when the network information providing device 300-1 included on the mobile communication network 30 receives the network information requesting message, the network information providing device 300-1 executes a network information search process (S1020). In other words, the network information providing device 300-1 searches for a wireless network that corresponds to the information (for example, network type information, position-related information, time information, and the like) for specifying the wireless network. Then, the search result includes, for example, at least one wireless network.

The network information providing device 300-1 thereafter provides information regarding the at least one wireless network included in the search result (i.e., first network information) to the mobile communication terminal 100-1 (S1030). Thereby, the mobile communication terminal 100-1 acquires the first network information.

Then, the mobile communication terminal 100-1 executes a network detection process (S1040). In other words, the mobile communication terminal 100-1 detects a wireless network based on the first network information. More specifically, for example, the mobile communication terminal 100-1 scans the at least one wireless network indicated by the first network information. As a result, for example, one or more wireless networks are detected from the at least one wireless network.

The mobile communication terminal 100-1 thereafter acquires information regarding the one or more detected wireless networks (second network information), and transmits a switch instructing message including the information (second network information) to the wireless communication terminal 200-1 (S1050). Then, the wireless communication terminal 200-1 receives the switch instructing message, and thereby acquires the second network information.

Then, the mobile communication terminal 100-1 and the wireless communication terminal 200-1 perform a connection switch process for switching from connection of the first wireless communication (WLAN communication (direct communication)) to connection of second wireless communication (Bluetooth communication) (S1060). As a result, the mobile communication terminal 100-1 and the wireless communication terminal 200-1 are connected to each other in the second wireless communication (Bluetooth communication).

Further, the wireless communication terminal 200-1 performs a connection process for connection to one wireless network (i.e., wireless network 50) among the one or more wireless networks (S1100). As a result, the wireless communication terminal 200-1 is connected to the wireless network 50.
(Network Information Search Process: S1020)
FIG. 11 is a flowchart showing an example of a schematic flow of the network information search process according to the first embodiment. The network information search process corresponds to the process of Step S1020 shown in FIG. 10.

First, the network search unit 333 of the network information providing device 300 selects a wireless network from all wireless networks that are search objects (S1021).

Then, the network search unit 333 determines whether the network type of the selected wireless network coincides with the network type included in the request (S1022). In addition, the network search unit 333 determines whether the communication area of the selected wireless network includes the position indicated by the position information included in the request (S1023). In addition, the network search unit 333 determines whether the available time of the selected wireless network includes the current time (S1024). Then, if all the results of the determinations are positive (YES in S1022, S1023, and S1024), the network search unit 333 adds the selected wireless network to the search result (S1025). If not, the selected wireless network is not added to the search result.

Figure 12:
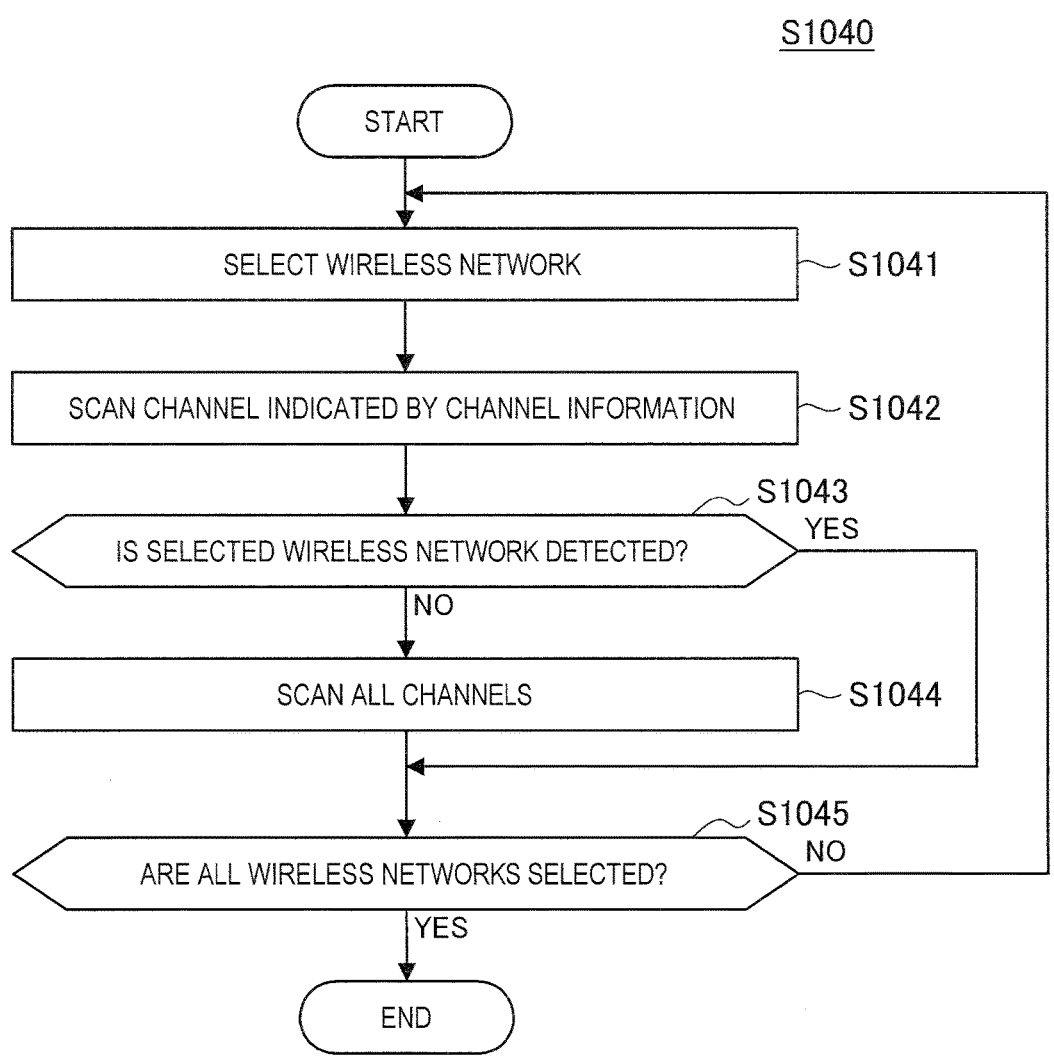
FIG. 12 is a flowchart showing an example of a schematic flow of a network detection process by a mobile communication terminal according to the first embodiment.

If all the wireless networks are selected thereafter (YES in S1026), the process ends. If not (NO in S1026), the process returns to Step S1021, and the above processes are repeated.
(Network Detection Process: S1040)
FIG. 12 is a flowchart showing an example of a schematic flow of the network detection process by the mobile communication terminal 100-1 according to the first embodiment. The network detection process corresponds to the process of Step S1040 shown in FIG. 10.

The network detection unit 165 selects a wireless network from at least one wireless network indicated by the first network information (S1041).

Then, the network detection unit 165 scans a channel indicated by channel information of the wireless network (S1042).

If the selected wireless network is not detected thereafter (S1043: No), the network detection unit 165 scans all channels (S1044). If the selected wireless network is detected (YES in S1043), scanning of all the channels is not performed.

Figure 13:
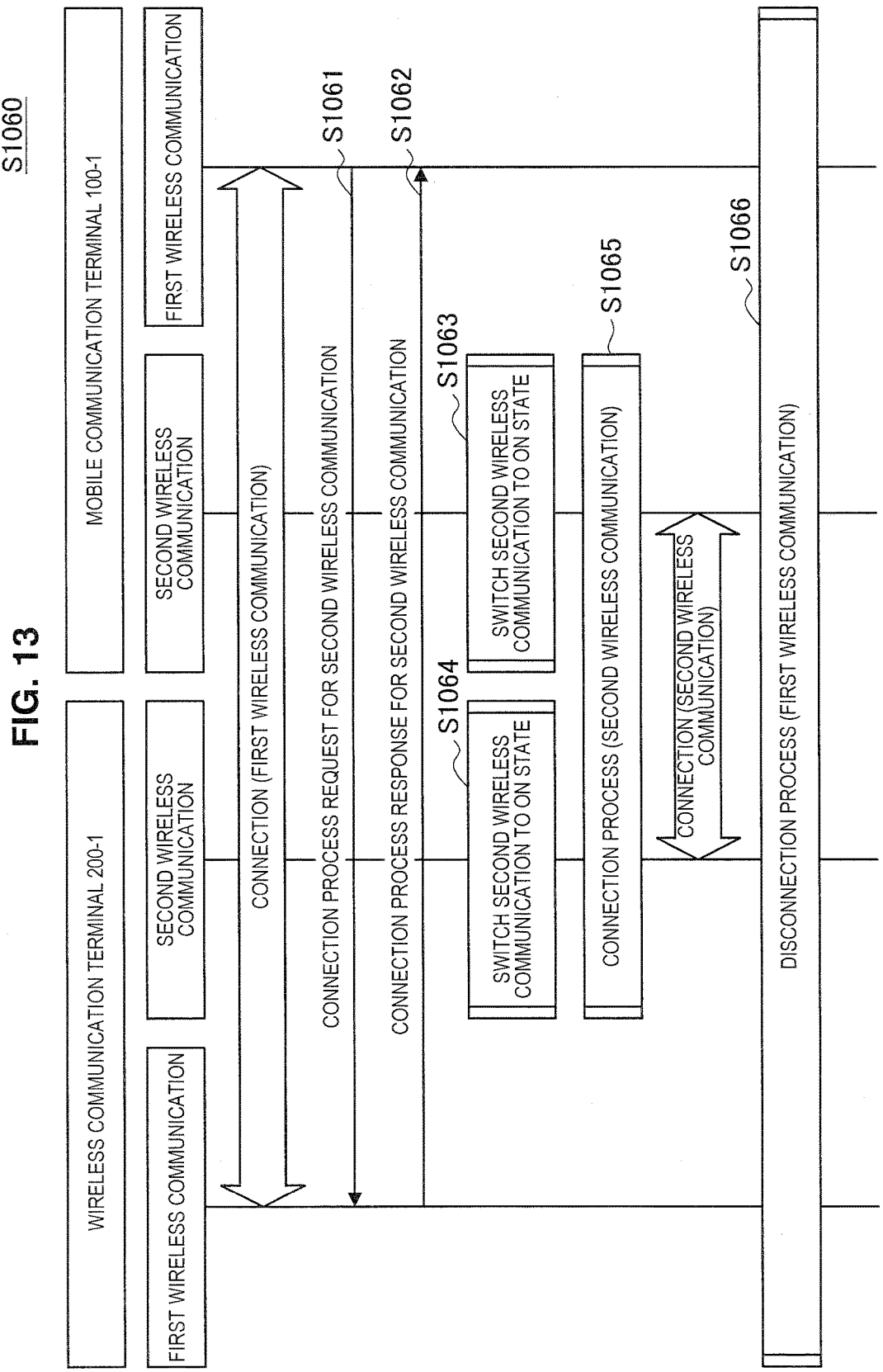
FIG. 13 is a sequence diagram showing an example of a schematic flow of a connection switch process according to the first embodiment.

Then, if all the wireless networks (i.e., all the at least one wireless network) indicated by the first network information are selected (YES in S1045), the process ends. If not, the process returns to Step S1041, and the above processes are repeated.
(Connection Switch Process: S1060)
FIG. 13 is a sequence diagram showing an example of a schematic flow of the connection switch process according to the first embodiment. The connection switch process is a process for switching connection between the mobile communication terminal 100-1 and the wireless communication terminal 200-1 to switch from connection of the first wireless communication (for example, WLAN communication) to connection of the second wireless communication (for example, Bluetooth communication). In addition, the connection switch process corresponds to the process of Step S1060 shown in FIG. 10.

As a premise, for example, the mobile communication terminal 100-1 and the wireless communication terminal 200-1 are connected to each other in the first wireless communication (for example, WLAN communication (direct communication)).

First, the mobile communication terminal 100-1 transmits a connection process requesting message with regard to the second wireless communication to the wireless communication terminal 200-1 (S1061). Then, the wireless communication terminal 200-1 transmits a connection process responding message with regard to the second wireless communication to the mobile communication terminal 100-1 (S1062).

The mobile communication terminal 100-1 and the wireless communication terminal 200-1 thereafter switch the second wireless communication to an on state (S1063 and S1064). Then, the mobile communication terminal 100-1 and the wireless communication terminal 200-1 execute a connection process for connection of the second wireless communication (Bluetooth communication) (S1065). As a result, the mobile communication terminal 100-1 and the wireless communication terminal 200-1 are connected to each other in the second wireless communication (Bluetooth communication).

Furthermore, the mobile communication terminal 100-1 and the wireless communication terminal 200-1 execute a disconnection process for disconnecting the connection of the first wireless communication (WLAN (direct communication)) (S1066). As a result, the connection of the first wireless communication between the mobile communication terminal 100-1 and the wireless communication terminal 200-1 is disconnected. After the disconnection process, the mobile communication terminal 100-1 (for example, the control unit 160) may switch the function of the first wireless communication from an on-state to an off-state. In other words, the mobile communication terminal 100-1 may stop an operation of software or hardware for the first wireless communication. Accordingly, for example, the mobile communication terminal 100-1 transmits no beacon of the first wireless communication, and as a result, power consumption of the mobile communication terminal 100-1 can be reduced. Alternatively, after the disconnection process, the mobile communication terminal 100-1 (for example, the control unit 160) may further lengthen a transmission interval of beacons of the first wireless communication. Accordingly, for example, power consumption of the mobile communication terminal 100-1 can be reduced, and re-connection of the wireless communication terminal 200-1 to the mobile communication terminal 100-1 can be quickly performed.

Note that the connection process requesting message with regard to the second wireless communication may be transmitted from the wireless communication terminal 200-1 to the mobile communication terminal 100-1, instead of being transmitted from the mobile communication terminal 100-1 to the wireless communication terminal 200-1. In this case, the connection process responding message with regard to the second wireless communication may be transmitted from the mobile communication terminal 100-1 to the wireless communication terminal 200-1, instead of being transmitted from the wireless communication terminal 200-1 to the mobile communication terminal 100-1.

(Wireless Network Connection Process: S1100)

Figure 14A:
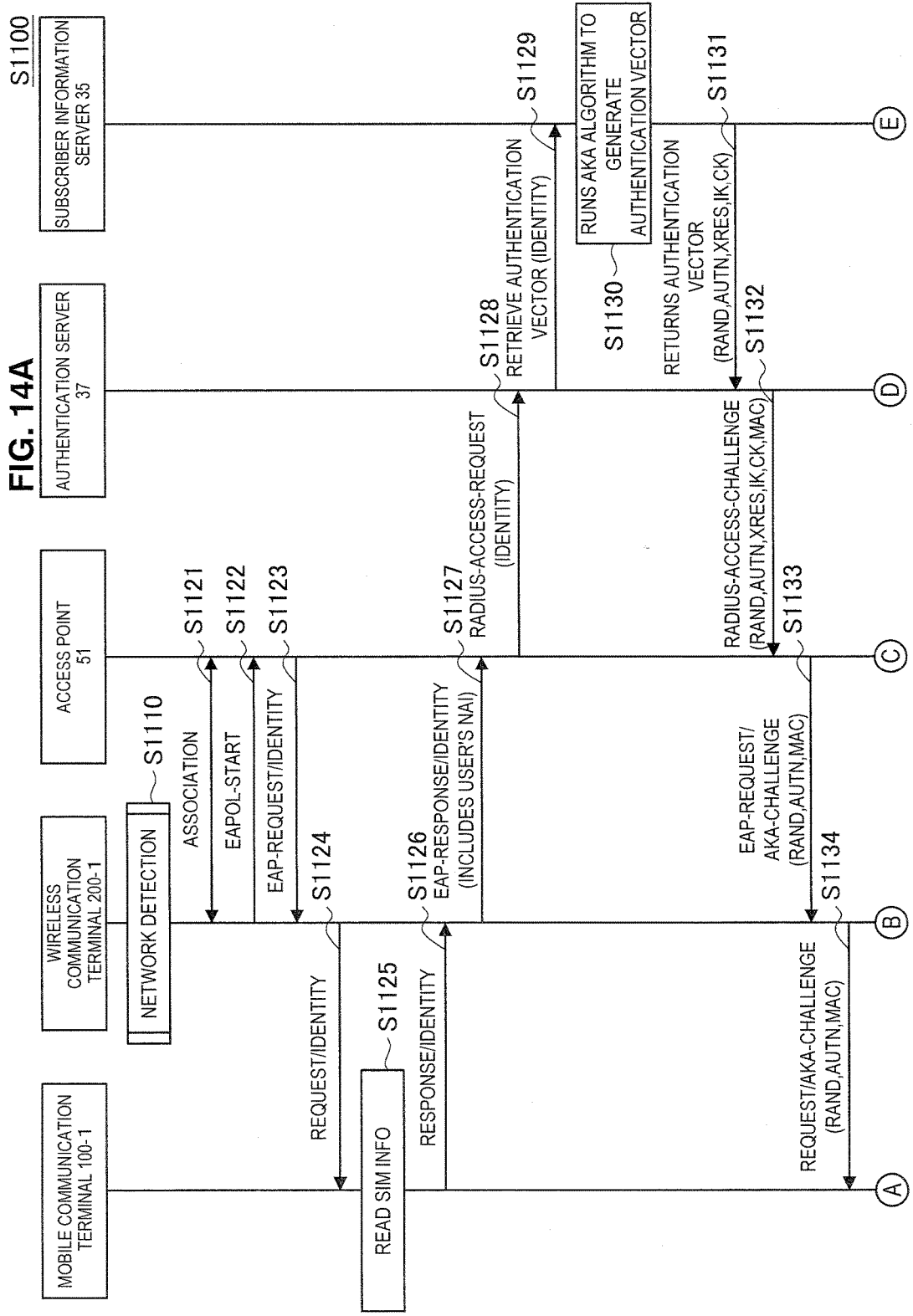
FIG. 14A is (the first half of) a sequence diagram showing an example of a schematic flow of a connection process according to the first embodiment.

FIGS. 14A and 14B are sequence diagrams showing an example of a schematic flow of the connection process according to the first embodiment. The connection process is a connection process for connection to the wireless network (for example, a WLAN). In this example, the connection process is a connection process through an authentication procedure based on EAP-AKA.

First, the wireless communication terminal 200-1 performs a network detection process (S1110). Specifically, the wireless communication terminal 200-1 detects one wireless network (the wireless network 50) indicated by the second network information.

The access point 51 of the wireless network 50 and the wireless communication terminal 200-1 thereafter perform association (Association) (S1121). Accordingly, transmission and reception of information for the authentication procedure becomes possible.

Then, the wireless communication terminal 200-1 transmits an EAPoL-Start message to the access point 51 (S1122).

The access point 51 transmits an EAP-Request/Identity message to the wireless communication terminal 200-1 (S1123). Then, the wireless communication terminal 200-1 transmits a Request/Identity message to the mobile communication terminal 100-1 (S1124). Note that the EAP-Request/Identity message is a message requesting generation of Identity that is necessary for authentication of EAP-AKA.

The mobile communication terminal 100-1 acquires information (for example, an IMSI) provided by the SIM 140 and generates the Identity (S1125). Then, the mobile communication terminal 100-1 transmits a Response/Identity message that includes the generated Identity to the wireless communication terminal 200-1 (S1126). Then, the wireless communication terminal 200-1 transfers an EAP-Response/Identity message to the access point 51 (S1127).

The access point 51 thereafter transmits a RADIUS-Access-Request message that includes the Identity to the authentication server 37 (S1128).

Then, the authentication server 37 requests authentication vectors corresponding to the Identity from the subscriber information server 35 (S1129).

Then, the subscriber information server 35 generates authentication vectors corresponding to the Identity (S1130). Note that the authentication vectors refer to a set of information necessary for authenticating a terminal device. When an authentication scheme is EAP-AKA, the authentication vectors include a RAND, an AUTN, an XRES, an IK and a CK. The RAND is a random value used as a challenge. The AUTN is a value for a terminal device to authenticate a network. The XRES is a response value expected from a challenge. The IK is a key for verifying integrity of a message. The CK is a key for encrypting a message.

The subscriber information server 35 thereafter transmits the generated authentication vectors to the authentication server 37 (S1131).

Further, the authentication server 37 transmits a RAIDUS-Access-Challenge message to the access point 51 (S1132) in response to the RADIUS-Access-Request message (S1128). Note that the RAIDUS-Access-Challenge message includes a message authentication code (MAC) in addition to the authentication vectors. The MAC is information for verifying the integrity of the message and is generated by the authentication server 37.

The access point 51 thereafter transmits an EAP-Request/ AKA-Challenge message to the wireless communication terminal 200-1 (S1133). The EAP-Request/AKA-Challenge message includes the RAND, the AUTN, and the MAC. The XRES, the IK, and the CK are retained by the access point 51 and are not transmitted to the wireless communication terminal 200-1.

Then, the wireless communication terminal 200-1 transmits a Request/AKA-Challenge message to the mobile communication terminal 100-1 (S1134). The Request/AKA-Challenge message is a message requesting the mobile communication terminal 100-1 to generate a response and session keys (IK and CK).

The mobile communication terminal 100-1 (or the SIM 140) thereafter executes an authentication algorithm (AKA algorithm) based on the information included in the Request/ AKA-Challenge message (the RAND, the AUTN, and the MAC) (S1135). Accordingly, verification of the integrity of the message, authentication of a wireless network, and generation of a response to a challenge, the MAC, and the session keys are performed.

Then, the mobile communication terminal 100-1 transmits a Response/AKA-Challenge message to the wireless communication terminal 200-1 (S1136). The Response/ AKA-Challenge message includes the generated response, MAC, and session keys.

The wireless communication terminal 200-1 thereafter transmits an EAP-Response/AKA-Challenge message to the access point 51 (S1137) in response to the EAP-Request/ AKA-Challenge message (S1133). The EAP-Response/ AKA-Challenge message includes the response and the MAC transmitted in S1136.

Then, the access point 51 transmits a RADIUS-Access-Request message (S1138). The RADIUS-Access-Request message includes the response and the MAC transmitted in S1137.

The authentication server 37 performs verification of the coincidence of the response and the XRSS and verification of the integrity of the message based on the MAC (S1139).

The authentication server 37 thereafter transmits a RADIUS-Access-Accept message to the access point 51 (S1140). The RADIUS-Access-Accept message is a message indicating permission for connection since a terminal device (i.e., the wireless communication terminal 200-1) that is subject to the authentication procedure is a legitimate user.

The access point 51 transmits an EAP-Success message to the wireless communication terminal 200-1 (S1141). The EAP-Success message is a message indicating success in authentication. In addition, the access point 51 transmits an EAPoL-Key message to the wireless communication terminal 200-1 (S1142). The EAPoL-Key message includes a key for encrypted communication used between the wireless communication terminal 200-1 and the access point 51.

The connection process is performed as described above. As a result, the wireless communication terminal 200-1 is connected to the wireless network 50.

(Network Detection Process: S1110)

Figure 15:
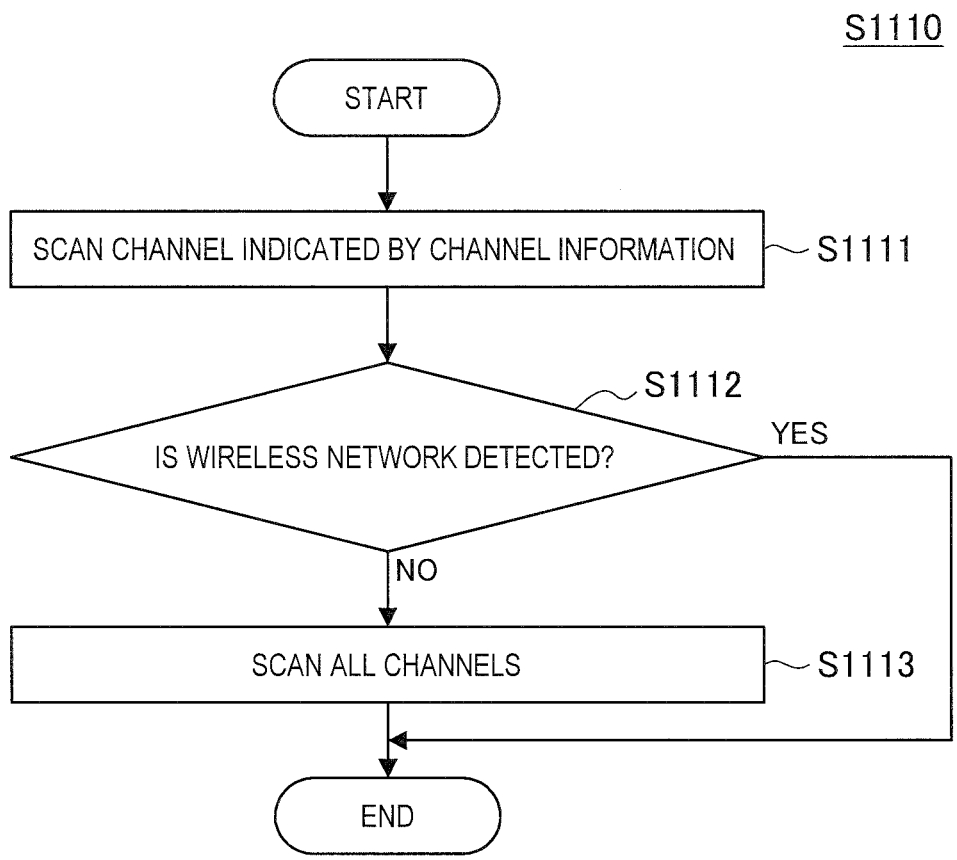
FIG. 15 is a flowchart showing an example of a schematic flow of a network detection process by a wireless communication terminal according to the first embodiment.

FIG. 15 is a flowchart showing an example of a schematic flow of the network detection process by the wireless communication terminal 200-1 according to the first embodiment. The network detection process corresponds to the process of Step S1110 shown in FIG. 14.

The network detection unit 165 scans a channel indicated by the channel information of one wireless network indicated by the second network information (S1111).

If the one wireless network is not detected thereafter (No in S1112), the network detection unit 165 scans all channels (S1113). Then, the process ends. On the other hand, if the one wireless network is detected (YES in S1112), scanning is not performed on all channels and the process ends.

3.3. Modified Example

Next, a modified example of the first embodiment will be described with reference to FIG. 16.

According to the first embodiment described above, for example, the mobile communication terminal 100-1 detects a wireless network, and provides information regarding the detected wireless network to the wireless communication terminal 200-1 as the second network information. In other words, information regarding a wireless network on which communication is actually possible is provided to the wireless communication terminal 200-1 as the second network information.

On the other hand, according to the modified example of the first embodiment, the mobile communication terminal 100-1 does not detect a wireless network, but provides information regarding a wireless network that has not been actually detected yet to the wireless communication terminal 200-1 as the second network information. Then, the wireless communication terminal 200-1 detects a wireless network indicated by the second network information. In other words, according to the modified example of the first embodiment, the wireless communication terminal 200-1, instead of the mobile communication terminal 100-1, detects a wireless network.

Accordingly, a load of the mobile communication terminal 100-1 is reduced. Thus, for example, power consumption of the mobile communication terminal 100-1 can be suppressed.

<3.3.1. Configuration of the Mobile Communication Terminal>

First, a configuration of the mobile communication terminal 100-1 according to the modified example of the first embodiment will be described. Note that only differences between the above-described example of the first embodiment and the modified example of the first embodiment will be described here.

(Network Detection Unit 165)

Detection Based on First Network Information

In the modified example of the first embodiment, the network detection unit 165 does not detect a wireless network based on the first network information.

(Second Information Acquisition Unit 167)

Technique of Acquiring Second Network Information

The one or more wireless networks indicated by the second network information is, for example, the same as the at least one wireless network indicated by the first network information.

The first information acquisition unit 163 causes, for example, the acquired first network information to be stored in the storage unit 150. Then, the second information acquisition unit 167 acquires the first network information stored in the storage unit 150 as the second network information.

As a specific example of the information, when the first network information shown in FIG. 6 is acquired by the first information acquisition unit 163, the second network information is the same information as the first network information shown in FIG. 6.

Note that the second network information may include only some information items among the information items included in the first network information. As an example, the second network information may include the network property information among the information items shown in FIG. 6, and may not include other information items of the information shown in FIG. 6.

In addition, the first network information may be information regarding a plurality of wireless networks (for example, a plurality of WLANs) for the wireless communication. In this case, the second wireless network may also be information regarding the plurality of wireless networks.

In addition, the one or more wireless networks indicated by the second network information may be a sub-set of the at least one wireless network indicated by the first network information. As an example, the second network information may be information regarding a predetermined number of wireless networks (for example, a predetermined number of wireless networks with higher priorities) among the plurality of wireless networks.

In addition, the mobile communication terminal 100-1 and the wireless communication terminal 200-1 may have different authentication capabilities. In this case, wireless networks to which the wireless communication terminal 200-1 is connectable through the authentication procedure may be some wireless networks among the at least one wireless network indicated by the first network information. In this case, the second network information may be information regarding the some wireless networks or may be information regarding a sub-set of the some wireless networks. Note that the first network information may include information regarding a wireless network to which the mobile communication terminal 100-1 is not allowed to be connected through an authentication procedure.

<3.3.2. Configuration of the Mobile Communication Terminal>

Next, a configuration of the wireless communication terminal 200-1 according to the modified example of the first embodiment will be described. Note that only differences between the above-described example of the first embodiment and the modified example of the first embodiment will be described here.

(Network Detection Unit 243)

Detection Based on the Second Network Information

The network detection unit 243, for example, detects the one or more wireless networks for the wireless communication based on the second network information.

Specifically, for example, the network detection unit 243 scans one or more wireless networks indicated by the second network information. For example, if the second network information is information regarding one wireless network, the network detection unit 243 scans the one wireless network. On the other hand, if the second network information is information regarding two or more wireless networks, for example, the network detection unit 243 scans the two or more wireless networks. In this case, the network detection unit 243 scans, for example, all of the two or more wireless networks. Alternatively, the network detection unit 243 may perform scanning sequentially from a wireless network with a higher priority among the two or more wireless networks until a wireless network is detected.

(Connection Control Unit 245)

The connection control unit 245 causes the wireless communication terminal 200-1 to be connected to one wireless network of the one or more wireless networks through the authentication procedure.

The one wireless network is, for example, one of the one or more wireless networks detected by the network detection unit 243. If one wireless network is detected, for example, the one wireless network is the one detected wireless network. On the other hand, if two or more wireless networks are detected, the one wireless network is one of the two or more detected wireless networks (for example, the wireless network with the highest priority).

<3.3.3. Process Flow>

Next, an example of a communication control process according to the modified example of the first embodiment will be described with reference to FIG. 16.

(Overall Process Flow)

Figure 16:
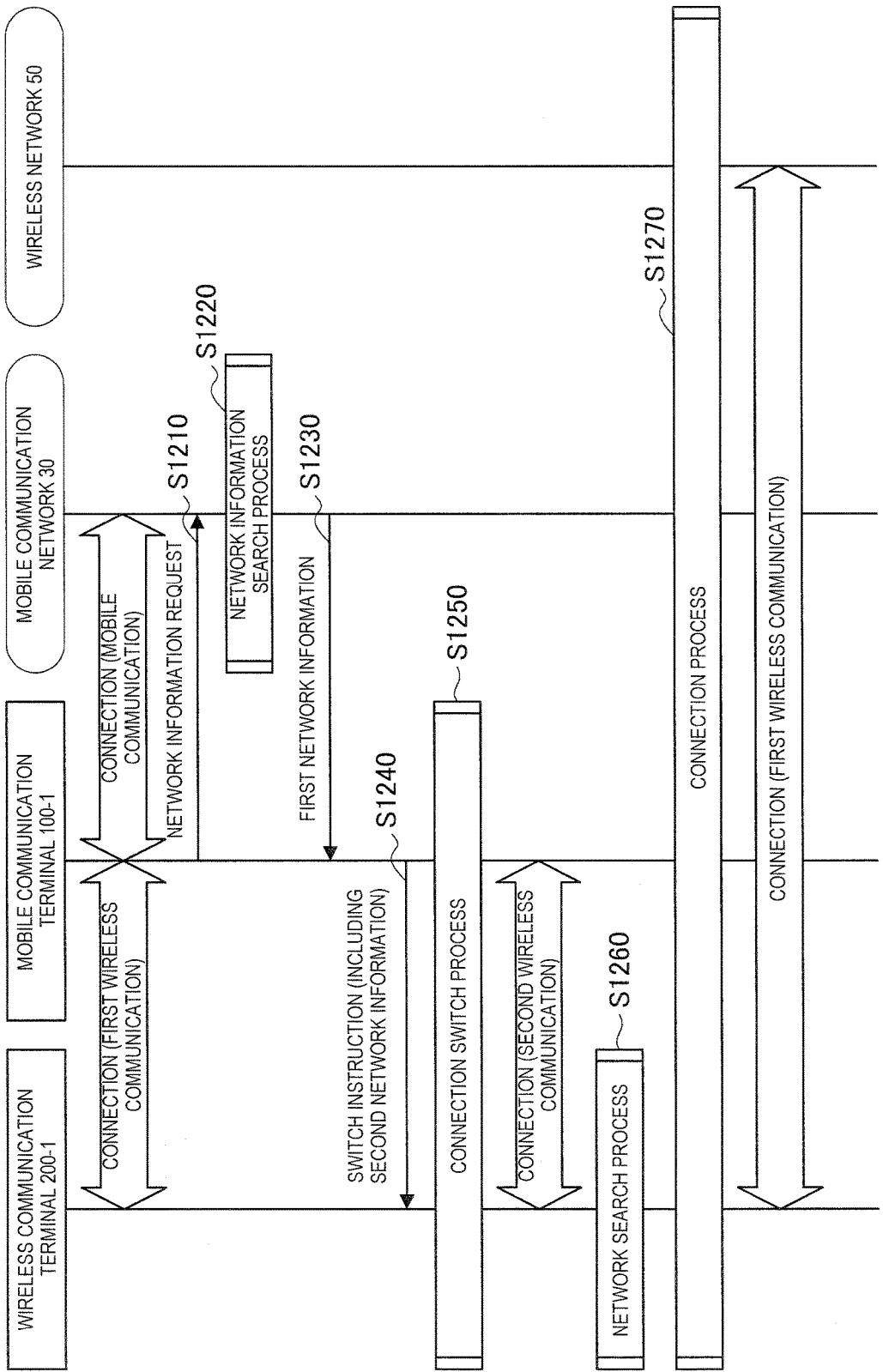
FIG. 16 is a sequence diagram showing an example of a schematic flow of an entire communication control process according to a modified example of the first embodiment.

FIG. 16 is a sequence diagram showing an example of a schematic flow of an entire communication control process according to the modified example of the first embodiment.

Note that Steps S1210, S1220, S1230, and S1250 of the communication control process according to the modified example of the first embodiment shown in FIG. 16 are the same as Steps S1010, S1020, S1030, and S1060 of the communication control process according to the first embodiment described with reference to FIG. 10. Thus, only Steps S1240, S1260, and S1270 will be described here.

The mobile communication terminal 100-1 acquires information regarding the one or more wireless networks (second network information), and transmits a switch instructing message including the information (second network information) to the wireless communication terminal 200-1 (S1240). Then, the wireless communication terminal 200-1 receives the switch instructing message, and thereby acquires the second network information. Note that the second network information is, for example, the same information as the first network information provided by the network information providing device 300-1.

Then, the wireless communication terminal 200-1 executes a network detection process (S1260). In other words, the wireless communication terminal 200-1 detects a wireless network based on the second network information. More specifically, for example, the wireless communication terminal 200-1 scans the one or more wireless networks indicated by the second network information. As a result, for example, at least one wireless network is detected from the one or more wireless networks.

Further, the wireless communication terminal 200-1 performs a connection process for connection to one wireless network (i.e., wireless network 50) among the at least one detected wireless network (S1270). As a result, the wireless communication terminal 200-1 is connected to the wireless network 50.

(Network Detection Process: S1260)

The network detection process (S1260) executed by the wireless communication terminal 200-1 is the same network detection process described with reference to FIG. 13.

(Wireless Network Connection Process: S1270)

The connection process (S1270) according to the modified example of the first embodiment is the same connection process described with reference to FIG. 14 except for the fact that the network detection process (S1110) is not included in the connection process described with reference to FIG. 14.

4. Second Embodiment

Next, a second embodiment of the present disclosure will be described with reference to FIGS. 17 to 23.

The network information providing device 300-1 provides information regarding at least one wireless network in the first embodiment described above. In addition, the mobile communication terminal 100-1 and/or the wireless communication terminal 200-1 selects one wireless network to which the wireless communication terminal 200-1 is connected from the at least one wireless network.

Meanwhile, in the second embodiment, a mobile communication terminal 100-2 or a wireless communication terminal 200-2 first detects one or more wireless networks. Then, a network information providing device 300-2 selects one wireless network to which the wireless communication terminal 200-2 is connected from the one or more detected wireless networks.

Accordingly, for example, an amount of information to be provided from the network information providing device 300-2 to the mobile communication terminal 100-2 can decrease more. As a result, radio resources of a mobile communication network 30, for example, can be saved.

4.1. Configuration of Each Device

First, configurations of devices according to the second embodiment of the present disclosure will be described with reference to FIGS. 17 to 20.

<4.1.1. Configuration of a Mobile Communication Terminal>

Figure 17:
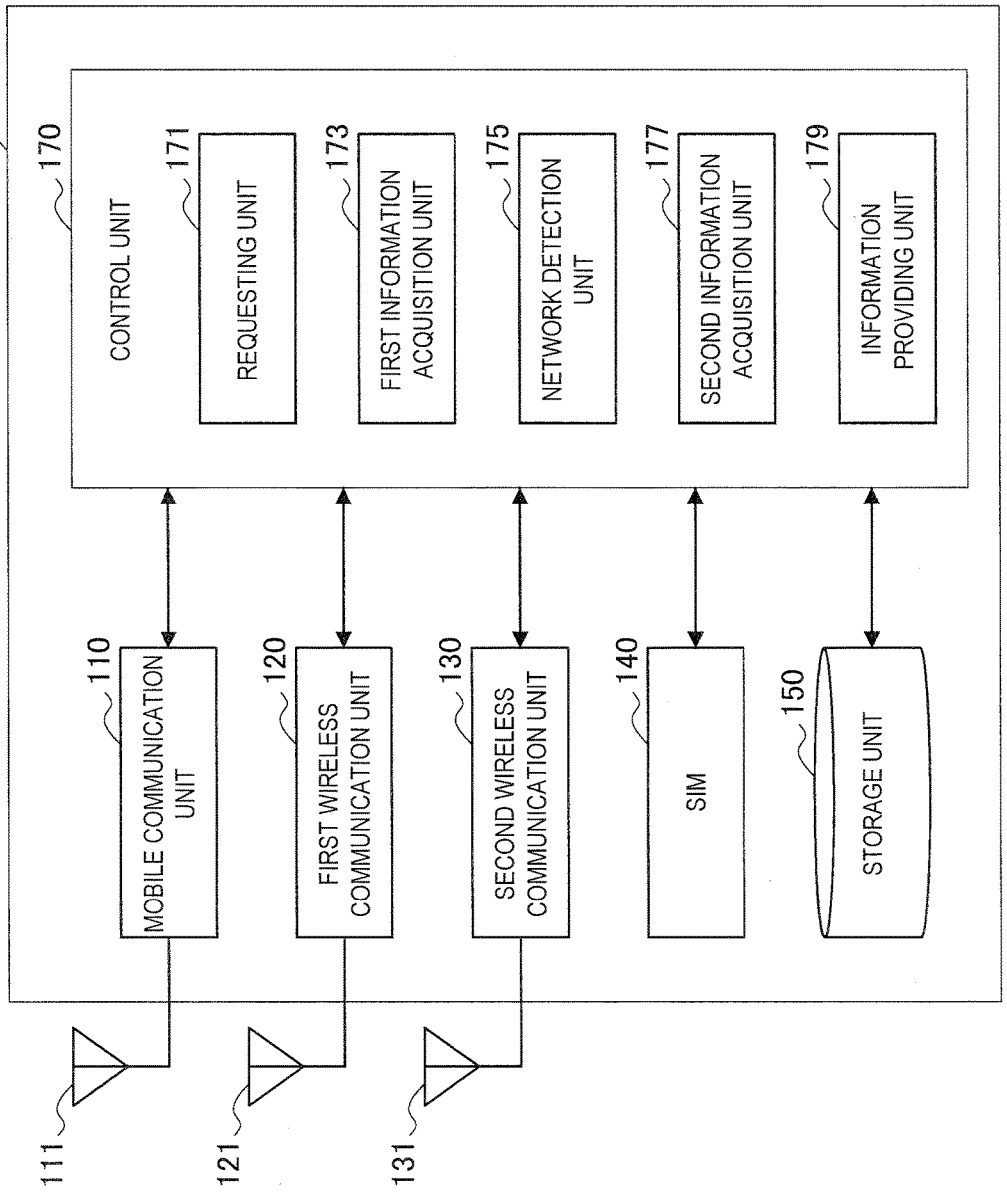
FIG. 17 is a block diagram showing an example of a configuration of a mobile communication terminal according to a second embodiment.

An example of a configuration of a mobile communication terminal 100-2 according to the second embodiment of the present disclosure will be described with reference to FIGS. 17 and 18. FIG. 17 is a block diagram showing the example of the configuration of the mobile communication terminal 100-2 according to the second embodiment. Referring to FIG. 17, the mobile communication terminal 100-2 is provided with a mobile communication unit 110, an antenna unit 111, a first wireless communication unit 120, an antenna unit 121, a second wireless communication unit 130, an antenna unit 131, a SIM 140, a storage unit 150, and a control unit 170.

Note that there is no particular difference with regard to the mobile communication unit 110, the antenna unit 111, the first wireless communication unit 120, the antenna unit 121, the second wireless communication unit 130, the antenna unit 131, the SIM 140, and the storage unit 150 between the first embodiment and the second embodiment. Thus, only the control unit 170 will be described here.

(Control Unit 170)

The control unit 170 provides various functions of the mobile communication terminal 100-2. The control unit 170 includes a requesting unit 171, a first information acquisition unit 173, a network detection unit 175, a second information acquisition unit 177, and an information providing unit 179.

(Network Detection Unit 175)

The network detection unit 175 detects a wireless network for wireless communication that is different from mobile communication.

For example, the network detection unit 175 detects the one or more wireless networks for the wireless communication (for example, the WLAN) by scanning a channel for the wireless network for the wireless communication (for example, the one or more WLANs).

Note that the network detection unit 175 detects, for example, a communicable wireless network rather than a specific wireless network. Specifically, the network detection unit 175 detects, for example, all communicable wireless networks. As a result, for example, one or more wireless networks are detected.

(Requesting Unit 171)

The requesting unit 171 requests provision of information from a network information providing device 300-2.

For example, the requesting unit 171 requests provision of information regarding a wireless network for wireless communication that is different from mobile communication from the network information providing device 300-2. More specifically, for example, the requesting unit 171 transmits a network information requesting message to the network information providing device 300-2 via the mobile communication unit 110.

Information Provided when Requested

The requesting unit 171 provides, for example, information for specifying a wireless network to the information providing device 300-2 upon the request for provision. Specifically, the requesting unit 171, for example, transmits a network information requesting message including the above information to the network information providing device 300-2 via the mobile communication unit 110.

Network Type Information

The requesting unit 171 provides, for example, information indicating the type of the wireless network for wireless communication that is different from mobile communication (i.e., network type information) to the network information providing device 300-1 upon the request for provision. This point is as described in the first embodiment, and thus overlapping description will be omitted.

Position-Related Information

The requesting unit 171 provides, for example, information regarding a position of the mobile communication terminal 100-2 or a wireless communication terminal 200-2 (i.e., position-related information) to the network information providing device 300-2 upon the request for provision. This point is also as described in the first embodiment, and thus overlapping description will be omitted.

Information Regarding Detected Wireless Networks

In the second embodiment, for example, the requesting unit 171 provides information regarding the one or more detected wireless networks to the network information providing device 300-2 upon of the request for provision.

Specifically, for example, the requesting unit 171 provides identification information for identifying access points of the one or more detected wireless networks to the network information providing device 300-2 as the information regarding the one or more detected wireless networks. In this case, the identification information includes, for example, an SSID. More specifically, the identification information includes, for example, a HESSID, an ESSID, and/or a BSSID.

Note that the one or more detected wireless networks are, for example, one or more wireless networks detected by the mobile communication terminal 100-2 (the network detection unit 175).

Example of Specific Information

FIG. 18 is an explanatory diagram for describing an example of the information to be provided to the network information providing device 300-2. Referring to FIG. 18, the information to be provided to the network information providing device 300-2 is shown. For example, network type information (WLAN) indicating a network type is provided. In addition, identification information for identifying a detected wireless network (HESSID_1, ESSID_1, and BSSID_1) is provided. Information indicating a channel of the detected wireless network (1) is also provided. In addition, position information indicating a position of the mobile communication terminal 100-2 or the wireless communication terminal 200-2 (LAT-A and LON_A) is provided. In addition, information indicating the current time (MONDAY: 1:30 PM) is also provided.

Trigger for a Request

For example, the requesting unit 171 requests provision of information from the network information providing device 300-2 according to occurrence of any of one or more predetermined events. This point is as described in the first embodiment, and thus overlapping description will be omitted.

Note that detection of a wireless network (for example, a WLAN) may also be triggered according to the occurrence of the one or more predetermined events.

(First Information Acquisition Unit 173)

The first information acquisition unit 173 acquires information provided to the mobile communication terminal 100-2 from the network information providing device 300-2 (i.e., first network information). The first network information is information regarding a wireless network that is different from the mobile communication network 30.

Technique of Acquiring First Network Information

As described above, for example, the requesting unit 171 requests provision of information from the network information providing device 300-2. Then, the network information providing device 300-2 provides the first network information to the mobile communication terminal 100-2. Then, the first information acquisition unit 173 acquires the first network information. The first information acquisition unit 173 thereafter causes the first network information to be stored in the storage unit 150.

One Wireless Network

As described above, the first network information is information regarding a wireless network that is different from the mobile communication network 30. More specifically, the first network information is, for example, information regarding one wireless network for wireless communication that is different from the mobile communication.

Network that is Connectable Through an Authentication Procedure

The one wireless network is the wireless network for the wireless communication to which the mobile communication terminal 100-2 or the wireless communication terminal 200-2 is connectable through an authentication procedure. This point is as described in the first embodiment, and thus overlapping description will be omitted.

Network that Corresponds to a Position

Each of the at least one wireless network is, for example, a wireless network that has a communication area that corresponds to a position of the mobile communication terminal 100-2 or the wireless communication terminal 200-2. This point is also as described in the first embodiment, and thus overlapping description will be omitted.

Network that Corresponds to Time

The one wireless network is, for example, a wireless network that has an available time in terms of time. This point is also as described in the first embodiment, and thus overlapping description will be omitted.

WLAN

The one wireless network is, for example, a WLAN, and the wireless communication that is different from the mobile communication is, for example, WLAN communication. This point is also as described in the first embodiment, and thus overlapping description will be omitted.

Detected Wireless Network

In the second embodiment, the one wireless network is any one wireless network among the one or more detected wireless networks. As described above, the network information providing device 300-2 provides information of the one or more detected wireless networks, and selects any one wireless network among the one or more detected wireless networks. Then, information of the one selected wireless network is provided as the first network information.

Information Items Included in the First Network Information

Information items included in the first network information are as described in the first embodiment, and thus overlapping description will be omitted. Note that, as a specific example of the information, the first network information is, for example, the information shown in FIG. 6.

(Second Information Acquisition Unit 177)

The second information acquisition unit 177 acquires information regarding one or more wireless networks for the wireless communication that is different from the mobile communication (i.e., second network information). In the second embodiment, the second network information is information regarding one wireless network for the wireless communication.

The second network information is at least partial information of the information provided from the network information providing device 300-2 to the mobile communication terminal 100-2 (i.e., the first network information). In other words, in the second embodiment, both the first network information and the second network information are information regarding the same one wireless network.

One Wireless Network

The one wireless network is as described above with regard to the first network information.

Information Items Included in the Second Network Information

Information items included in the second network information are as described in the first embodiment, and thus overlapping description will be omitted. Note that, as a specific example of the information, the second network information is, for example, the information shown in FIG. 6.

Technique of Acquiring Second Network Information

The first information acquisition unit 173 causes, for example, the acquired first network information to be stored in the storage unit 150. Then, the second information acquisition unit 177 acquires the first network information stored in the storage unit 150 as the second network information.

As a specific example of the information, when the first network information shown in FIG. 6 is acquired by the first information acquisition unit 173, the second network information is the same information as the first network information shown in FIG. 6.

Note that the second network information may include only some information items among the information items included in the first network information. As an example, the second network information may include the network property information among the information items shown in FIG. 6, and may not include other information items of the information shown in FIG. 6.

(Information Providing Unit 179)

Provision of the Second Network Information

The information providing unit 179 provides the second network information to another terminal device that performs the wireless communication. For example, the information providing unit 179 provides the second network information to the wireless communication terminal 200-1.

As described above, the second network information is the information regarding the one wireless network in the second embodiment. The information providing unit 179 is the same as the information providing unit 169 of the first embodiment except for this point.

<4.1.2. Configuration of a Wireless Communication Terminal>

Figure 19:
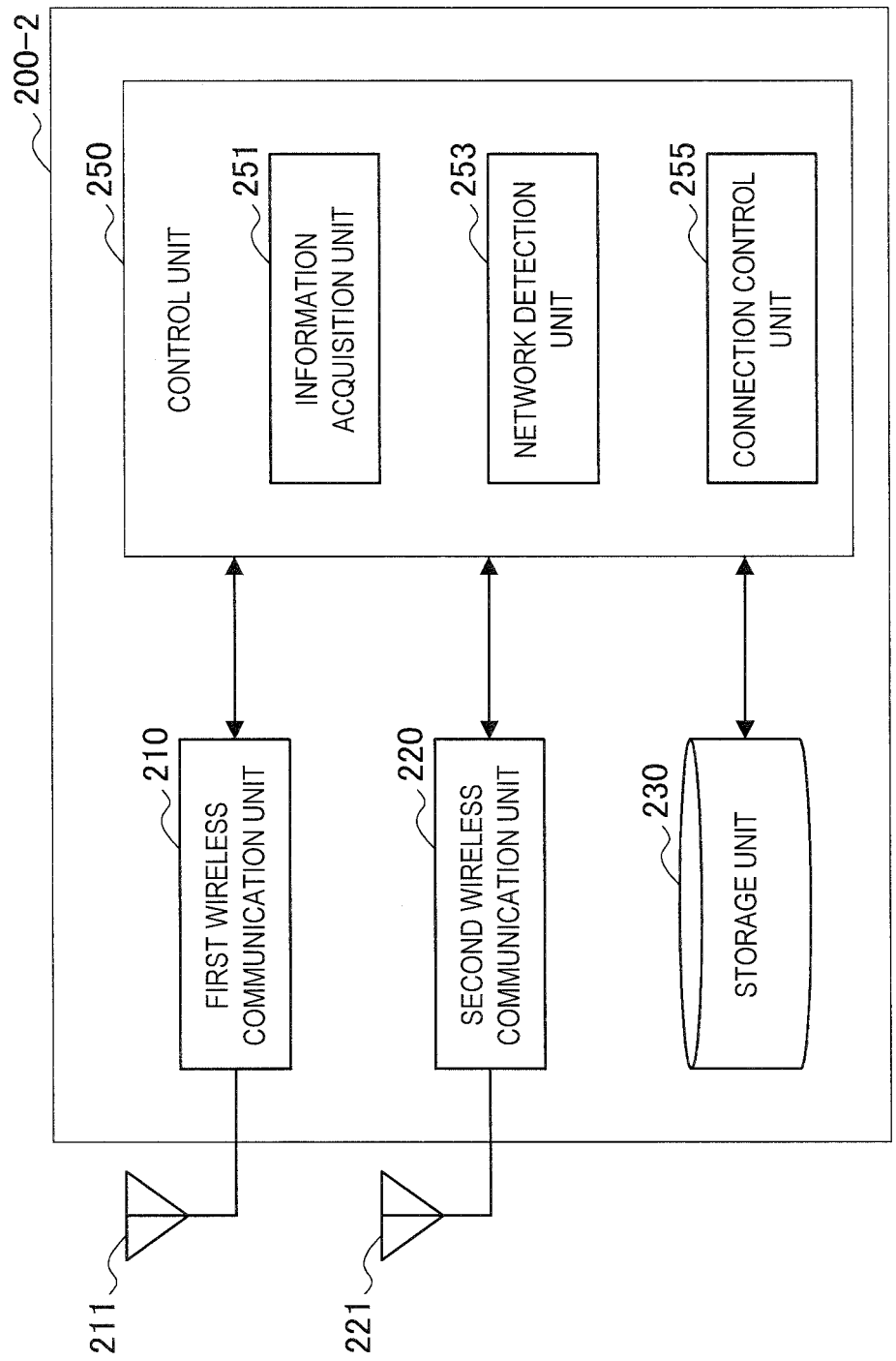
FIG. 19 is a block diagram showing an example of a configuration of a wireless communication terminal according to the second embodiment.

An example of a configuration of the wireless communication terminal 200-2 according to the second embodiment of the present disclosure will be described with reference to FIG. 19. FIG. 19 is a block diagram showing the example of the configuration of the wireless communication terminal 200-2 according to the second embodiment. Referring to FIG. 19, the wireless communication terminal 200-2 is provided with a first wireless communication unit 210, an antenna unit 211, a second wireless communication unit 220, an antenna unit 221, a storage unit 230, and a control unit 250.

Note that there is no particular difference with regard to the first wireless communication unit 210, the antenna unit 211, the second wireless communication unit 220, the antenna unit 221, and the storage unit 230 between the first embodiment and the second embodiment. Thus, only the control unit 250 will be described here.

(Control Unit 250)

The control unit 250 provides various functions of the wireless communication terminal 200-2. The control unit 250 includes an information acquisition unit 251, a network detection unit 253, and a connection control unit 255.

(Information Acquisition Unit 251)

Acquisition of Second Network Information

The information acquisition unit 251 acquires the second network information.

As described above, the second network information is information regarding the one wireless network (for example, one or more WLANs) in the second embodiment. The information acquisition unit 251 is the same as the information acquisition unit 241 of the first embodiment except for this point.

Acquisition of Authentication Information

As described above, for example, the mobile communication terminal 100-2 provides authentication information provided from the SIM 140 of the mobile communication terminal 100-2 to the wireless communication terminal 200-2. Then, the information acquisition unit 251 acquires the authentication information provided from the mobile communication terminal 100-2.

(Network Detection Unit 253)

The network detection unit 253 detects the wireless network for the wireless communication.

For example, the network detection unit 253 detects the wireless network (for example, the WLAN) by scanning a channel for the wireless network for the wireless communication (for example, the WLAN).

Detection Based on the Second Network Information

The network detection unit 253, for example, detects the one wireless network for the wireless communication based on the second network information.

Specifically, for example, the network detection unit 253 scans one wireless network indicated by the second network information. As a result, the network detection unit 253 detects, for example, the one wireless network.

In addition, for example, the second network information includes information indicating the channels for the one or more wireless networks. In this case, the network detection unit 253 performs the scanning based on the information indicating the channel. Accordingly, the wireless network can be detected more quickly.

(Connection Control Unit 255)

The connection control unit 255 causes the wireless communication terminal 200-2 to be connected to the one wireless network through an authentication procedure.

As described above, the one wireless network is, for example, the wireless network indicated by the second network information and the wireless network detected by the network detection unit 253.

As a specific process, for example, the connection control unit 255 performs the authentication procedure. This point is as described in the first embodiment, and overlapping description will be omitted.

<4.1.3. Configuration of a Network Information Providing Device>

Figure 20:
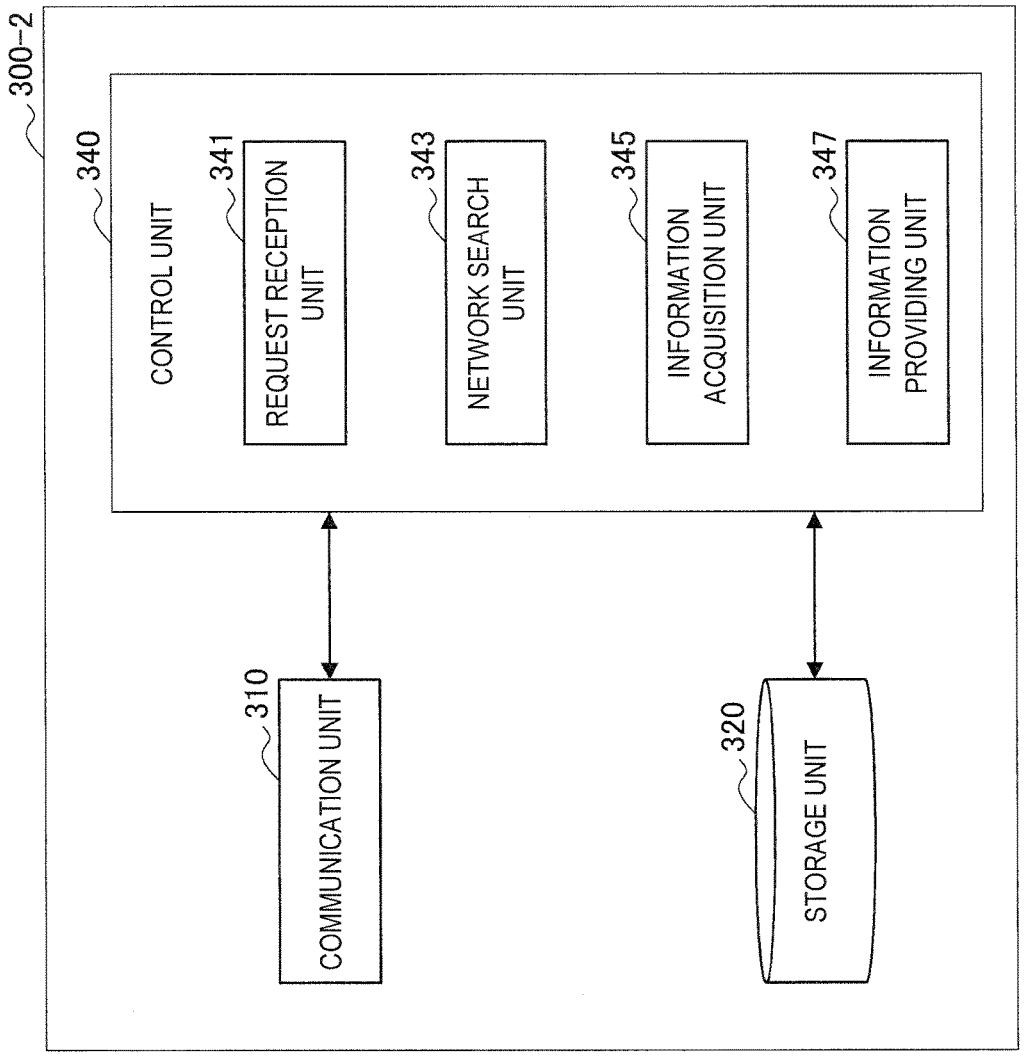
FIG. 20 is a block diagram showing an example of a configuration of a network information providing device according to the second embodiment.

An example of a configuration of the network information providing device 300-2 according to a second embodiment of the present disclosure will be described with reference to FIG. 20. FIG. 20 is a block diagram showing the example of the configuration of the network information providing device 300-2 according to the second embodiment. Referring to FIG. 20, the network information providing device 300-2 is provided with a communication unit 310, the storage unit 320, and the control unit 340.

Note that there is no particular difference with regard to the communication unit 310, and the storage unit 320 between the first embodiment and the second embodiment. Thus, only the control unit 340 will be described here.

(Control Unit 340)

The control unit 340 provides various functions of the network information providing device 300-2. The control unit 340 includes a request reception unit 341, a network search unit 343, an information acquisition unit 345, and an information providing unit 347.

(Request Reception Unit 341)

Reception of a Request

The request reception unit 341 receives a request for information provision made to the network information providing device 300-2. This point is as described in the first embodiment, and overlapping description will be omitted.

Acquisition of Information for Specifying a Wireless Network

In addition, the request reception unit 341, for example, acquires information for specifying a wireless network along with the request.

For example, the mobile communication terminal 100-2 provides information for specifying a wireless network to the network information providing device 300-2 upon the request. Specifically, for example, the mobile communication terminal 100-2 transmits a network information requesting message including the information to the network information providing device 300-2. Then, the communication unit 310 receives the network information requesting message. Then, the request reception unit 341 acquires the network information requesting message, and asks the network search unit 343 for a search for a wireless network that corresponds to the information included in the network information requesting message.

In the second embodiment, the information for specifying a wireless network includes information regarding one or more detected wireless networks (for example, identification information for identifying access points of respective one or more detected wireless networks). In addition, the information for specifying a wireless network further includes, for example, information such as network type information and position-related information, and is the information shown in FIG. 18 as an example.

(Network Search Unit 343)

The network search unit 343 searches for a wireless network.

For example, the request reception unit 341 asks the network search unit 343 for a search of a wireless network according to a request for information provision made to the network information providing device 300-2 as described above. Then, the network search unit 343 searches all wireless networks that are search objects for a wireless network in accordance with the request in response to the asking. Note that information regarding all the wireless networks that are search objects (i.e., search object information) is stored in, for example, the storage unit 320, and the network search unit 343 searches for a wireless network in accordance with the request using the search object information.

More specifically, for example, the request reception unit 341 acquires the information for specifying a wireless network (for example, network type information, identification information of access points, position-related information, time information, and the like) along with the request as described above. Then, the network search unit 343 searches for a wireless network that corresponds to the information for specifying a wireless network as the wireless network in accordance with the request.

In addition, in particular in the second embodiment, the network search unit 343 selects any one wireless network. For example, the network search unit 343 finally selects any one wireless network by outputting any one wireless network corresponding to the information for specifying a wireless network as a final search result. As an example, the network search unit 343 outputs the wireless network with the highest priority among one or more wireless networks corresponding to the information for specifying a wireless network as a final search result.

Referring to FIG. 9 again, the search object information is shown. Here, for example, network type information (a WLAN), identification information of an access point (HESSID_1, ESSID_1, and BSSID_1), position information (LAT_A and LON_A), and time information (MONDAY: 1:30 PM) shown in FIG. 18 are provided along with the request for information provision. Then, the network search unit 343 searches all the wireless networks that are search objects for a wireless network that corresponds to the provided network type information, identification information, position information, and time information. For example, the network types of both of the two wireless networks shown in FIG. 9 are WLAN, and the two wireless networks are available at 1:30 p.m. on Monday. On the other hand, with respect to the wireless network shown in FIG. 9 whose ID is 1, the identification information of the access point is HESSID_1, ESSID_1, and BSSID_1, and with respect to the wireless network whose ID is 2, the identification information of the access point is HESSID_2, ESSID_2, and BSSID_2. In addition, the wireless network shown in FIG. 9 whose ID is 1 has the communication area in which the position indicated by LAT_A and LON_A is included, and the wireless network whose ID is 2, however, does not have the communication area in which the position is included. Thus, the wireless network whose ID is 1 turns up as a search result, and the wireless network whose ID is 2 does not turn up as a search result.

As described with reference to FIG. 9, for example, when there is only one wireless network corresponding to the information for specifying a wireless network, the search result is the one wireless network. On the other hand, for example, when there are two or more wireless networks corresponding to the information for specifying a wireless network, the search result is one wireless network (for example, the wireless network with the highest priority) among the two or more wireless networks.

Note that any among all the wireless networks that are search objects is, for example, a wireless network to which the mobile communication terminal 100-2 and the wireless communication terminal 200-2 are connectable through the authentication procedure. This point is as described in the first embodiment, and thus overlapping description will be omitted.

(Information Acquisition Unit 345)

The information acquisition unit 345 acquires information regarding a wireless network that is different from the mobile communication network 30 (i.e., first network information).

In the second embodiment, the first network information is information regarding one wireless network for the wireless communication that is different from the mobile communication. The information acquisition unit 345 is the same as the information acquisition unit 335 of the first embodiment except for this point. Note that the information acquisition unit 335 acquires, for example, the first network information shown in FIG. 6.

(Information Providing Unit 347)

The information providing unit 347 provides the first network information to a terminal device that performs mobile communication. The information providing unit 347 provides the first network information to, for example, the mobile communication terminal 100-2. More specifically, the information providing unit 347, for example, transmits the first network information to the mobile communication terminal 100-2 via the communication unit 310.

4.2. Process Flow

Next, an example of a communication control process according to the second embodiment will be described with reference to FIG. 21.

(Overall Process Flow)

Figure 21:
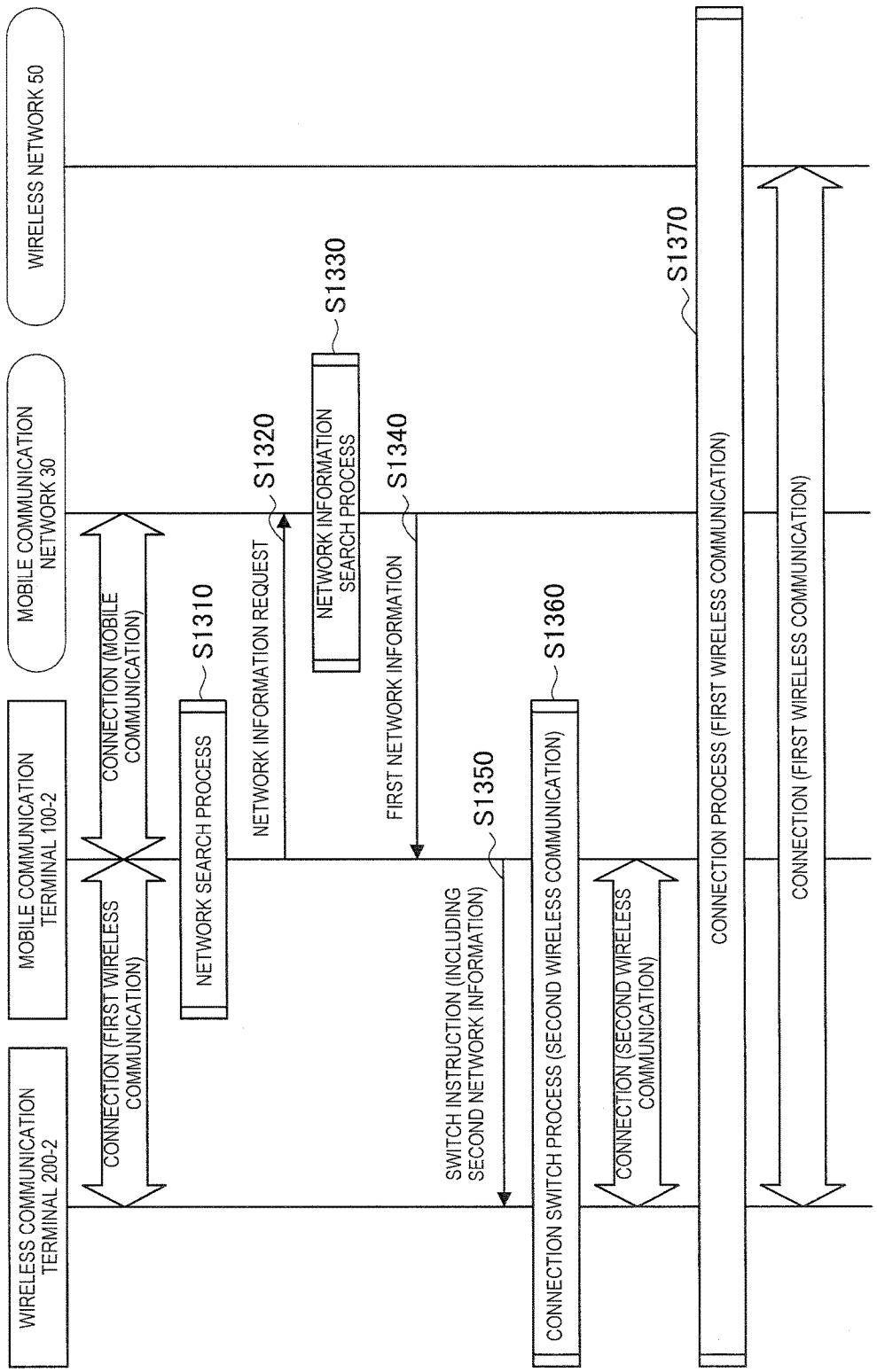
FIG. 21 is a sequence diagram showing an example of a schematic flow of an entire communication control process according to the second embodiment.

FIG. 21 is a sequence diagram showing an example of a schematic flow of an entire communication control process according to the second embodiment.

As a premise, for example, the mobile communication terminal 100-2 and the wireless communication terminal 200-2 are connected to each other in first wireless communication (for example, WLAN communication (direct communication)). In addition, the mobile communication terminal 100-2 is connected to the mobile communication network 30. Furthermore, the wireless communication terminal 200-2 performs communication using tethering by using the tethering function of the mobile communication terminal 100-2.

First, the mobile communication terminal 100-2 performs a network detection process (S1310). Specifically, for example, the mobile communication terminal 100-2 detects all communicable wireless networks (for example, all communicable WLANs). Consequently, for example, one or more wireless networks are detected.

The mobile communication terminal 100-2 transmits a network information requesting message to the network information providing device 300-2 according to occurrence of any of one or more predetermined events (S1320). The network information requesting message includes information for specifying a wireless network. The information for specifying a wireless network includes identification information for identifying access points of the one or more detected wireless networks. In addition, the information for specifying a wireless network also includes, for example, network type information, position-related information, and time information.

When the network information providing device 300-2 included on the mobile communication network 30 receives the network information requesting message, the network information providing device 300-2 executes a network information search process (S1330). In other words, the network information providing device 300-2 searches for a wireless network that corresponds to the information (for example, identification information of access points, network type information, position-related information, time information, and the like) for specifying the wireless network. Then, the search result includes, for example, any one wireless network among the one or more detected wireless networks.

The network information providing device 300-2 thereafter provides information regarding the one wireless network included in the search result (i.e., first network information) to the mobile communication terminal 100-2 (S1340). Thereby, the mobile communication terminal 100-2 acquires the first network information.

The mobile communication terminal 100-2 acquires information regarding the one wireless network (second network information), and transmits a switch instructing message including the information (second network information) to the wireless communication terminal 200-2 (S1350). Then, the wireless communication terminal 200-2 receives the switch instructing message, and thereby acquires the second network information. Note that the second network information is, for example, the same information as the first network information.

Then, the mobile communication terminal 100-2 and the wireless communication terminal 200-2 perform a connection switch process for switching from connection of the first wireless communication (WLAN communication (direct communication)) to connection of second wireless communication (Bluetooth communication) (S1360). As a result, the mobile communication terminal 100-2 and the wireless communication terminal 200-2 are connected to each other in the second wireless communication (Bluetooth communication).

Further, the wireless communication terminal 200-2 performs a connection process for connection to the one wireless network (i.e., wireless network 50) (S1370). As a result, the wireless communication terminal 200-2 is connected to the wireless network 50.

(Network Information Search Process: S1330)

Figure 22:
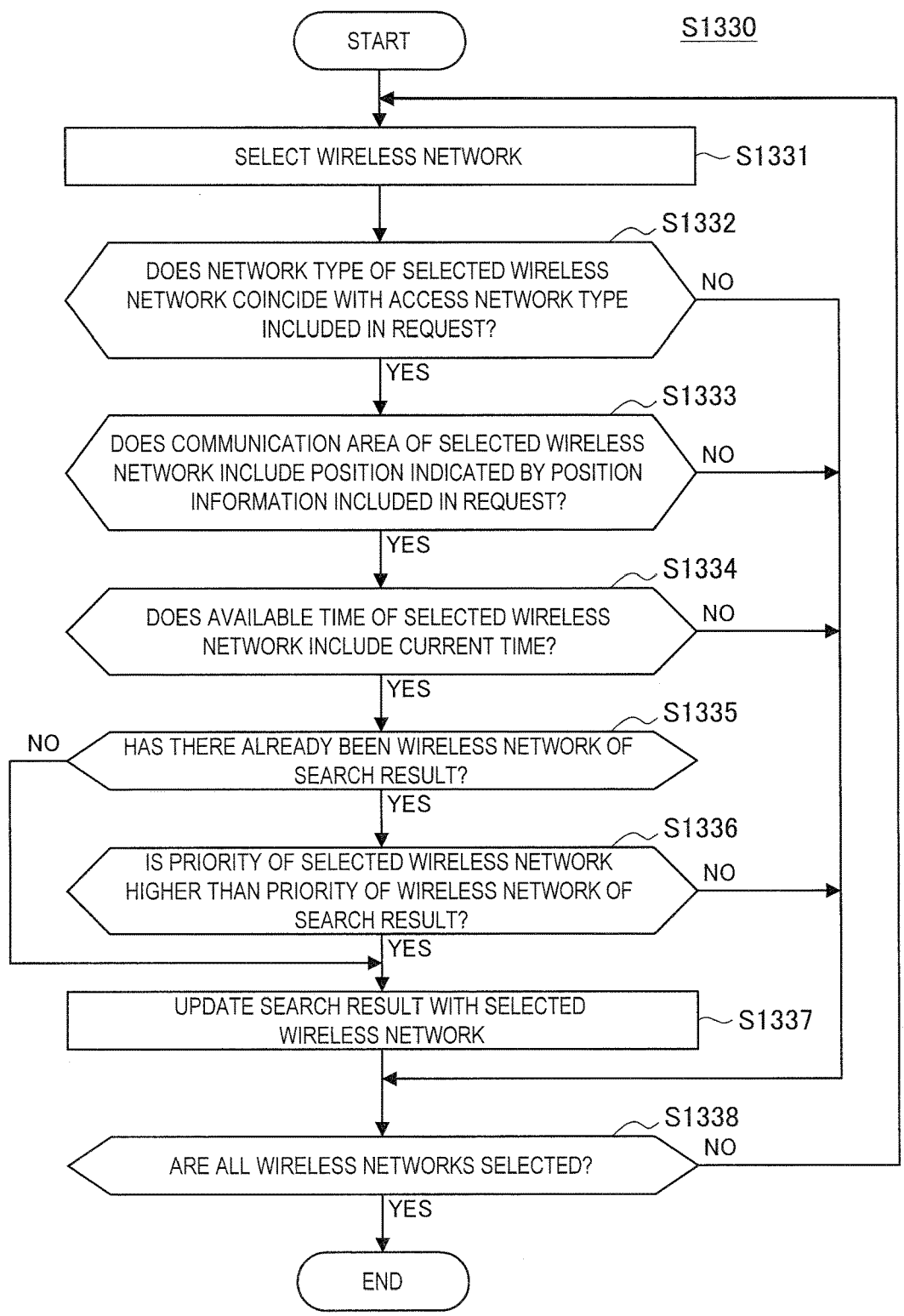
FIG. 22 is a flowchart showing an example of a schematic flow of a network information search process according to the second embodiment.

FIG. 22 is a flowchart showing an example of a schematic flow of the network information search process according to the second embodiment. The network information search process corresponds to the process of Step S1330 shown in FIG. 21.

First, the network search unit 343 of the network information providing device 300 selects a wireless network from all wireless networks that are search objects (S1331).

Then, the network search unit 343 determines whether the network type of the selected wireless network coincides with the network type included in the request (S1332). In addition, the network search unit 343 determines whether the communication area of the selected wireless network includes the position indicated by the position information included in the request (S1333). In addition, the network search unit 343 determines whether the available time of the selected wireless network includes the current time (S1334). Then, if the results of the determinations are all positive (YES in S1332, S1333, and S1334) and there has been no wireless network that is the search result yet (NO in S1335), the network search unit 343 updates the search result with the selected wireless network (S1337). On the other hand, if there has been already a wireless network that is the search result (YES in S1335) and the priority of the selected wireless network is higher than the priority of the wireless network that is the search result (YES in S1336), the network search unit 343 updates the search result with the selected wireless network (S1337).

Note that if the priority of the selected wireless network is not higher than the priority of the wireless network that is the search result (NO in S1336), the network search unit 343 does not update the search result. In addition, if any of the results of the determinations described above (S1332, S1333, and S1334) is negative (false), the network search unit 343 does not update the search result either.

If all the wireless networks are selected thereafter (YES in S1338), the process ends. If not (NO in S1338), the process returns to Step S1331, and the above processes are repeated.

(Connection Switch Process: S1360)

The connection switch process (S1360) according to the second embodiment is the same as the connection switch process (S1060) according to the first embodiment described with reference to FIG. 13.

(Wireless Network Connection Process: S1370)

The connection process (S1370) according to the second embodiment is the same as the connection process described with reference to FIG. 14.

4.3. Modified Example

Next, a modified example of the second embodiment will be described with reference to FIG. 23.

According to the second embodiment described above, for example, the mobile communication terminal 100-2 detects one or more wireless networks, and information regarding the one or more detected wireless networks (for example, identification information of access points of the one or more detected wireless networks) is provided to the network information providing device 300-2.

On the other hand, according to a modified example of the second embodiment, the wireless communication terminal 200-2 detects one or more wireless networks, and information regarding the one or more detected wireless networks (for example, identification information of access points) is provided to the network information providing device 300-2.

Accordingly, a load of the mobile communication terminal 100-2 is reduced. Thus, for example, power consumption of the mobile communication terminal 100-2 can be suppressed.

<4.3.1. Configuration of the Mobile Communication Terminal>

First, a configuration of the mobile communication terminal 100-2 according to the modified example of the second embodiment will be described. Note that only differences between the above-described example of the second embodiment and the modified example of the second embodiment will be described here.

(Requesting Unit 171)

Information Provided Upon a Request

Information Regarding Detected Wireless Networks

As described above, in the second embodiment, for example, the requesting unit 171 provides information regarding one or more detected wireless networks to the network information providing device 300-2 upon a request with respect to the network information providing device 300-2.

Note that the one or more detected wireless networks are one or more wireless networks detected by, for example, the wireless communication terminal 200-2. The wireless communication terminal 200-2 detects, for example, one or more wireless networks (for example, WLANs) for wireless communication that is different from mobile communication. Then, the wireless communication terminal 200-2 provides information regarding the one or more detected wireless networks (for example, identification information of access points of the one or more detected wireless networks) to the mobile communication terminal 100-2.

<4.3.2. Configuration of the Wireless Communication Terminal>

Next, a configuration of the wireless communication terminal 200-2 according to the modified example of the second embodiment will be described. Note that only differences between the above-described example of the second embodiment and the modified example of the second embodiment will be described here.

(Network Detection Unit 253)

The network detection unit 253 detects the wireless network for the wireless communication.

For example, the network detection unit 253 detects the wireless network (for example, the WLAN) by scanning a channel for the wireless network for the wireless communication (for example, the WLAN).

Detection of a Communicable Wireless Network

In the second embodiment, for example, the network detection unit 175 detects a communicable wireless network rather than, for example, a specific wireless network. Specifically, for example, the network detection unit 175 detects all communicable wireless networks. As a result, for example, one or more wireless networks are detected. In addition, the wireless communication terminal 200-2 provides information regarding the one or more detected wireless networks as a detection result to the mobile communication terminal 100-2. Then, the mobile communication terminal 100-2 acquires the detection result (i.e., the information regarding the one or more detected wireless networks).

Detection Based on Second Network Information

For example, the network detection unit 253 detects one wireless network for the wireless communication based on the second network information. This point is as described above.

<4.3.3. Process Flow>

Next, an example of a communication control process according to the modified example of the second embodiment will be described with reference to FIG. 23.

(Overall Process Flow)

Figure 23:
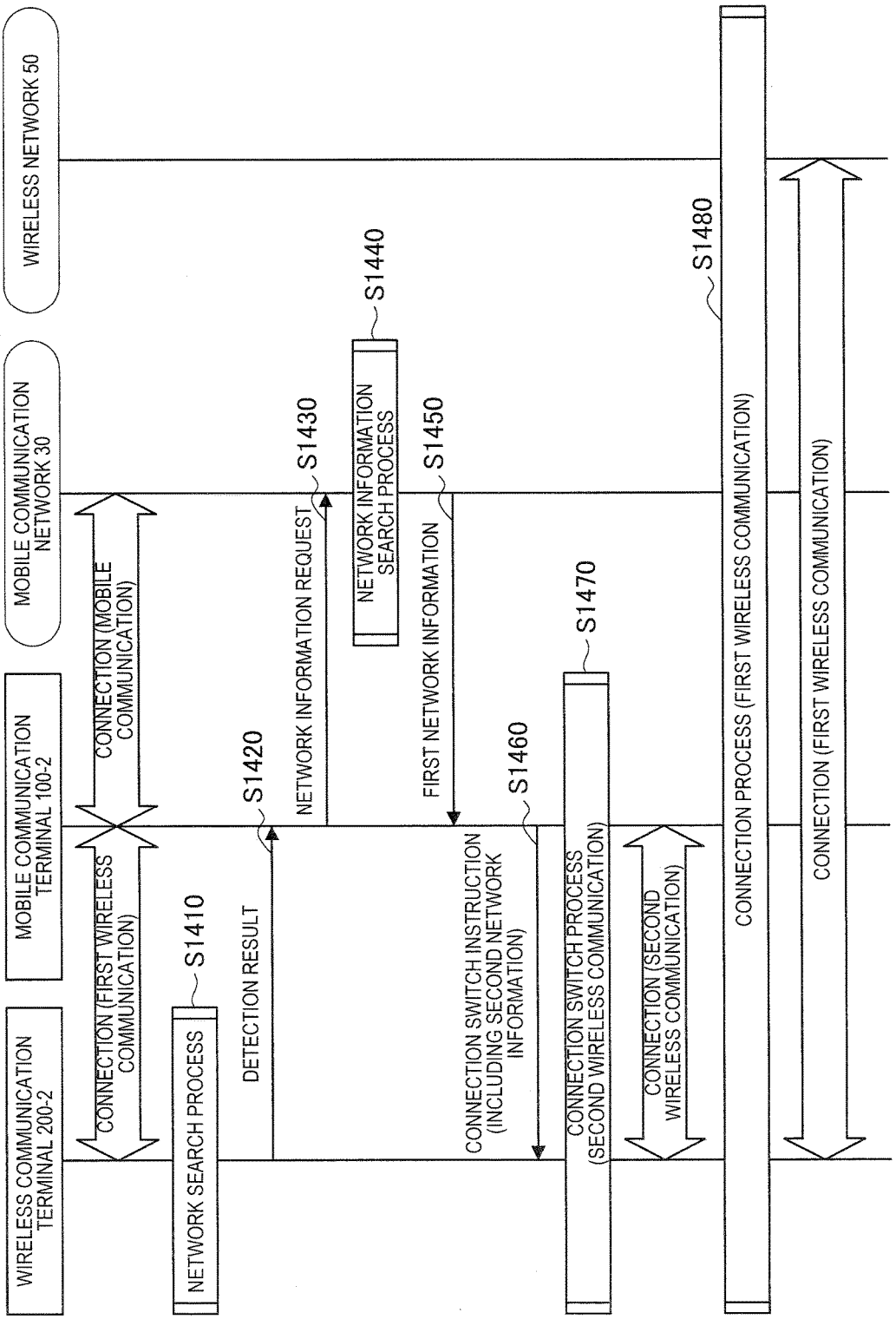
FIG. 23 is a sequence diagram showing an example of a schematic flow of an entire communication control process according to a modified example of the second embodiment.

FIG. 23 is a sequence diagram showing an example of a schematic flow of an entire communication control process according to the modified example of the second embodiment.

Note that Steps S430 to S1480 of the communication control process according to the modified example of the second embodiment shown in FIG. 23 are the same as Steps S1320 to S1370 of the communication control process according to the second embodiment described with reference to FIG. 21. Thus, only Steps S1240, S1260, and S1270 will be described here.

First, the wireless communication terminal 200-2 performs a network detection process (S1410). Specifically, for example, the wireless communication terminal 200-2 detects all communicable wireless networks (for example, all communicable WLANs). Consequently, for example, one or more wireless networks are detected.

The wireless communication terminal 200-2 thereafter provides information regarding the one or more detected wireless networks to the mobile communication terminal 100-2 as a detection result.

5. Application Examples

The technology of the present disclosure is applicable to various kinds of products. For example, the mobile communication terminal 100 can be realized as a mobile terminal such as a smartphone, a tablet personal computer (PC), or a portable/dongle-type mobile router, or an in-vehicle terminal such as a car navigation device. In addition, the mobile communication terminal 100 can be realized as a terminal that performs machine-to-machine (M2M) communication (which is also called a machine-type communication (MTC) terminal). Further, the mobile communication terminal 100 can be a wireless communication module (for example, an integrated circuit module formed in one die) mounted in such a terminal.

In addition, the wireless communication terminal 200 can be realized as, for example, a mobile terminal such as a tablet PC, a notebook PC, a portable game terminal, or a digital camera, a fixed terminal such as a television receiver set, a printer, a digital scanner, or a network storage, or an in-vehicle terminal such as a car navigation device. In addition, the wireless communication terminal 200 can be realized as a terminal that performs M2M communication (which is also called an MTC terminal) such as a smart meter, a vending machine, a remote monitoring device, or a point-of-sale (POS) terminal. Further, the wireless communication terminal 200 can be a wireless communication module (for example, an integrated circuit module formed in one die) mounted in such a terminal.

In addition, the network information providing device 300 can be realized as, for example, any type of a server such as a tower server, a rack server, or a blade server. In addition, the network information providing device 300 can be a control module (for example, an integrated circuit module formed in one die, a card or a blade to be inserted into a slot of a blade server) mounted in a server.

<<5.1. Application Examples Regarding a Mobile Communication Terminal>>

First, a first application example (a smartphone 700) and a second application example (a car navigation device 730 and an in-vehicle system 760) regarding the mobile communication terminal 100 according to an embodiment of the present disclosure will be described.

First Application Example

Figure 24:
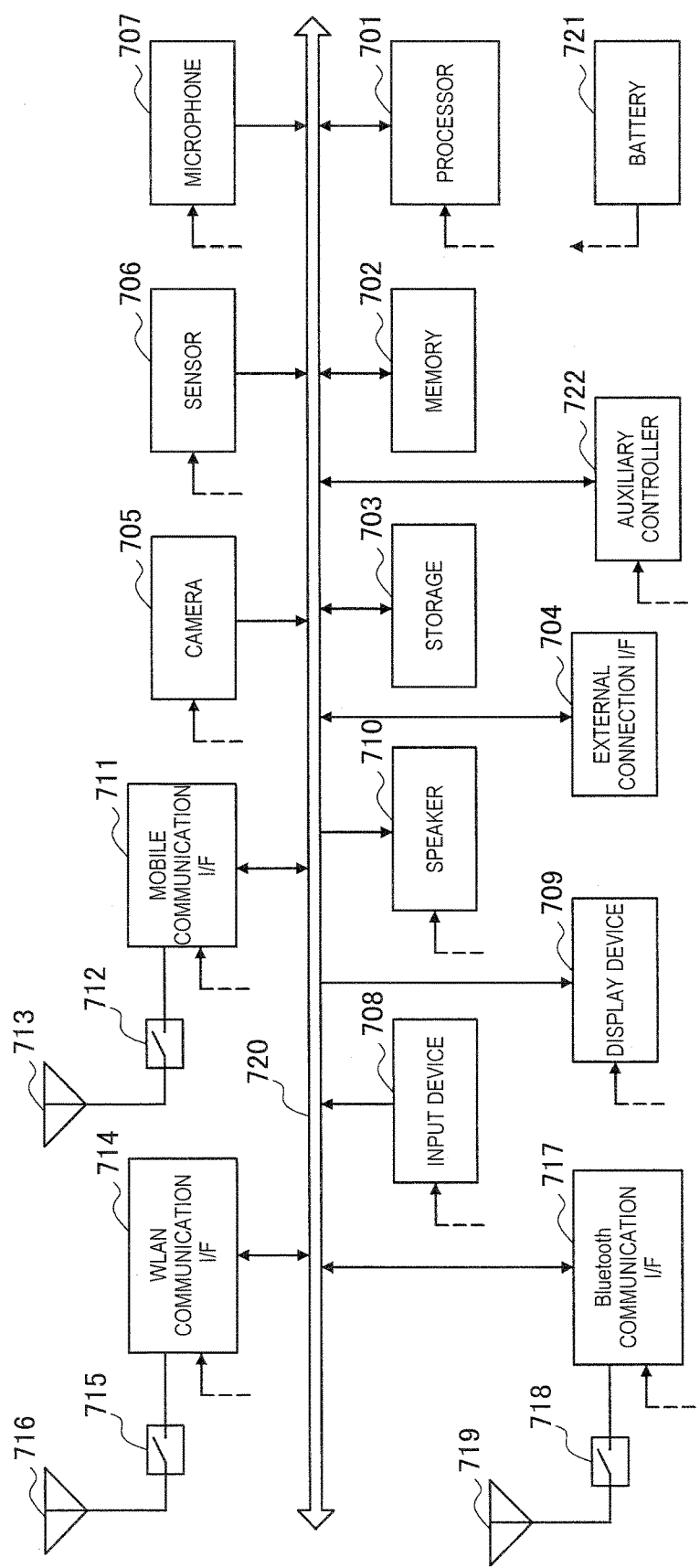
FIG. 24 is a block diagram showing an example of a schematic configuration of a smartphone to which the technology according to the present disclosure can be applied.

FIG. 24 is a block diagram showing an example of a schematic configuration of the smartphone 700 to which the technology according to the present disclosure can be applied. The smartphone 700 includes a processor 701, a memory 702, a storage 703, an external connection interface 704, a camera 705, a sensor 706, a microphone 707, an input device 708, a display device 709, a speaker 710, a mobile communication interface 711, an antenna switch 712, an antenna 713, a WLAN communication interface 714, an antenna switch 715, an antenna 716, a Bluetooth communication interface 717, an antenna switch 718, an antenna 719, a bus 720, a battery 721, and an auxiliary controller 722.

The processor 701 may be, for example, a CPU or a System on Chip (SoC), and controls functions of an application layer and another layer of the smartphone 700. The memory 702 includes a RAM and a ROM, and stores a program that is executed by the processor 701, and data. The storage 703 may include a storage medium such as a semiconductor memory and a hard disk. The external connection interface 704 is an interface for connecting an external device such as a memory card and a universal serial bus (USB) device to the smartphone 700.

The camera 705 includes an image sensor such as a charge coupled device (CCD) and a complementary metal oxide semiconductor (CMOS), and generates a captured image. The sensor 706 may include a group of sensors such as a measurement sensor, a gyro sensor, a geomagnetic sensor, and an acceleration sensor. The microphone 707 converts sounds that are input to the smartphone 700 to audio signals. The input device 708 includes, for example, a touch sensor configured to detect touch onto a screen of the display device 709, a keypad, a keyboard, a button, or a switch, and receives an operation or an information input from a user. The display device 709 includes a screen such as a liquid crystal display (LCD) and an organic light-emitting diode (OLED) display, and displays an output image of the smartphone 700. The speaker 710 converts audio signals that are output from the smartphone 700 to sounds.

The mobile communication interface 711 supports a cellular communication scheme of either LTE or LTE-Advanced to execute wireless communication. The mobile communication interface 711 can typically include a baseband (BB) processor, a radio frequency (RF) circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 713. The mobile communication interface 711 may be a one-chip module in which a BB processor and an RF circuit are integrated. The mobile communication interface 711 may include a signal BB processor or a plurality of BB processors. In addition, the mobile communication interface 711 may include a signal RF circuit or a plurality of RF circuits. The antenna switch 712 switches connection destinations of the antenna 713 for a plurality of circuits included in the mobile communication interface 711. The antenna 713 has a single or a plurality of antenna elements (for example, a plurality of antenna elements constituting a multiple-input and multiple-output (MIMO) antenna) and is used by the mobile communication interface 711 to transmit and receive radio signals.

The WLAN communication interface 714 supports one or more WLAN standards such as IEEE 802.11a, 11b, 11g, 11n, 11ac, and 11ad to execute wireless communication. The WLAN communication interface 714 can communicate with another device via a WLAN access point in an infrastructure mode. In addition, the WLAN communication interface 714 can communicate directly with another device in an ad hoc mode. The WLAN communication interface 714 can typically include a BB processor and an RF circuit. The WLAN communication interface 714 may be a one-chip module in which a memory that stores a communication control program, a processor that executes the program, and a relevant circuit are integrated. The antenna switch 715 switches connection destinations of the antenna 716 for a plurality of circuits included in the WLAN communication interface 714. The antenna 716 has a single or a plurality of antenna elements (for example, a plurality of antenna elements constituting a MIMO antenna), and is used by the WLAN communication interface 714 to transmit and receive radio signals.

The Bluetooth communication interface 717 supports one or more Bluetooth standards to execute wireless communication. The Bluetooth communication interface 717 can communicate directly with another device. The Bluetooth communication interface 717 can typically include a BB processor, an RF circuit, and the like. The Bluetooth communication interface 717 may be a one-chip module in which a memory that stores a communication control program, a processor that executes the program, and a relevant circuit are integrated. The antenna switch 718 switches connection destinations of the antenna 719 for a plurality of circuits included in the Bluetooth communication interface 717. The antenna 719 has a single or a plurality of antenna elements, and is used by the Bluetooth communication interface 717 to transmit and receive radio signals.

As shown in FIG. 24, the smartphone 700 may have antennas that correspond to each of the mobile communication interface 711, the WLAN communication interface 714, and the Bluetooth communication interface 717. Note that the configuration is not limited to the example of FIG. 24, and the smartphone 700 may have an antenna shared by two or more of the mobile communication interface 711, the WLAN communication interface 714, and the Bluetooth communication interface 717. As an example, the smartphone 700 may have an antenna and antenna switch shared by the WLAN communication interface 714 and the Bluetooth communication interface 717 instead of including the antenna switch 715 and the antenna 716, and the antenna switch 718 and the antenna 719. In addition, the shared antenna may be connected to either of the WLAN communication interface 714 and the Bluetooth communication interface 717 using the antenna switch.

In addition, the smartphone 700 may have the mobile communication interface 711, the WLAN communication interface 714, and the Bluetooth communication interface 717 as separate modules as shown in FIG. 24. Note that the configuration is not limited to the example of FIG. 24, and the smartphone 700 may have a one-chip module that includes two or more of the mobile communication interface 711, the WLAN communication interface 714, and the Bluetooth communication interface 717. In this case, the smartphone 700 may include an antenna and antenna switch shared between the communication interfaces, or may include antennas corresponding to each of the communication interfaces.

Note that the antenna switch 712, the antenna switch 715, and the antenna switch 718 may be omitted from the configuration of the smartphone 700.

The bus 720 connects the processor 701, the memory 702, the storage 703, the external connection interface 704, the camera 705, the sensor 706, the microphone 707, the input device 708, the display device 709, the speaker 710, the mobile communication interface 711, the WLAN communication interface 714, the Bluetooth communication interface 717, and the auxiliary controller 722 to each other. The battery 721 supplies power to blocks of the smartphone 700 illustrated in FIG. 24 via feeder lines, which are partially shown as dashed lines in the drawing. The auxiliary controller 722 operates a minimum necessary function of the smartphone 700, for example, in a sleep mode.

The second information acquisition unit 167 and the information providing unit 169 described with reference to FIG. 4 and the second information acquisition unit 177 and the information providing unit 179 described with reference to FIG. 17 may be implemented by the processor 701 and/or the auxiliary controller 722 in the smartphone 700 shown in FIG. 24. More specifically, for example, the second information acquisition unit 167, the information providing unit 169, the second information acquisition unit 177, and the information providing unit 179 may be implemented by the processor 701 and/or the auxiliary controller 722 and a program executed by the processor 701 and/or the auxiliary controller 722 (for example, an operating system (OS), a device driver, and/or application software). In addition, at least some of the functions may be implemented by the mobile communication interface 711, the WLAN communication interface 714, and/or the Bluetooth communication interface 717. In addition, each of the requesting unit 161, the first information acquisition unit 163, and the network detection unit 165 described with reference to FIG. 4 and the requesting unit 171, the first information acquisition unit 173, and the network detection unit 175 described with reference to FIG. 17 may be implemented by one or two or more of the processor 701, the auxiliary controller 722, the mobile communication interface 711, the WLAN communication interface 714, and the Bluetooth communication interface 717.

Second Application Example

Figure 25:
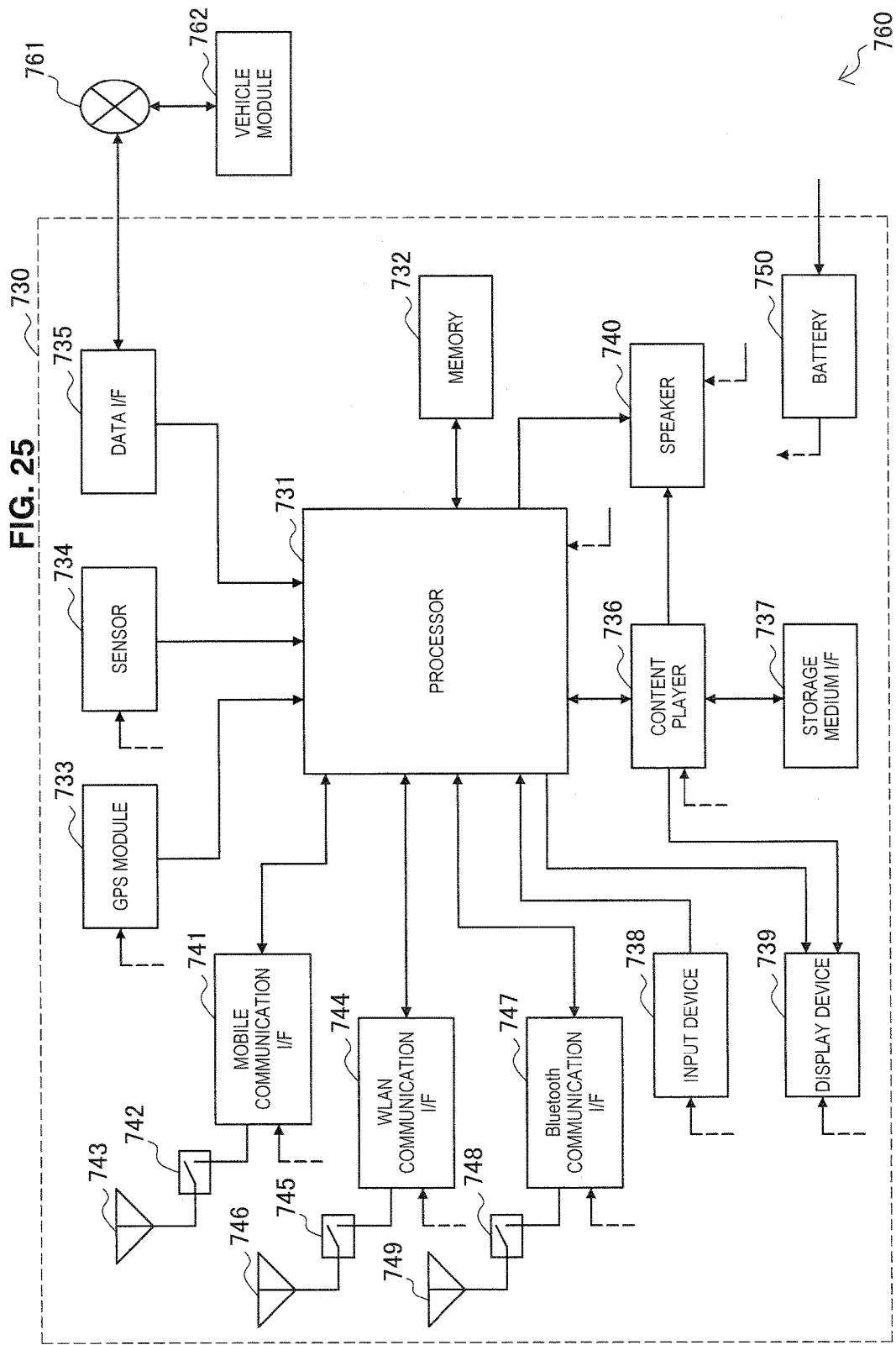
FIG. 25 is a block diagram showing an example of a schematic configuration of a car navigation device to which the technology according to the present disclosure can be applied.

FIG. 25 is a block diagram showing an example of a schematic configuration of the car navigation device 730 to which the technology according to the present disclosure can be applied. The car navigation device 730 includes a processor 731, a memory 732, a Global Positioning System (GPS) module 733, a sensor 734, a data interface 735, a content player 736, a storage medium interface 737, an input device 738, a display device 739, a speaker 740, a mobile communication interface 741, an antenna switch 742, an antenna 743, a WLAN communication interface 744, an antenna switch 745, an antenna 746, a Bluetooth communication interface 747, an antenna switch 748, an antenna 749, and a battery 750.

The processor 731 may be, for example, a CPU or a SoC, and controls a navigation function and another function of the car navigation device 730. The memory 732 includes a RAM and a ROM, and stores a program that is executed by the processor 731, and data.

The GPS module 733 uses GPS signals received from a GPS satellite to measure a position (for example, latitude, longitude, and altitude) of the car navigation device 730. The sensor 734 may include a group of sensors such as a gyro sensor, a geomagnetic sensor, and an air pressure sensor. The data interface 735 is connected to, for example, an in-vehicle network 761 via a terminal that is not shown, and acquires data generated by the vehicle, such as vehicle speed data.

The content player 736 reproduces content stored in a storage medium (such as a CD and a DVD) that is inserted into the storage medium interface 737. The input device 738 includes, for example, a touch sensor configured to detect touch onto a screen of the display device 739, a button, or a switch, and receives an operation or an information input from a user. The display device 739 includes a screen such as a LCD or an OLED display, and displays an image of the navigation function or content that is reproduced. The speaker 740 outputs sounds of the navigation function or the content that is reproduced.

The mobile communication interface 741 supports a cellular communication scheme of either LTE or LTE-Advanced to execute wireless communication. The mobile communication interface 741 can typically include a BB processor, a RF circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 743. The mobile communication interface 741 may be a one-chip module in which a BB processor and an RF circuit are integrated. The mobile communication interface 741 may include a signal BB processor or a plurality of BB processors. In addition, the mobile communication interface 741 may include a signal RF circuit or a plurality of RF circuits. The antenna switch 742 switches connection destinations of the antenna 743 for a plurality of circuits included in the mobile communication interface 741. The antenna 743 has a single or a plurality of antenna elements (for example, a plurality of antenna elements constituting a MIMO antenna) and is used by the mobile communication interface 741 to transmit and receive radio signals.

The WLAN communication interface 744 supports one or more WLAN standards such as IEEE 802.11a, 11b, 11g, 11n, 11ac, and 11ad to execute wireless communication. The WLAN communication interface 744 can communicate with another device via a WLAN access point in an infrastructure mode. In addition, the WLAN communication interface 744 can communicate directly with another device in an ad hoc mode. The WLAN communication interface 744 can typically include a BB processor and an RF circuit. The WLAN communication interface 744 may be a one-chip module in which a memory that stores a communication control program, a processor that executes the program, and a relevant circuit are integrated. The antenna switch 745 switches connection destinations of the antenna 746 for a plurality of circuits included in the WLAN communication interface 744. The antenna 746 has a single or a plurality of antenna elements (for example, a plurality of antenna elements constituting a MIMO antenna), and is used by the WLAN communication interface 744 to transmit and receive radio signals.

The Bluetooth communication interface 747 supports one or more Bluetooth standards to execute wireless communication. The Bluetooth communication interface 747 can communicate directly with another device. The Bluetooth communication interface 747 can typically include a BB processor, an RF circuit, and the like. The Bluetooth communication interface 747 may be a one-chip module in which a memory that stores a communication control program, a processor that executes the program, and a relevant circuit are integrated. The antenna switch 748 switches connection destinations of the antenna 749 for a plurality of circuits included in the Bluetooth communication interface 747. The antenna 749 has a single or a plurality of antenna elements, and is used by the Bluetooth communication interface 747 to transmit and receive radio signals.

As shown in FIG. 25, the car navigation device 730 may have antennas that correspond to each of the mobile communication interface 741, the WLAN communication interface 744, and the Bluetooth communication interface 747. Note that the configuration is not limited to the example of FIG. 25, and the car navigation device 730 may have an antenna shared by two or more of the mobile communication interface 741, the WLAN communication interface 744, and the Bluetooth communication interface 747. As an example, the car navigation device 730 may have an antenna and antenna switch shared by the WLAN communication interface 744 and the Bluetooth communication interface 747 instead of including the antenna switch 745 and the antenna 746, and the antenna switch 748 and the antenna 749. In addition, the shared antenna may be connected to either of the WLAN communication interface 744 and the Bluetooth communication interface 747 using the antenna switch.

In addition, the car navigation device 730 may have the mobile communication interface 741, the WLAN communication interface 744, and the Bluetooth communication interface 747 as separate modules as shown in FIG. 25. Note that the configuration is not limited to the example of FIG. 25, and the car navigation device 730 may have a one-chip module that includes two or more of the mobile communication interface 741, the WLAN communication interface 744, and the Bluetooth communication interface 747. In this case, the car navigation device 730 may include an antenna and antenna switch shared between the communication interfaces, or may include antennas corresponding to each of the communication interfaces.

Note that the antenna switch 742, the antenna switch 745, and the antenna switch 748 may be omitted from the configuration of the car navigation device 730.

The battery 750 supplies power to blocks of the car navigation device 730 shown in FIG. 25 via feeder lines that are partially shown as dashed lines in the drawing. The battery 750 accumulates power supplied form the vehicle.

The second information acquisition unit 167 and the information providing unit 169 described with reference to FIG. 4 and the second information acquisition unit 177 and the information providing unit 179 described with reference to FIG. 17 may be implemented by the processor 731 in the car navigation device 730 shown in FIG. 25. More specifically, for example, the second information acquisition unit 167, the information providing unit 169, the second information acquisition unit 177, and the information providing unit 179 may be implemented by the processor 731 and a program executed by the processor 731 (for example, an OS, a device driver, and/or application software). In addition, at least some of the functions may be implemented by the mobile communication interface 741, the WLAN communication interface 744, and/or the Bluetooth communication interface 747. In addition, each of the requesting unit 161, the first information acquisition unit 163, and the network detection unit 165 described with reference to FIG. 4 and the requesting unit 171, the first information acquisition unit 173, and the network detection unit 175 described with reference to FIG. 17 may be implemented by one or two or more of the processor 731, the mobile communication interface 741, the WLAN communication interface 744, and the Bluetooth communication interface 747.

In addition, the technology of the present disclosure may also be realized as an in-vehicle system (or a vehicle) 760 including one or more blocks of the car navigation device 730, the in-vehicle network 761, and a vehicle module 762. The vehicle module 762 generates vehicle data such as vehicle speed, engine speed, and trouble information, and outputs the generated data to the in-vehicle network 761.

<<5.2. Application Example Regarding a Wireless Communication Terminal>>

Next, a first application example (a tablet terminal 800) and a second application example (a car navigation device 830 and an in-vehicle system 860) regarding the wireless communication terminal 200 according to an embodiment of the present disclosure will be described.

First Application Example

Figure 26:
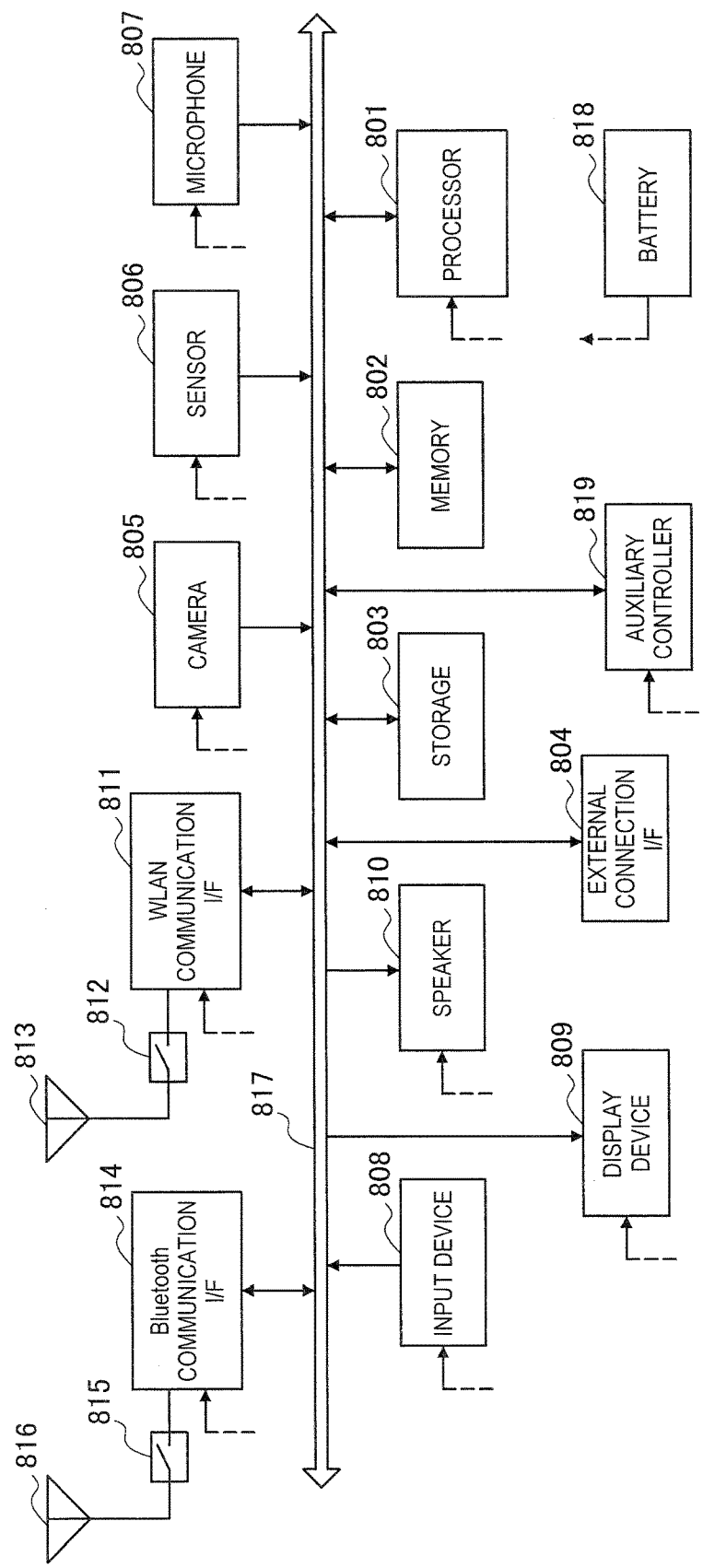
FIG. 26 is a block diagram showing an example of a schematic configuration of a smartphone to which the technology according to the present disclosure can be applied.

FIG. 26 is a block diagram showing an example of a schematic configuration of the tablet terminal 800 to which the technology according to the present disclosure can be applied. The tablet terminal 800 includes a processor 801, a memory 802, a storage 803, an external connection interface 804, a camera 805, a sensor 806, a microphone 807, an input device 808, a display device 809, a speaker 810, a WLAN communication interface 811, an antenna switch 812, an antenna 813, a Bluetooth communication interface 814, an antenna switch 815, an antenna 816, a bus 817, a battery 818, and an auxiliary controller 819.

The processor 801 may be, for example, a CPU or a SoC, and controls functions of an application layer and another layer of the tablet terminal 800. The memory 802 includes a RAM and a ROM, and stores a program that is executed by the processor 801, and data. The storage 803 may include a storage medium such as a semiconductor memory and a hard disk. The external connection interface 804 is an interface for connecting an external device such as a memory card and a USB device to the tablet terminal 800.

The camera 805 includes an image sensor such as a CCD and a CMOS, and generates a captured image. The sensor 806 may include a group of sensors such as a measurement sensor, a gyro sensor, a geomagnetic sensor, and an acceleration sensor. The microphone 807 converts sounds that are input to the tablet terminal 800 to audio signals. The input device 808 includes, for example, a touch sensor configured to detect touch onto a screen of the display device 809, a keypad, a keyboard, a button, or a switch, and receives an operation or an information input from a user. The display device 809 includes a screen such as a liquid crystal display (LCD) and an organic light-emitting diode (OLED) display, and displays an output image of the tablet terminal 800. The speaker 810 converts audio signals that are output from the tablet terminal 800 to sounds.

The WLAN communication interface 811 supports one or more WLAN standards such as IEEE 802.11a, 11b, 11g, 11n, 11ac, and 11ad to execute wireless communication. The WLAN communication interface 811 can communicate with another device via a WLAN access point in an infrastructure mode. In addition, the WLAN communication interface 811 can communicate directly with another device in an ad hoc mode. The WLAN communication interface 811 can typically include a BB processor and an RF circuit. The WLAN communication interface 811 may be a one-chip module in which a memory that stores a communication control program, a processor that executes the program, and a relevant circuit are integrated. The antenna switch 812 switches connection destinations of the antenna 813 for a plurality of circuits included in the WLAN communication interface 811. The antenna 813 has a single or a plurality of antenna elements (for example, a plurality of antenna elements constituting a MIMO antenna), and is used by the WLAN communication interface 811 to transmit and receive radio signals.

The Bluetooth communication interface 814 supports one or more Bluetooth standards to execute wireless communication. The Bluetooth communication interface 814 can communicate directly with another device. The Bluetooth communication interface 814 can typically include a BB processor, an RF circuit, and the like. The Bluetooth communication interface 814 may be a one-chip module in which a memory that stores a communication control program, a processor that executes the program, and a relevant circuit are integrated. The antenna switch 815 switches connection destinations of the antenna 816 for a plurality of circuits included in the Bluetooth communication interface 814. The antenna 816 has a single or a plurality of antenna elements, and is used by the Bluetooth communication interface 814 to transmit and receive radio signals.

As shown in FIG. 26, the tablet terminal 800 may have antennas that correspond to each of the WLAN communication interface 811, and the Bluetooth communication interface 814. Note that the configuration is not limited to the example of FIG. 26, and the tablet terminal 800 may have an antenna shared by the WLAN communication interface 811, and the Bluetooth communication interface 814. Specifically, the tablet terminal 800 may have an antenna and antenna switch shared by the WLAN communication interface 811 and the Bluetooth communication interface 814 instead of including the antenna switch 812 and the antenna 813, and the antenna switch 815 and the antenna 816. In addition, the shared antenna may be connected to either of the WLAN communication interface 811 and the Bluetooth communication interface 814 using the antenna switch.

In addition, the tablet terminal 800 may have the WLAN communication interface 811, and the Bluetooth communication interface 814 as separate modules as shown in FIG. 26. Note that the configuration is not limited to the example of FIG. 26, and the tablet terminal 800 may have a one-chip module that includes the WLAN communication interface 811, and the Bluetooth communication interface 814. In this case, the tablet terminal 800 may include an antenna and antenna switch shared between the communication interfaces, or may include antennas corresponding to each of the communication interfaces.

Note that the antenna switch 812, the antenna switch 815, and the antenna switch 718 may be omitted from the configuration of the tablet terminal 800.

The bus 820 connects the processor 801, the memory 802, the storage 803, the external connection interface 804, the camera 805, the sensor 806, the microphone 807, the input device 808, the display device 809, the speaker 810, the WLAN communication interface 811, the Bluetooth communication interface 814, and the auxiliary controller 819 to each other. The battery 818 supplies power to blocks of the tablet terminal 800 illustrated in FIG. 26 via feeder lines, which are partially shown as dashed lines in the drawing. The auxiliary controller 819 operates a minimum necessary function of the tablet terminal 800, for example, in a sleep mode.

The information acquisition unit 241 and the connection control unit 245 described with reference to FIG. 7 and the information acquisition unit 251 and the connection control unit 255 described with reference to FIG. 19 may be implemented by the processor 801 and/or the auxiliary controller 819 in the tablet terminal 800 shown in FIG. 26. More specifically, for example, the information acquisition unit 241, the connection control unit 245, the information acquisition unit 251, and the connection control unit 255 may be implemented by the processor 801 and/or the auxiliary controller 819 and a program executed by the processor 801 and/or the auxiliary controller 819 (for example, an OS, a device driver, and/or application software). In addition, at least some of the functions may be implemented by the WLAN communication interface 811, and/or the Bluetooth communication interface 814. In addition, each of the network detection unit 243 described with reference to FIG. 7 and the network detection unit 253 described with reference to FIG. 19 may be implemented by one or two or more of the processor 801, the auxiliary controller 819, and the WLAN communication interface 811.

Note that the tablet terminal 800 may operate as a wireless access point (software AP) as the processor 801 executes an access point function at an application level. In addition, the wireless communication interface 811 may have a wireless access point function.

Second Application Example

Figure 27:
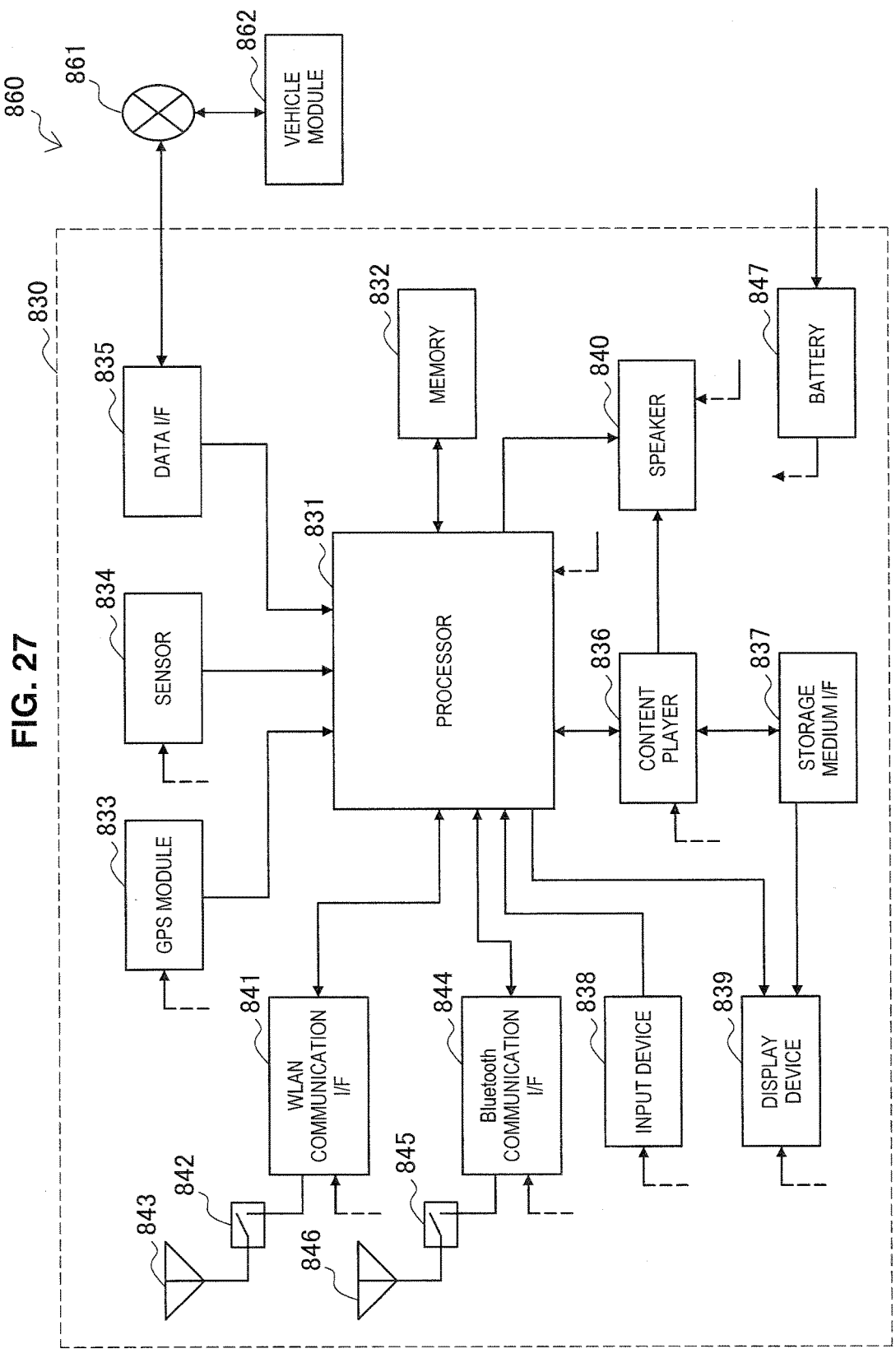
FIG. 27 is a block diagram showing an example of a schematic configuration of a car navigation device to which the technology according to the present disclosure can be applied.

FIG. 27 is a block diagram showing an example of a schematic configuration of the car navigation device 830 to which the technology of the present disclosure can be applied. The car navigation device 830 includes a processor 831, a memory 832, a GPS module 833, a sensor 834, a data interface 835, a content player 836, a storage medium interface 837, an input device 838, a display device 839, a speaker 840, a WLAN communication interface 841, an antenna switch 842, an antenna 843, a Bluetooth communication interface 844, an antenna switch 845, an antenna 846 and a battery 847.

The processor 831 may be, for example, a CPU or a SoC, and controls a navigation function and another function of the car navigation device 730. The memory 832 includes a RAM and a ROM, and stores a program that is executed by the processor 831, and data.

The GPS module 833 uses GPS signals received from a GPS satellite to measure a position (for example, latitude, longitude, and altitude) of the car navigation device 830. The sensor 834 may include a group of sensors such as a gyro sensor, a geomagnetic sensor, and an air pressure sensor. The data interface 835 is connected to, for example, an in-vehicle network 861 via a terminal that is not shown, and acquires data generated by the vehicle, such as vehicle speed data.

The content player 836 reproduces content stored in a storage medium (such as a CD and a DVD) that is inserted into the storage medium interface 837. The input device 838 includes, for example, a touch sensor configured to detect touch onto a screen of the display device 839, a button, or a switch, and receives an operation or an information input from a user. The display device 839 includes a screen such as a LCD or an OLED display, and displays an image of the navigation function or content that is reproduced. The speaker 840 outputs sounds of the navigation function or the content that is reproduced.

The WLAN communication interface 841 supports one or more WLAN standards such as IEEE 802.11a, 11b, 11g, 11n, 11ac, and 11ad to execute wireless communication. The WLAN communication interface 841 can communicate with another device via a WLAN access point in an infrastructure mode. In addition, the WLAN communication interface 841 can communicate directly with another device in an ad hoc mode. The WLAN communication interface 841 can typically include a BB processor and an RF circuit. The WLAN communication interface 841 may be a one-chip module in which a memory that stores a communication control program, a processor that executes the program, and a relevant circuit are integrated. The antenna switch 842 switches connection destinations of the antenna 843 for a plurality of circuits included in the WLAN communication interface 841. The antenna 843 has a single or a plurality of antenna elements (for example, a plurality of antenna elements constituting a MIMO antenna), and is used by the WLAN communication interface 811 to transmit and receive radio signals.

The Bluetooth communication interface 844 supports one or more Bluetooth standards to execute wireless communication. The Bluetooth communication interface 844 can communicate directly with another device. The Bluetooth communication interface 844 can typically include a BB processor, an RF circuit, and the like. The Bluetooth communication interface 844 may be a one-chip module in which a memory that stores a communication control program, a processor that executes the program, and a relevant circuit are integrated. The antenna switch 845 switches connection destinations of the antenna 846 for a plurality of circuits included in the Bluetooth communication interface 844. The antenna 846 has a single or a plurality of antenna elements, and is used by the Bluetooth communication interface 844 to transmit and receive radio signals.

As shown in FIG. 27, the tablet terminal 800 may have antennas that correspond to each of the WLAN communication interface 841, and the Bluetooth communication interface 844. Note that the configuration is not limited to the example of FIG. 27, and the car navigation device 830 may have an antenna shared by the WLAN communication interface 841, and the Bluetooth communication interface 844. Specifically, the car navigation device 830 may have an antenna and antenna switch shared by the WLAN communication interface 841 and the Bluetooth communication interface 844 instead of including the antenna switch 842 and the antenna 843, and the antenna switch 845 and the antenna 846. In addition, the shared antenna may be connected to either of the WLAN communication interface 841 and the Bluetooth communication interface 844 using the antenna switch.

In addition, the car navigation device 830 may have the WLAN communication interface 841, and the Bluetooth communication interface 844 as separate modules as shown in FIG. 27. Note that the configuration is not limited to the example of FIG. 27, and the car navigation device 830 may have a one-chip module that includes the WLAN communication interface 841, and the Bluetooth communication interface 844. In this case, the car navigation device 830 may include an antenna and antenna switch shared between the communication interfaces, or may include antennas corresponding to each of the communication interfaces.

Note that the antenna switch 842, the antenna switch 845, and the antenna switch 748 may be omitted from the configuration of the car navigation device 830.

The battery 847 supplies power to blocks of the car navigation device 830 illustrated in FIG. 27 via feeder lines that are partially shown as dashed lines in the drawing. The battery 847 accumulates power supplied form the vehicle.

The information acquisition unit 241 and the connection control unit 245 described with reference to FIG. 7 and the information acquisition unit 251 and the connection control unit 255 described with reference to FIG. 19 may be implemented by the processor 831 in the car navigation device 830 shown in FIG. 27. More specifically, for example, the information acquisition unit 241, the connection control unit 245, the information acquisition unit 251, and the connection control unit 255 may be implemented by the processor 831 and a program executed by the processor 831 (for example, an OS, a device driver, and/or application software). In addition, at least some of the functions may be implemented by the WLAN communication interface 841, and/or the Bluetooth communication interface 844. In addition, each of the network detection unit 243 described with reference to FIG. 7 and the network detection unit 253 described with reference to FIG. 19 may be implemented by the processor 831, and/or the WLAN communication interface 841.

In addition, the technology of the present disclosure may also be realized as an in-vehicle system (or a vehicle) 860 including one or more blocks of the car navigation device 830, the in-vehicle network 861, and a vehicle module 862. The vehicle module 862 generates vehicle data such as vehicle speed, engine speed, and trouble information, and outputs the generated data to the in-vehicle network 861.

<<5.3. Application Example Regarding Information Management Device>>

Next, an application example (server 900) regarding the network information providing device 300 according to an embodiment of the present disclosure will be described.

Figure 28:
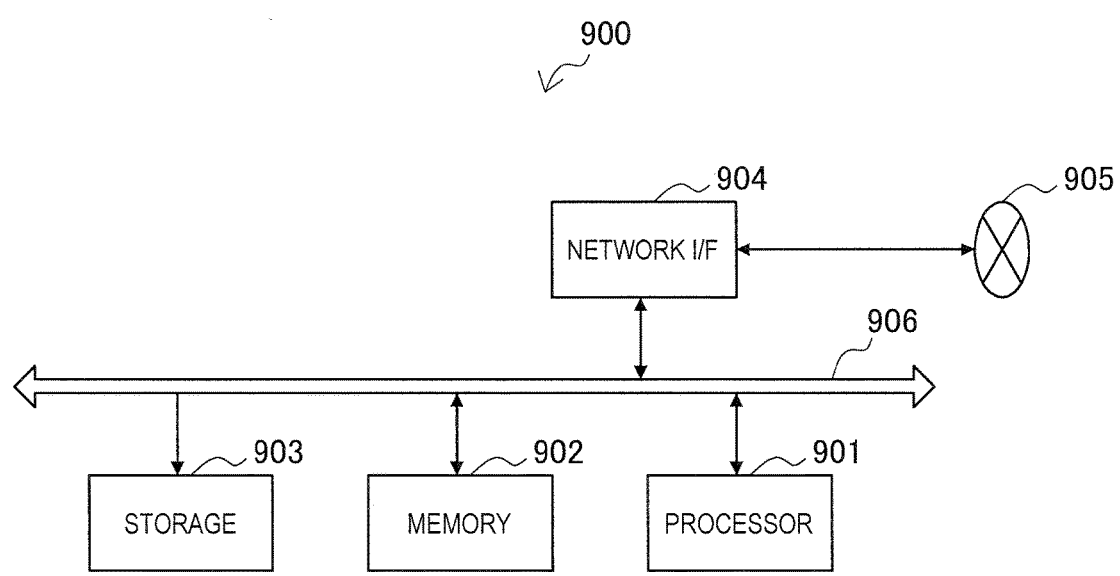
FIG. 28 is a block diagram showing an example of a schematic configuration of a server to which the technology according to the present disclosure can be applied.

FIG. 28 is a block diagram showing an example of a schematic configuration of the server 900 to which the technology of the present disclosure can be applied. The server 900 includes a processor 901, a memory 902, a storage 903, a network interface 904, and a bus 906.

The processor 901 may be, for example, a central processing unit (CPU) or a digital signal processor (DSP), and controls functions of the server 900. The memory 902 includes random access memory (RAM) and read only memory (ROM), and stores a program that is executed by the processor 901 and data. The storage 903 may include a storage medium such as a semiconductor memory and a hard disk.

The network interface 904 is a wired communication interface for connecting the server 900 to a wired communication network 905. The wired communication network 905 may be a core network such as an Evolved Packet Core (EPC), or a packet data network (PDN) such as the Internet.

The bus 906 connects the processor 901, the memory 902, the storage 903, and the network interface 904 to each other. The bus 906 may include two or more buses (such as a high speed bus and a low speed bus) each of which has different speed.

The request reception unit 331, the network search unit 333, the information acquisition unit 335 and the information providing unit 337 described with reference to FIG. 8 and the request reception unit 341, the network search unit 343, the information acquisition unit 345, and the information providing unit 347 described with reference to FIG. 20 may be implemented by the processor 901 in the server 900 shown in FIG. 28. More specifically, for example, the request reception unit 331, the network search unit 333, the information acquisition unit 335, the information providing unit 337, the request reception unit 341, the network search unit 343, the information acquisition unit 345, and the information providing unit 347 may be implemented by the processor 901 and a program executed by the processor 901 (for example, an OS, and/or application software).

6. Conclusion

So far, devices and processes according to the embodiments of the present disclosure have been described with reference to FIGS. 3 to 28.

Mobile Communication Terminal 100

According to the embodiment of the present disclosure, the mobile communication terminal 100 includes a mobile communication unit that performs mobile communication of a mobile communication network, a second information acquisition unit that acquires second network information (i.e., information regarding one or more wireless networks for wireless communication that is different from the mobile communication), a providing unit that provides the second network information to another terminal device that performs the wireless communication (for example, the wireless communication terminal 200). The second network information is at least partial information of information to be provided to the mobile communication terminal 100 (i.e., first network information) by the network information providing device 300 (i.e., an information providing device that provides information regarding a wireless network that is different from the mobile communication network to a device that performs the mobile communication). Each of the one or more wireless networks is a wireless network for the wireless communication to which the other terminal device is connectable through an authentication procedure.

Accordingly, the other terminal device (for example, the wireless communication terminal 200) can specify a connectable wireless network through the authentication procedure. As a result, for example, the wireless communication terminal 200 can promptly switch communication from communication using tethering to communication by way of a specified wireless network.

More specifically, for example, a device with the ANDSF generally provides information regarding a wireless network to a device that performs mobile communication, but does not provide the information to a device that does not perform mobile communication. In the embodiment of the present disclosure, the mobile communication terminal 100 provides at least part of the information to be provided to the wireless communication terminal 200 as described above. For this reason, even the wireless communication terminal 200 that is not provided with the information directly from a device with the ANDSF can specify a wireless network to which it is connectable through the authentication procedure.

Note that, when communication using tethering is being performed, the wireless communication terminal 200 can acquire information from the mobile communication terminal 100. Thus, provision of the second network information to the wireless communication terminal 200 is suitable especially for a switch from communication to tethering to communication via a wireless network (for example, a WLAN).

First Network Information and Second Network Information

The second network information includes, for example, identification information for identifying an access point of each of the one or more wireless networks.

With such identification information, for example, a wireless network that is connectable can be specified.

For example, the first network information includes information indicating a channel for each of the at least one wireless network.

With the information, for example, it is possible to detect a wireless network more quickly. More specifically, for example, when a channel of a wireless network is unclear, individual channels among all channels are sequentially scanned to detect a wireless network. Thus, an enormous amount of time can be necessary for detecting a wireless network. On the other hand, when there is channel information, for example, a wireless network is detected by scanning a channel indicated by channel information. Therefore, a wireless network can be quickly detected.

As a specific example, for example, 13 channels are prepared in the 2.4 GHz band for a WLAN. Then, for example, if it takes 10 ms for a channel transition and 100 ms to scan each channel, it takes 1420 ms (10 ms*12+100 ms*13) to scan all the channels. In other words, when a channel for a wireless network is unclear, a maximum of 1420 ms is necessary for detecting a wireless network. On the other hand, when there is channel information, for example, it is sufficient to scan one channel indicated by the channel information. Thus, for example, it takes 110 ms (10 ms*1+100 ms*1) to detect a wireless network. 10 ms out of 110 ms is time necessary for a transition to the one channel indicated by the channel information from a channel being used in communication using tethering. When the channel being used in the communication using tethering coincides with the one channel indicated by the channel information, 100 ms is necessary for detecting a wireless network. In this manner, time taken to detect a wireless network is shortened, and thus a wireless network can be detected more quickly.

For example, the second network information includes information indicating a channel for each of the one or more wireless networks.

With the information, for example, the wireless communication terminal 200 can detect a wireless network more quickly.

In addition, for example, the mobile communication terminal 100 includes a network detection unit for detecting a wireless network for the wireless communication. In addition, each of the one or more wireless networks are connectable by the wireless communication terminal 200 through the authentication procedure, and is a wireless network detected by the network detection unit 165.

Accordingly, for example, since information regarding the detected wireless network is provided to another terminal device (for example, the wireless communication terminal 200), it is possible to suppress a load of detection on the other terminal device. As a result, for example, power consumption of the other terminal device (for example, the wireless communication terminal 200) is suppressed.

Authentication

The authentication procedure includes, for example, an authentication procedure in which authentication information provided by the SIM 140 is used (i.e., SIM authentication procedure).

Using the SIM authentication procedure, for example, in connection of another terminal device (for example, the wireless communication terminal 200) that does not perform mobile communication on a mobile communication network to a wireless network (a WLAN), it is possible to lessen efforts of a user of the other terminal device. For example, it is possible to lessen efforts of inputting a password or the like. Thus, communication can be promptly switched.

Note that the authentication procedure may include an authentication procedure in which an electronic certificate is used.

Accordingly, it is possible to lessen efforts of a user as in the use case of the SIM authentication procedure.

One or More Wireless Networks

Each of the one or more wireless networks is, for example, a wireless network that has a communication area that corresponds to a position of the mobile communication terminal 100 or the wireless communication terminal 200.

Accordingly, information regarding a wireless network that is connectable in terms of position is obtained. Thus, it is possible to avoid attempts to detect a wireless network that is not allowed to connect in terms of position.

In addition, each of the one or more wireless networks is, for example, a wireless network that has an available time in terms of time.

Accordingly, the information regarding a wireless network that is connectable in terms of time is obtained. Thus, it is possible to avoid attempts to detect a wireless network that is not allowed to connect in terms of time.

Wireless Communication Terminal 200

In addition, according to the embodiment of the present disclosure, the wireless communication terminal 200 includes a wireless communication unit that performs wireless communication that is different from mobile communication of a mobile communication network, and an information acquisition unit that acquires second network information (i.e., information regarding one or more wireless networks for the wireless communication). The second network information is information provided from another terminal device that performs the mobile communication (for example, the mobile communication terminal 100) to the wireless communication terminal 200, and at least partial information of information provided from the network information providing device 300 (i.e., an information providing device that provides the information regarding a wireless network that is different from the mobile communication network to a device that performs the mobile communication) to the other terminal device (i.e., first network information). Each of the one or more wireless networks is a wireless network for the wireless communication to which the wireless communication terminal 200 is connectable through the authentication procedure. The wireless communication terminal 200 further includes a connection control unit that causes the wireless communication terminal 200 to be connected to one wireless network among the one or more wireless networks through the authentication procedure.

Accordingly, the wireless communication terminal 200 can specify a connectable wireless network through the authentication procedure. As a result, for example, the wireless communication terminal 200 can promptly switch communication from communication using tethering to communication by way of a specified wireless network.

The wireless communication terminal 200 further includes, for example, a network detection unit 243 that detects a wireless network for the wireless communication. In addition, the one wireless network is a wireless network detected by the network detection unit.

Accordingly, a load on the other terminal device (for example, the mobile communication terminal 100) is reduced. Thus, for example, power consumption of the other terminal device can be suppressed.

The authentication procedure includes, for example, an authentication procedure in which authentication information provided from a SIM of the other terminal device (for example, the mobile communication terminal 100) is used (i.e., the SIM authentication procedure). The information acquisition unit acquires the authentication information provided from the other terminal device.

Using the SIM authentication procedure, for example, in connection of the wireless communication terminal 200 to a wireless network (a WLAN), it is possible to lessen efforts of a user of the wireless communication terminal 200. For example, it is possible to lessen efforts of inputting a password or the like. Thus, communication can be promptly switched.

Network Information Providing Device 300

In addition, according to the embodiment of the present disclosure, the network information providing device 300 includes an information acquisition unit that acquires first network information (information regarding a wireless network that is different from a mobile communication network) and a providing unit that provides the first network information to a first terminal device that performs the mobile communication (for example, the mobile communication terminal 100). The first network information includes second network information (i.e., information regarding one or more wireless networks for the wireless communication that is different from the mobile communication). Each of the one or more wireless networks is a wireless network for the wireless communication to which a second terminal device that performs the wireless communication (for example, the wireless communication terminal 200) is connectable through the authentication procedure.

Accordingly, the second terminal device (for example, the wireless communication terminal 200) can specify a connectable wireless network through the authentication procedure. As a result, for example, the second terminal device (for example, the wireless communication terminal 200) can promptly switch communication from communication using tethering to communication by way of a specified wireless network.

It should be understood by those skilled in the art that various modifications, combinations, sub-combinations and alterations may occur depending on design requirements and other factors insofar as they are within the scope of the appended claims or the equivalents thereof.

Although the example in which the network information providing device provides information to the mobile communication terminal according to, for example, a request of the mobile communication terminal has been described, the present disclosure is not limited thereto. The network information providing device may provide information to the mobile communication terminal, for example, without a request of the mobile communication terminal.

In addition, although the example in which, for example, after being provided with information from the network information providing device, the mobile communication terminal provides at least part of the information to the wireless communication terminal has been described, the present disclosure is not limited thereto. The mobile communication terminal, for example, may accumulate information provided by the network information providing device and appropriately provide at least part of the accumulated information to the wireless communication terminal. In this case, the mobile communication terminal may have a function of selecting proper information from the accumulated information.

In addition, although the example in which, for example, one wireless communication terminal is present for the mobile communication terminal has been described, the present disclosure is not limited thereto. Two or more wireless communication terminals may be present for the mobile communication terminal. In this case, the mobile communication terminal may request provision of first network information individually from the two or more wireless communication terminals to acquire the first network information. Alternatively, the mobile communication terminal may request provision of the first network information collectively from the two or more wireless communication terminals to acquire the first network information. In both cases, at least partial information of the first network information is provided to each of the two or more wireless communication terminals.

In addition, although the example in which all wireless networks that are search objects of the network information providing device are wireless networks to which the mobile communication terminal and the wireless communication terminal are connectable through the authentication procedure has been mainly described, the present disclosure is not limited thereto. For example, wireless networks that are search objects of the network information providing device may include a wireless network to which one of the mobile communication terminal and the wireless communication terminal is connectable through the authentication procedure. As an example, the wireless network may be a wireless network to which connection of only one of the mobile communication terminal and the wireless communication terminal is admitted due to a contract. Alternatively, the wireless network may be a wireless network that uses an authentication scheme that the other of the mobile communication terminal and the wireless communication terminal does not support (in other words, for which the other does not have a capability). In addition, for example, wireless networks that are search objects of the network information providing device may include a wireless network to which neither the mobile communication terminal nor the wireless communication terminal is connectable through the authentication procedure. As an example, the wireless network may be a wireless network to which connection of neither the mobile communication terminal nor the wireless communication terminal is admitted due to a contract. Alternatively, the wireless network may be a wireless network that uses an authentication scheme that neither the mobile communication terminal nor the wireless communication terminal supports (in other words, for which neither has a capability). In such a case, as an example, the network information providing device may search remaining wireless networks except for wireless networks to which neither the mobile communication terminal nor the wireless communication terminal is connectable through the authentication procedure among the wireless networks that are search objects for a wireless network according to a request of the mobile communication terminal. Alternatively, as another example, the network information providing device may search wireless networks that are search objects for a wireless network according to a request of the mobile communication terminal under a search condition that the mobile communication terminal and/or the wireless communication terminal be connectable thereto through the authentication procedure.

In addition, for example, although WLAN communication is exemplified as an example of wireless communication that is different from mobile communication of a mobile communication network, the present disclosure is not limited thereto. The wireless communication may be, for example, wireless communication other than WLAN communication. Alternatively, the wireless communication may include WLAN communication and the other wireless communication.

In addition, the network information providing device may also provide, for example, information regarding a network other than a WLAN. For example, the network information providing device may provide information regarding a wireless network that is different from a mobile communication network other than WLAN communication. In addition, the network information providing device may further provide information regarding another mobile communication network that is different from the mobile communication network. For example, if the mobile communication network is a network of LTE or LTE-Advanced, the network information providing device may provide information regarding a network of 3GPP2 as information regarding the other mobile communication network. Alternatively, the network information providing device may provide information regarding a network of mobile Worldwide Interoperability for Microwave Access (WiMAX) (registered trademark).

In addition, although, the example in which the mobile communication device performs, for example, communication that conforms with LTE or LTE-Advanced and the mobile communication network is a network that conforms with LTE or LTE-Advanced has been described, the present disclosure is not limited thereto. The mobile communication device may perform communication that conforms with another communication standard (for example, another communication standard of the 3GPP) as mobile communication, and the mobile communication network may also be a network that conforms with the other communication standard.

In addition, although the example in which the network information providing device is positioned, for example, within a mobile communication network (core network) has been described, the present disclosure is not limited thereto. For example, the network information providing device may be positioned outside the mobile communication network.

In addition, although the example in which the network information providing device provides, for example, information regarding a wireless network for wireless communication that is different from mobile communication only to a device that performs mobile communication has been described, the present disclosure is not limited thereto. For example, the network information providing device may provide the information regarding the wireless network not only to a device that performs mobile communication but also to a device that does not perform mobile communication.

In addition, although, the example in which the network information providing device is a device with, for example, the ANDSF has been described, the present disclosure is not limited thereto. For example, the network information providing device may have another function of providing information regarding a wireless network rather than the ANDSF.

In addition, processing steps in the communication control processes of the present specification are not necessarily executed in the orders described in the flowcharts in a time-series manner. The processing steps in the communication control processes may be executed, for example, in a different order from the orders described in the flowcharts or may be executed in parallel.

In addition, a computer program for causing hardware such as a CPU, a ROM, and a RAM installed in a device according to the present disclosure (i.e., a terminal device (i.e., the mobile communication terminal or the wireless communication terminal) or an information providing device (i.e., the network information providing device)) to exhibit the same function as each configuration of the terminal device or the information providing device can also be created. In addition, a storage medium to store the computer program may also be provided. In addition, an information processing device (for example, a processing circuit or a chip) that includes a memory (for example, a ROM and a RAM) that stores the computer program and one or more processors (for example, a CPU, a DSP, etc.) that can execute the computer program may also be provided.

In addition, the effects described in the present specification are merely illustrative or exemplary, and are not limitative. In other words, the technology according to the present disclosure can exhibit, along with or instead of the effects, other effects that are apparent to those skilled in the art based on the present specification.

Additionally, the present technology may also be configured as below.

(1)

A terminal device including:

a mobile communication unit configured to perform mobile communication of a mobile communication network;

an acquisition unit configured to acquire information regarding one or more wireless networks for wireless communication that is different from the mobile communication; and a providing unit configured to provide the information regarding the one or more wireless networks to another terminal device that performs the wireless communication, wherein the information regarding the one or more wireless networks is at least partial information of information provided to the terminal device by an information providing device that provides information regarding a wireless network that is different from the mobile communication network to a device that performs the mobile communication, and wherein each of the one or more wireless networks is a wireless network for the wireless communication to which the other terminal device is connectable through an authentication procedure.

(2)

The terminal device according to (1), wherein the information regarding the one or more wireless networks includes identification information for identifying an access point of each of the one or more wireless networks.

(3)

The terminal device according to (1) or (2), wherein the information provided to the terminal device by the information providing device includes information indicating a channel for each of at least one wireless network for the wireless communication that includes the one or more wireless networks.

(4)

The terminal device according to any one of (1) to (3), wherein the information regarding the one or more wireless networks includes information indicating a channel for each of the one or more wireless networks.

(5)

The terminal device according to any one of (1) to (4), wherein the authentication procedure includes an authentication procedure in which authentication information provided by a subscriber identification module of the terminal device is used, and wherein the providing unit provides the authentication information to the other terminal device.

(6)

The terminal device according to any one of (1) to (5), wherein the authentication procedure includes an authentication procedure in which an electronic certificate is used.

(7)

The terminal device according to any one of (1) to (6), wherein each of the one or more wireless networks is a wireless network that has a communication area that corresponds to a position of the terminal device or the other terminal device.

(8)

The terminal device according to (7), further including:

a requesting unit configured to request provision of information from the information providing device, wherein the requesting unit provides information regarding a position of the terminal device or the other terminal device to the information providing device upon the request for the provision.

(9)

The terminal device according to any one of (1) to (8), wherein each of the one or more wireless networks is a wireless network that has an available time in terms of time.

(10)

The terminal device according to any one of (1) to (9), wherein each of the one or more wireless networks includes a wireless local area network (WLAN), and wherein the wireless communication includes WLAN communication.

(11)

The terminal device according to any one of (1) to (10), wherein each of the one or more wireless networks is a wireless network operated by an operator of the mobile communication network.

(12)

The terminal device according to any one of (1) to (11), further including:

a detection unit configured to detect a wireless network for the wireless communication, wherein each of the one or more wireless networks is a wireless network to which the other terminal device is connectable through the authentication procedure and which is detected by the detection unit.

(13)

The terminal device according to any one of (1) to (12), wherein the other terminal device is a device that performs communication through relay by the terminal device using the mobile communication.

(14)

The terminal device according to any one of (1) to (13), wherein the information providing device is a device that has an access network discovery and selection function (ANDSF).

(15)

An information processing device for a terminal device that performs mobile communication of a mobile communication network, the information processing device including:

a memory configured to store a program; and one or more processors that is capable of executing the program, wherein the program is for execution of acquiring information regarding one or more wireless networks for wireless communication that is different from the mobile communication, and providing the information regarding the one or more wireless networks to another terminal device that performs the wireless communication, wherein the information regarding the one or more wireless networks is at least partial information of information provided to the terminal device by an information providing device that provides information regarding a wireless network that is different from the mobile communication network to a device that performs the mobile communication, and wherein each of the one or more wireless networks is a wireless network for the wireless communication to which the other terminal device is connectable through an authentication procedure.

(16)

A terminal device including:

a wireless communication unit configured to perform wireless communication that is different from mobile communication of a mobile communication network; and an acquisition unit configured to acquire information regarding one or more wireless networks for the wireless communication, wherein the information regarding the one or more wireless networks is information provided to the terminal device by another terminal device that performs the mobile communication, and is at least partial information of information provided to the other terminal device by an information providing device that provides information regarding a wireless network that is different from the mobile communication network to a device that performs the mobile communication, wherein each of the one or more wireless networks is a wireless network for the wireless communication to which the terminal device is connectable through an authentication procedure, and wherein the terminal device further includes a connection control unit configured to cause the terminal device to be connected to one wireless network among the one or more wireless networks through the authentication procedure.

(17)

The terminal device according to (16), further including:

a detection unit configured to detect a wireless network for the wireless communication, wherein the one wireless network is the wireless network detected by the detection unit.

(18)

The terminal device according to (16) or (17), wherein the authentication procedure includes an authentication procedure in which authentication information provided by a subscriber identification module of the other terminal device is used, and wherein the acquisition unit acquires the authentication information provided by the other terminal device.

(19)

An information processing device for a terminal device that performs wireless communication that is different from mobile communication of a mobile communication network, the information processing device including:

a memory configured to store a program; and one or more processors that is capable of executing the program, wherein the program is a program for execution of acquiring information regarding one or more wireless networks for the wireless communication, wherein the information regarding the one or more wireless networks is information provided to the terminal device by another terminal device that performs the mobile communication, and is at least partial information of information provided to the other terminal device by an information providing device that provides information regarding a wireless network that is different from the mobile communication network to a device that performs the mobile communication, wherein each of the one or more wireless networks is a wireless network for the wireless communication to which the terminal device is connectable through an authentication procedure, and wherein the program is a program for further executing connection of the terminal device to one wireless network among the one or more wireless networks through the authentication procedure based on the information regarding the one or more wireless networks.

(20)

An information providing device including:

an acquisition unit configured to acquire information regarding a wireless network that is different from a mobile communication network; and a providing unit configured to provide the information to a first terminal device that performs the mobile communication, wherein the information includes information regarding one or more wireless networks for wireless communication that is different from the mobile communication, and wherein each of the one or more wireless networks is a wireless network for the wireless communication to which a second terminal device that performs the wireless communication is connectable through an authentication procedure.

REFERENCE SIGNS LIST 1 communication system
30 mobile communication network
50 wireless network
51 access point
100 mobile communication terminal
161, 171 requesting unit
163, 173 first information acquisition unit
165, 175 network detection unit
167, 177 second information acquisition unit
169, 179 information providing unit
200 wireless communication terminal
241, 251 information acquisition unit
243, 253 network detection unit
245, 255 connection control unit
300 network information providing device
331, 341 request reception unit
333, 343 network search unit
335, 345 information acquisition unit
337, 347 information providing unit

The invention claimed is:

1. A terminal device comprising:

processing circuitry configured to:

transmit a network information request, the network information request including parameters for a wireless network including network type information, position information, and time information, the request being communicated via a mobile communication network, the network information request triggering a network information search based on the parameters for the wireless network transmitted in the network information request, acquire network information corresponding to one or more wireless networks found in the network information search triggered by the network information request, the network information being information regarding the one or more wireless networks for wireless communication, the one or more wireless networks being different from the mobile communication network;

detect the wireless network based on the network information, wherein the wireless network is detected by the processing circuitry being configured to:

select the wireless network from the one or more wireless networks indicated by the network information, scan a channel indicated by channel information of the wireless network, determine whether the selected wireless network is detected, and scan all channels only when the selected wireless network is not detected;

transmit a switch instructing message to a wireless communication terminal, the switch instructing message including the acquired network information and instructions to switch wireless communication between the terminal device and the wireless terminal device from a first wireless communication to a second wireless communication;

wherein the acquired network information transmitted with the switch instructing message is at least partial information of the acquired network information associated with the wireless network that is different from the mobile communication network; and wherein each of the one or more wireless networks is a wireless network for the wireless communication to which the wireless communication terminal is connectable through an authentication procedure and the authentication procedure includes an authentication procedure in which authentication information is provided by a subscriber identification module of the terminal device using an electronic certificate issued by an operator of the mobile communication network.

2. The terminal device according to claim 1, wherein the information regarding the one or more wireless networks includes identification information for identifying an access point of each of the one or more wireless networks.

3. The terminal device according to claim 1, wherein the information regarding the one or more wireless networks includes information indicating a channel for each of the one or more wireless networks.

4. The terminal device according to claim 1, wherein the authentication procedure includes an authentication procedure in which an electronic certificate is used.

5. The terminal device according to claim 1, wherein each of the one or more wireless networks is a wireless network that has a communication area that corresponds to a position of the terminal device or the wireless communication terminal.

6. The terminal device according to claim 5, wherein the processing circuitry is further configured to
request provision of information,
wherein the information regarding a position of the terminal device or the wireless communication terminal is provided upon the request for the provision.

7. The terminal device according to claim 1, wherein each of the one or more wireless networks is a wireless network that has an available time in terms of time.

8. The terminal device according to claim 1,
wherein each of the one or more wireless networks includes a wireless local area network (WLAN), and
wherein the wireless communication includes WLAN communication.

9. The terminal device according to claim 1, wherein each of the one or more wireless networks is a wireless network operated by an operator of the mobile communication network.

10. The terminal device according to claim 1, wherein the processing circuitry is further configured to
detect a wireless network for the wireless communication,
wherein each of the one or more wireless networks is a wireless network to which the wireless communication terminal is connectable through the authentication procedure.

11. The terminal device according to claim 1, wherein the wireless communication terminal performs communication through relay by the terminal device using the mobile communication.

12. A non-transitory computer-readable storage medium storing computer-readable instructions thereon which, when executed by a computer, cause the computer to perform a method, the method comprising:
transmitting a network information request, the network information request including parameters for a wireless network including network type information, position information, and time information, the request being communicated via a mobile communication network, the network information request triggering a network information search based on the parameters for the wireless network transmitted in the network information request;
acquiring network information corresponding to one or more wireless networks found in the network information search triggered by the network information request, the network information being information regarding the one or more wireless networks for wireless communication, the one or more wireless networks being different from the mobile communication network;
detecting the wireless network based on the network information, wherein the detecting the wireless network includes:
selecting the wireless network from the one or more wireless networks indicated by the network information,
scanning a channel indicated by channel information of the wireless network,
determining whether the selected wireless network is detected, and
scanning all channels only when the selected wireless network is not detected;
transmitting a switch instructing message to a wireless communication terminal, the switch instructing message including the acquired network information and instructions to switch wireless communication between the terminal device and the wireless terminal device from a first wireless communication to a second wireless communication;
wherein the acquired network information transmitted with the switch instructing message is at least partial information of the acquired network information is associated with the wireless network that is different from the mobile communication network; and
wherein each of the one or more wireless networks is a wireless network for the wireless communication to which the wireless communication terminal is connectable through an authentication procedure and the authentication procedure includes an authentication procedure in which authentication information is provided by a subscriber identification module of the wireless communication terminal using an electronic certificate issued by an operator of the mobile communication network.

13. A wireless communication terminal comprising:
processing circuitry configured to:
receive a switch instructing message from a mobile communication terminal, the switch instructing message including network information request including parameters for a wireless network including network type information, position information, and time information and instructions to switch wireless communication between the mobile communication terminal and the wireless communication terminal from a first wireless communication to a second wireless communication, the switch instruction message being received via the wireless network that is different from mobile communication of a mobile communication network, and
detect the wireless network based on the network information after receiving the switch instructing message, wherein the wireless network is detected by the processing circuitry being configured to:
select the wireless network from one or more wireless networks indicated by the network information,
scan a channel indicated by channel information of the wireless network,
determine whether the selected wireless network is detected, and scan all channels only when the selected wireless network is not detected;

wherein the network information received from the mobile communication terminal is at least partial information of the network information associated with the wireless network that is different from the mobile communication network, wherein each of the one or more wireless networks is a wireless network for the wireless communication to which the terminal device is connectable through an authentication procedure, and wherein the processing circuitry is further configured to cause the terminal device to be connected to the wireless network through the authentication procedure and the authentication procedure includes an authentication procedure in which authentication information is provided by a subscriber identification module of the mobile communication terminal using an electronic certificate issued by an operator of the mobile communication network.

14. An information providing device comprising:

processing circuitry configured to:

acquire network information including parameters for a wireless network including network type information, position information, and time information regarding the wireless network that is different from a mobile communication network, and transmit the network information to a first terminal device that performs mobile communication, the first terminal device being configured to:

detect the wireless network based on the network information, wherein the wireless network is detected by the first terminal device being configured to:

select the wireless network from the one or more wireless networks indicated by the network information, scan a channel indicated by channel information of the wireless network, determine whether the selected wireless network is detected, and scan all channels only when the selected wireless network is not detected, transmit a switch instructing message to a second terminal, the switch instructing message including the acquired network information and instructions to switch wireless communication between the terminal device and the wireless terminal device from a first wireless communication to a second wireless communication, wherein the network information includes information regarding one or more wireless networks for wireless communication that is different from the mobile communication, and wherein each of the one or more wireless networks is a wireless network for the wireless communication to which a second terminal device that performs the wireless communication is connectable through an authentication procedure and the authentication procedure includes an authentication procedure in which authentication information is provided by a subscriber identification module of the first terminal device using an electronic certificate issued by an operator of the mobile communication network.

\* \* \* \* \*